(12) United States Patent
Solomon

(10) Patent No.: US 8,374,926 B2
(45) Date of Patent: Feb. 12, 2013

(54) INVENTORY CONTROL SYSTEM

(75) Inventor: Stanley B. Solomon, Rolling Hills Estates, CA (US)

(73) Assignee: Worthwhile Products, Rolling Hills Estates, CA (US)

( * ) Notice: Subject to any disclaimer, the term of this patent is extended or adjusted under 35 U.S.C. 154(b) by 354 days.

(21) Appl. No.: 12/718,791

(22) Filed: Mar. 5, 2010

(65) Prior Publication Data

US 2010/0187306 A1    Jul. 29, 2010

Related U.S. Application Data

(63) Continuation-in-part of application No. 11/854,246, filed on Sep. 12, 2007, now Pat. No. 7,850,411, and a continuation-in-part of application No. 11/854,232, filed on Sep. 12, 2007, now Pat. No. 7,837,424, said application No. 11/854,246 is a continuation-in-part (Continued)

(51) Int. Cl.
*G06Q 10/00* (2012.01)
*G06G 1/14* (2006.01)

(52) U.S. Cl. .......................................... 705/28; 705/22

(58) Field of Classification Search ...................... 705/28
See application file for complete search history.

(56) References Cited

U.S. PATENT DOCUMENTS

| | | | |
|---|---|---|---|
| 1,965,161 A | 7/1934 | Sheflin | |
| 2,089,341 A | 8/1937 | Cocks | |
| 2,451,120 A | 10/1948 | Rossetter | |
| 2,617,700 A | 11/1952 | Christie et al. | |
| 2,718,317 A | 9/1955 | Strauss et al. | |
| 2,762,489 A | 9/1956 | O'Sullivan | |
| 3,763,991 A | 10/1973 | Batik | |
| 3,860,130 A | 1/1975 | Frangos | |
| 3,987,915 A | 10/1976 | Conner | |
| 4,191,435 A | 3/1980 | Lehman | |
| 4,217,070 A | 8/1980 | Groger | |
| 4,422,554 A | 12/1983 | Lichti | |
| 4,615,430 A | 10/1986 | Satoh | |
| 4,772,176 A | 9/1988 | Montgomery | |
| 4,869,634 A | 9/1989 | Carter | |
| 5,090,863 A | 2/1992 | Lichti et al. | |
| RE34,016 E | 8/1992 | Hankes | |
| 5,176,484 A | 1/1993 | Kuperman et al. | |
| 5,199,840 A | 4/1993 | Castaldi et al. | |
| 5,222,855 A | 6/1993 | Bernard et al. | |
| 6,002,344 A | 12/1999 | Bandy et al. | |
| 6,021,394 A | 2/2000 | Takahashi | |
| 6,026,378 A | 2/2000 | Onozaki | |
| 6,131,399 A | 10/2000 | Hall | |
| 6,148,291 A | 11/2000 | Radican | |
| 6,317,028 B1 * | 11/2001 | Valiulis ........................ 340/10.1 |

(Continued)

FOREIGN PATENT DOCUMENTS

| WO | 2008061253 A2 | 5/2008 |
|---|---|---|
| WO | 2009005290 A2 | 8/2009 |

*Primary Examiner* — Garcia Ade
(74) *Attorney, Agent, or Firm* — Lowry Blixseth LLP; Scott M. Lowry

(57) ABSTRACT

The inventory control system includes a portable controller for receiving information relating to an item to be tracked by the inventory control system. The portable controller is in communication with a database that stores the information relating to the item. Preferably, the item includes a readable tag having a unique identification code affixed thereto. A sensor may monitor the general location of the tag after the item is entered into the inventory control system. Furthermore, a tag reader associated with the portable controller is able to pinpoint the specific location of the item via a laser-light beam within the area generally identified by the sensor.

19 Claims, 50 Drawing Sheets

Related U.S. Application Data of application No. 11/308,791, filed on May 4, 2006, now Pat. No. 7,689,480, said application No. 11/854,232 is a continuation-in-part of application No. 11/308,791, which is a continuation-in-part of application No. 11/195,248, filed on Aug. 1, 2005, now Pat. No. 7,168,905.

U.S. PATENT DOCUMENTS

| Patent No. | Date | Inventor |
|---|---|---|
| 6,345,948 B1 | 2/2002 | Irish |
| 6,377,296 B1 | 4/2002 | Zlatsin et al. |
| 6,411,916 B1 | 6/2002 | Pellerin |
| 6,519,578 B1 | 2/2003 | Reddy |
| 6,693,539 B2 | 2/2004 | Bowers et al. |
| 6,737,600 B2 | 5/2004 | Takizawa |
| 6,792,935 B2 | 9/2004 | Matusaitis et al. |
| 6,842,665 B2 | 1/2005 | Karlen |
| 6,851,611 B1 | 2/2005 | Shaw-Sinclair |
| 6,870,464 B2 | 3/2005 | Okamura |
| 6,923,612 B2 | 8/2005 | Hansl |
| 6,927,692 B1 | 8/2005 | Petrinovic |
| 6,996,538 B2 | 2/2006 | Lucas |
| 7,043,426 B2 | 5/2006 | Roberge et al. |
| 7,046,145 B2 | 5/2006 | Maloney |
| 7,073,712 B2 | 7/2006 | Jusas et al. |
| 7,123,988 B2 | 10/2006 | Russell et al. |
| 7,128,521 B2 | 10/2006 | Hansl |
| 7,136,465 B2 | 11/2006 | Glynn et al. |
| 7,180,420 B2 | 2/2007 | Maurer |
| 7,231,380 B1 | 6/2007 | Pienkos |
| 7,245,221 B2 * | 7/2007 | Claudatos et al. ......... 340/572.1 |
| 7,287,001 B1 | 10/2007 | Falls et al. |
| 7,292,678 B2 | 11/2007 | Glynn et al. |
| 7,307,245 B2 | 12/2007 | Faries et al. |
| 7,321,296 B2 | 1/2008 | Engellenner |
| 7,378,969 B2 | 5/2008 | Chan et al. |
| 7,411,921 B2 | 8/2008 | Strong et al. |
| 7,516,890 B1 | 4/2009 | Spremo et al. |
| 7,527,198 B2 | 5/2009 | Salim et al. |
| 7,557,711 B2 | 7/2009 | Volpi et al. |
| 7,580,699 B1 | 8/2009 | Shaw et al. |
| 7,580,866 B2 | 8/2009 | Church |
| RE41,080 E | 1/2010 | Mahoney |
| 7,672,872 B2 * | 3/2010 | Shanton .......................... 705/22 |
| 7,791,471 B2 | 9/2010 | Glynn et al. |
| 7,827,200 B2 | 11/2010 | Rowe et al. |
| 7,844,505 B1 | 11/2010 | Arneson et al. |
| 7,930,556 B2 | 4/2011 | Shih |
| 2003/0009394 A1 | 1/2003 | Malkin et al. |
| 2003/0036985 A1 | 2/2003 | Soderholm |
| 2003/0114101 A1 | 6/2003 | Paz |
| 2004/0072575 A1 | 4/2004 | Young et al. |
| 2004/0103034 A1 | 5/2004 | Reade et al. |
| 2005/0065950 A1 | 3/2005 | Chaganti et al. |
| 2005/0137943 A1 | 6/2005 | Holzman |
| 2006/0047546 A1 | 3/2006 | Taylor et al. |
| 2006/0190340 A1 | 8/2006 | Mysokowski |
| 2007/0112649 A1 | 5/2007 | Schlabach |
| 2007/0124077 A1 | 5/2007 | Hedlund |
| 2007/0124216 A1 | 5/2007 | Lucas |
| 2007/0136140 A1 | 6/2007 | Smith, Jr. |
| 2007/0239569 A1 * | 10/2007 | Lucas et al. ..................... 705/28 |
| 2007/0250411 A1 | 10/2007 | Williams |
| 2008/0052201 A1 | 2/2008 | Bodin et al. |
| 2008/0077512 A1 | 3/2008 | Grewal |
| 2009/0037244 A1 | 2/2009 | Pemberton |
| 2009/0099943 A1 | 4/2009 | Bodin et al. |
| 2009/0159684 A1 | 6/2009 | Barber et al. |
| 2010/0052853 A1 | 3/2010 | Hilton |
| 2010/0241467 A1 | 9/2010 | Saw et al. |
| 2011/0029360 A1 | 2/2011 | Gollapalli |

* cited by examiner

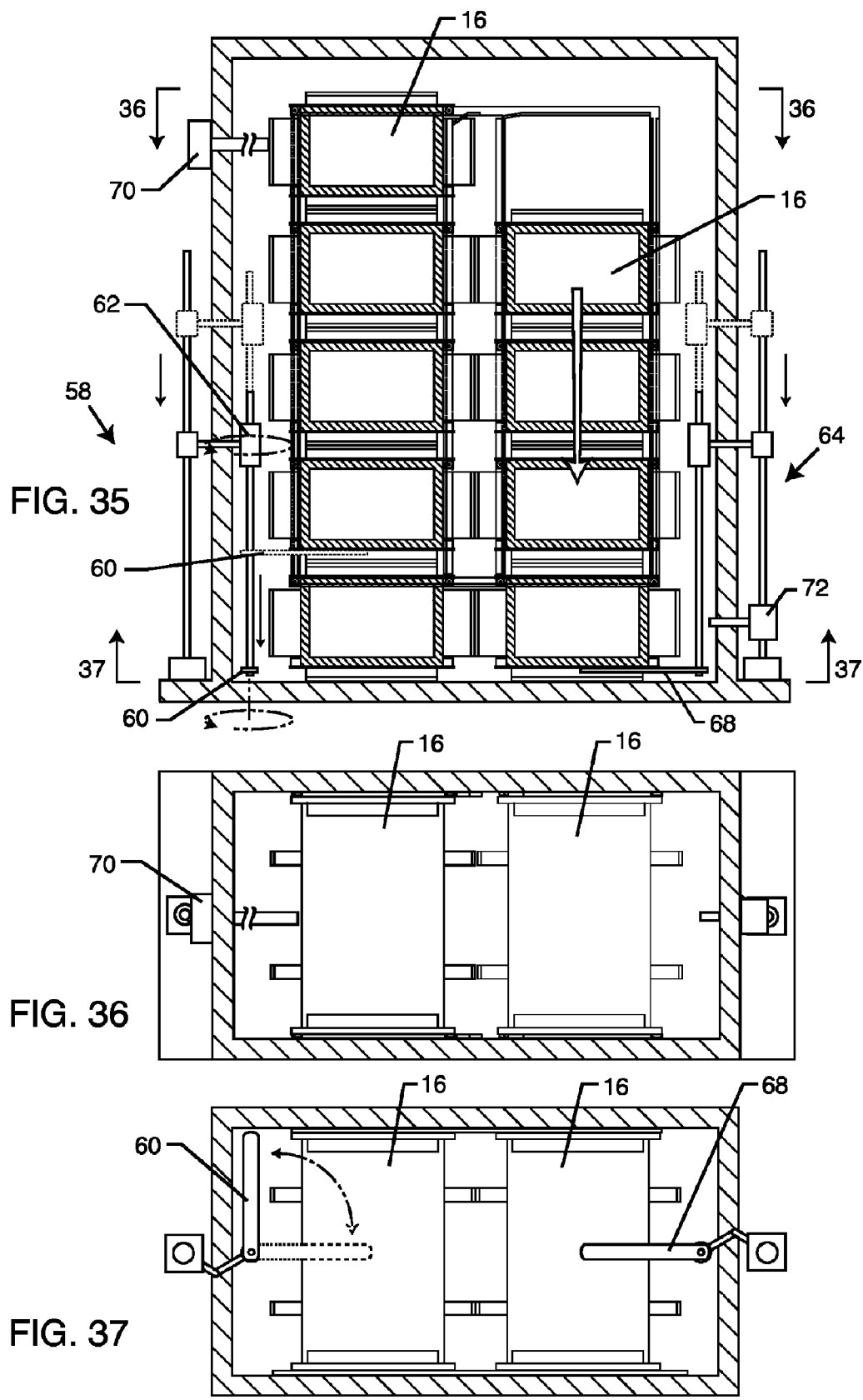

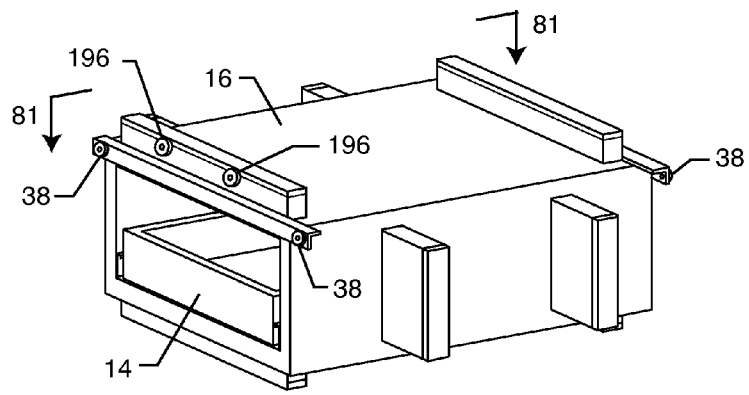
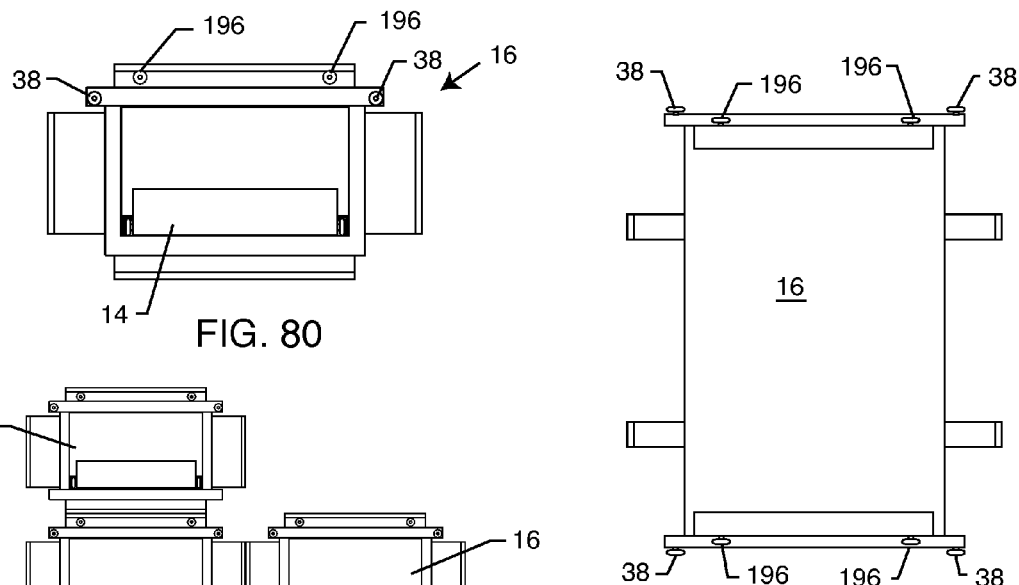
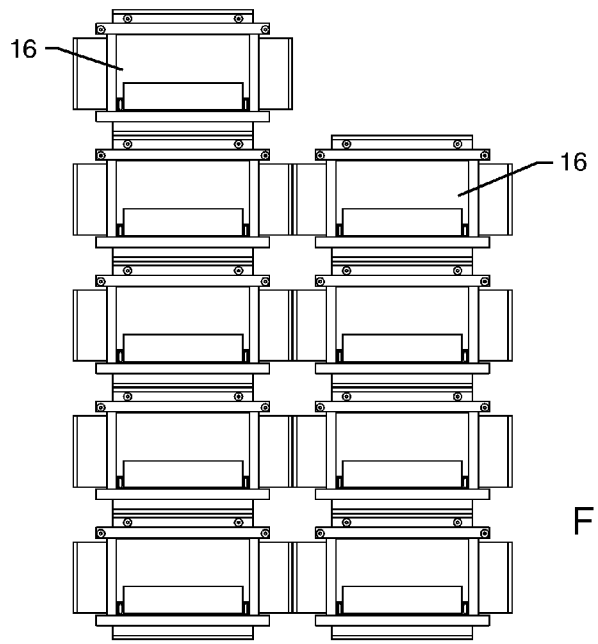
FIG. 79
FIG. 80
FIG. 81
FIG. 82

INVENTORY CONTROL SYSTEM

BACKGROUND OF THE INVENTION

The present invention generally relates to an inventory control system. More particularly, the present invention is directed to an inventory control system for receiving, tracking, and retrieving personal items such as groceries, credit cards, household items, clothing, etc. to enhance organization. Such an inventory control system may be used with a modular storage and retrieval system employing a plurality of movable storage units.

In the kitchen, pots, pans, flour, condiments, boxes and cans of food, mixers and other paraphernalia are usually stored in drawers and cupboards which are scattered throughout the kitchen. Pots and pans are ordinarily kept in cupboards which are dark, difficult to access and maintain. The average housewife is subjected to considerable exercise and rummaging through cupboards in an attempt to locate a pot or pan of the desired shape and size. Many cupboards are either below sinks or stoves, or elevated. This requires the housewife to bend down to find the desired container, pot or food article, or sometimes stand on a chair to retrieve these items. The storage of such kitchen equipment and food takes up a large number of cubic feet of space, some of which is wasted as the items are not readily retrievable in corners and the like.

A similar problem is encountered with closets, which are used to store shoes, pants, blouses, dresses, socks and other non-clothing items. Oftentimes, shoes are stored on the floor, clothes are hung on elongated rods in the closet (which often do not provide sufficient storage space) and other items are stacked on shelves—often at a considerable height. Such an arrangement presents many of the same disadvantages of kitchen storage.

Retrieving items in such settings is particularly difficult for those individuals who are taller than usual, shorter than usual, elderly or handicapped. Much of the space in corners and near ceilings are wasted space in a household.

The present invention seeks to provide a simplified, efficient and comparatively inexpensive storage conveyor apparatus for easy installation in a kitchen, closet, or the like. The invention can utilize adjacent wasted spaces above stairways, beneath floors, above ceilings, in corners, etc.

Various conveyor systems for a wide variety of goods, including elevating conveyors, horizontal conveyors, and combination types, are known in the prior art. This so-called "dumb-waiter" for elevating various articles in homes, restaurants and the like between different floor levels has long been known. The art relating to storage and display cases provides a number of devices in which two adjacent columns of containers are disposed one behind the other with the upward movement of one column and a downward movement of the adjacent one being obtained by associating the various containers with chains or cables passing over suitable wheels or sprockets. However, such devices present various drawbacks. For example, the type of movement from one column to another characteristic of the chain or cable type mechanism is such that a considerable amount of clearance is required for the containers. Moreover, the sprockets and cables operate under considerable loads and the bearings necessary to support these loads must be mounted upon sufficient structures to adequately carry the stresses to the floor. An elaborate shifting sequence must take place as the tension members pass over the pulleys in order to avoid inverting the containers during the process.

One of the main drawbacks encountered in automatic and semi-automatic storage systems relates to the complexity of the mechanisms used. Such complexity adds to the cost of installing the system, and adversely affects the reliability of such systems. Incorporating chain and pulley systems, unique lifting mechanisms, etc., renders the systems complicated and expensive to build, prone to breakage, and increases maintenance time and costs.

Another drawback encountered with storage systems relates to an owner of an object not being able to remember or locate where that object was stored in their home. The owner of the object may know that the object is stored somewhere in their house but may not be able to remember in which room or in what storage device the object is located. An inventory control system that can identify and keep track of objects is therefore highly desirable. While some objects, such as products purchased from commercial entities (e.g., retail stores, wholesalers or the like) have identifying indicia, such as Uniform Product Code (UPC) numbers, many objects do not. For example, UPC numbers are used on can labels and tags attached to clothing. However, many objects either do not have such labels or tags in the first place or they were removed from the object after purchase.

Accordingly, there is a continuing need for an automated storage and retrieval system which is simplified, efficient and comparatively inexpensive. Moreover, there is a continuing need for an automated storage and retrieval inventory control system which can inform a user whether or not an object is in a storage location; in which part of the storage location the object is located; and find the object no matter where the object is stored. There is a further need for an inventory control system that can associate certain information with an object to identify that object and its location. The present invention fulfills these needs and provides other related advantages.

SUMMARY OF THE INVENTION

The inventory control system described herein includes a portable controller for receiving information relating to an item to be tracked by the inventory control system. The portable controller is in communication with a database where information regarding the item is to be stored. Preferably, a readable tag having a unique identification code is affixed to the item so that the location of the item can later be identified. Tracking is accomplished, in general, through deployment of a sensor that monitors the general location of the tag after the item is entered into the inventory control system. A tag reader associated with the portable controller is able to pinpoint the specific location of the item in the area generally identified by the sensor. Preferably, the portable controller includes a pointer for directionally pinpointing the location of the readable tag affixed to the item. The pointer may include a laser-light beam, an arrow displayed on an LCD screen on the controller, or an infrared light beam.

The sensor is preferably a GPS sensor that is in wireless communication with both the portable controller and a satellite system. The satellite system includes multiple satellites that identify the location of the readable tag on the item via triangulation. That is, three satellites work together to determine the latitude, longitude and the approximate elevation of the readable tag on the item. The satellite system may further include a backup satellite that operates in the event that one of the three primary satellites is unavailable. The GPS sensor also operates at multiple frequencies distinguishable over one another. Preferably, the GPS sensor automatically switches to a new frequency when a conflicting frequency is detected. This feature is predominantly used when deployed in house-holds relatively close enough to one another such that the GPS sensor signals may overlap with one another.

The inventory control system also includes a printer for imparting information to the readable tag in the event the item does not already carry a tag. Preferably, the readable tag includes an RFID circuit or a barcode. At some point, each item will be manufactured to include an RFID circuit and a barcode and will automatically be scannable into the inventory control system with the portable controller. Preferably, the readable tag is a passive tag that does not require electricity. Accordingly, such a passive tag may be responsive to RFID signals emitted by the portable controller.

The portable controller itself is preferably responsive to voice commands and includes either a barcode scanner or an RFID scanner, or both. Preferably the portable scanner is a cell phone, a personal digital assistant (PDA), a smartphone or a basic scanner. In one embodiment, the portable controller includes a touch-sensitive LCD screen that enables direct interaction therewith. The portable controller may also include a local database. The inventory control system may also include a backup database in remote communication with the portable controller for storing information relating to the item tracked by the inventory control system. The information in the backup database may be accessed for purposes of replacing a lost portable controller or adding another portable controller to the inventory control system. The backup database may also be in wireless communication with a disk card sensor that automatically identifies when an item is removed from the inventory control system. Accordingly, the sensor includes a transmitter and a receiver for wireless communication with the portable controller. Accordingly, the portable controller and the database are in bi-lateral communication with one another to ensure that the inventory control system database accessible by the user is updated in real-time.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 35 is a diagrammatic view of the storage system, illustrating the lowering of the storage units in the second column to create a vacancy in a top position thereof;

FIG. 36 is a cross-sectional view taken generally along line 36-36 in FIG. 35, illustrating the position of the storage units in the adjacent columns;

FIG. 37 is a cross-sectional view taken generally along line 37-37 of FIG. 35, illustrating the positioning of the swing arms of the respective actuators;

FIG. 79 is a perspective view of another storage unit having two sets of wheels;

FIG. 80 is an end view of the storage unit in FIG. 79;

FIG. 81 is a top plan view of the storage unit in FIG. 79;

FIG. 82 is a diagrammatic view of a plurality of storage units arranged in two columns;

DETAILED DESCRIPTION OF THE PREFERRED EMBODIMENTS

As shown in the accompanying drawings, for purposes of illustration, described herein is a storage and retrieval system and an inventory control system. The systems, alone or in combination, are intended to maximize the storage capacity anywhere in a home or business, and allow for easy access and retrievability for anyone whether he or she be tall, short or handicapped, such as in a wheelchair. As will be more fully discussed herein, the design and configuration of the system is not complex so as not to be overly expensive or prone to breakage and maintenance.

Figure 1:
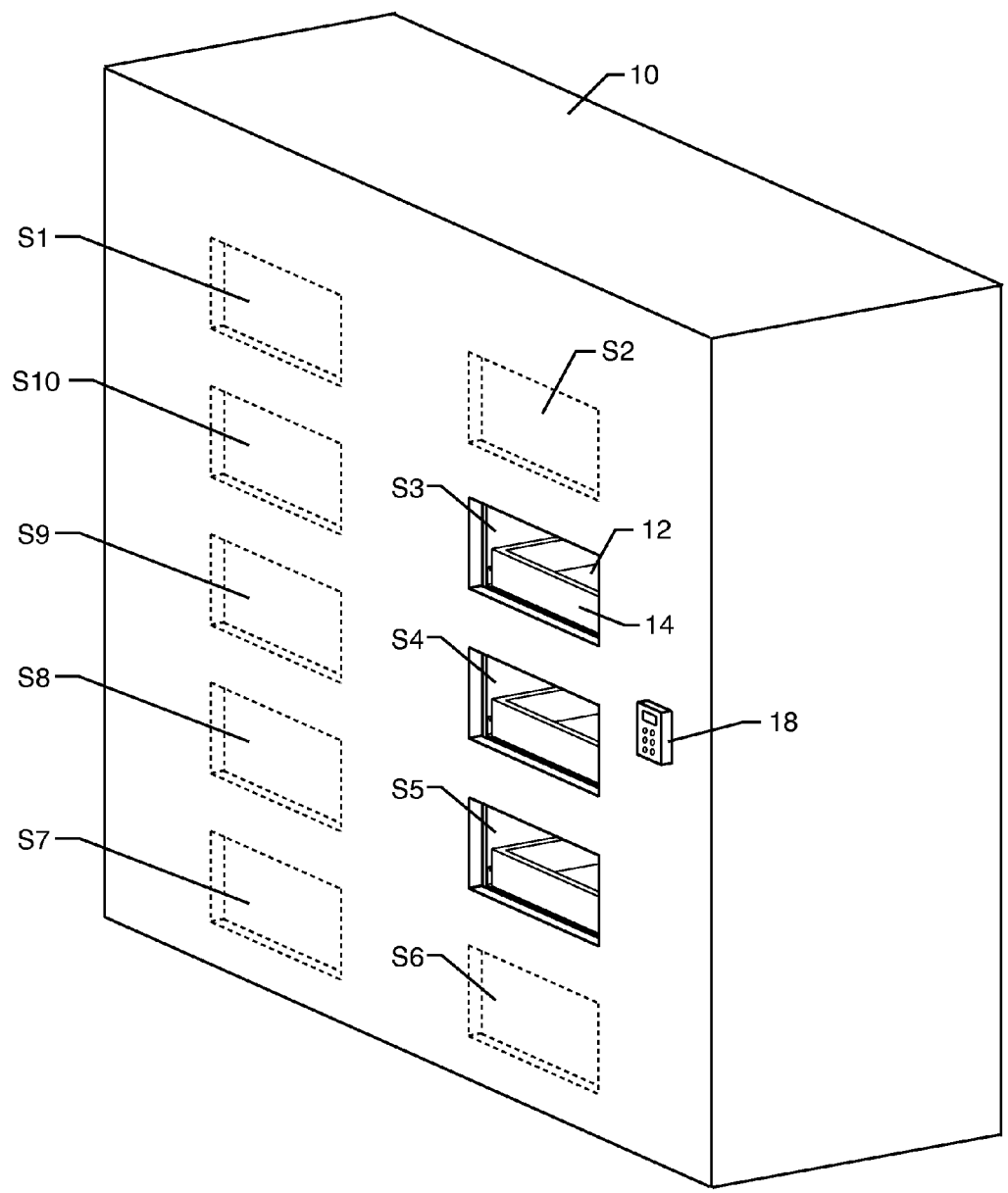
FIG. 1 is a front perspective view of a storage system.

With reference now to FIG. 1, one embodiment of a storage system is illustrated in an upright box structure 10 defining a housing or the like. It will be understood by those skilled in the art that the system need not necessarily be housed in such a structure 10, but instead can be built into cabinetry, walls of a home or business, etc.

One or more apertures 12 are formed in the structure 10 for access to drawers 14 which are preferably slidably mounted within a storage unit 16. As will be more fully explained herein, the storage units 16 are stacked upon one another so as to form a plurality of columns. In FIG. 1, the structure 10 has two columns of spaces S1-S10. A total of nine storage units 16 occupy the spaces S1-S10. One of the spaces S1-S10 is generally left vacant (typically in one of the corners of the columns) for operational purposes, as described in more detail below. However, it will be readily understood by those skilled in the art that the number of columns and the number of stacked storage units 16 can vary. For example, there can be as few as two columns with three storage units 16 in a total four spaces. Alternatively, there can be a plurality of columns each with two or more storage units 16 stacked upon one another to form the columns. The fewer the columns and larger number of storage units 16, the more vertical in operation is the system. Conversely, the more columns and the fewer number of storage units 16, the more horizontal the system. Thus, although two adjacent end columns with a total of nine storage units are used for purpose of illustration and example, the invention is not intended to be limited to such.

In a particularly preferred embodiment, the system presents multiple apertures 12, such that multiple drawers 14 or storage units 16 can be accessible at any given time. The apertures or openings 12 are preferably arranged such that a relatively tall person can access the upper most position, and shorter individuals, such as children, or even those in wheelchairs or the like can access a lowermost opening to a storage unit 16.

In a preferred embodiment of the system, a controller 18 is mounted to the structure 10 or a wall. The controller 18 may also be in the form of a wireless controller or even a controller wired to the system but placed in another room or the like. The controller 18 is used by the end user to select which storage unit 16 to be present in one of the openings 12 so as to be accessed. The controller 18 includes or communicates with electronic control circuitry for controlling the movement of the storage units 16, as will be more fully described herein. In this manner, the end user can select which storage unit 16 is to be moved into which desired opening 12 by simply entering the commands into the controller 18 such as by using a keypad or the like. Use of a wireless controller would allow one in the kitchen to point the controller 18 to the system and select a given storage unit 16, which might contain a given pot, ingredient, can of food, etc. Similarly, the controller 18 can be placed in another room, such as in a bedroom, so that an individual can select a given storage unit 16, which may contain cold cereal or other breakfast item, to be moved into a given opening 12 while the individual showers or traverses the distance between the bedroom and the kitchen. Preferably, the system rotates the storage unit 16 in a relatively rapid manner so that a long wait is not necessary, even if the command is given at the structure 10 itself.

Figure 2:
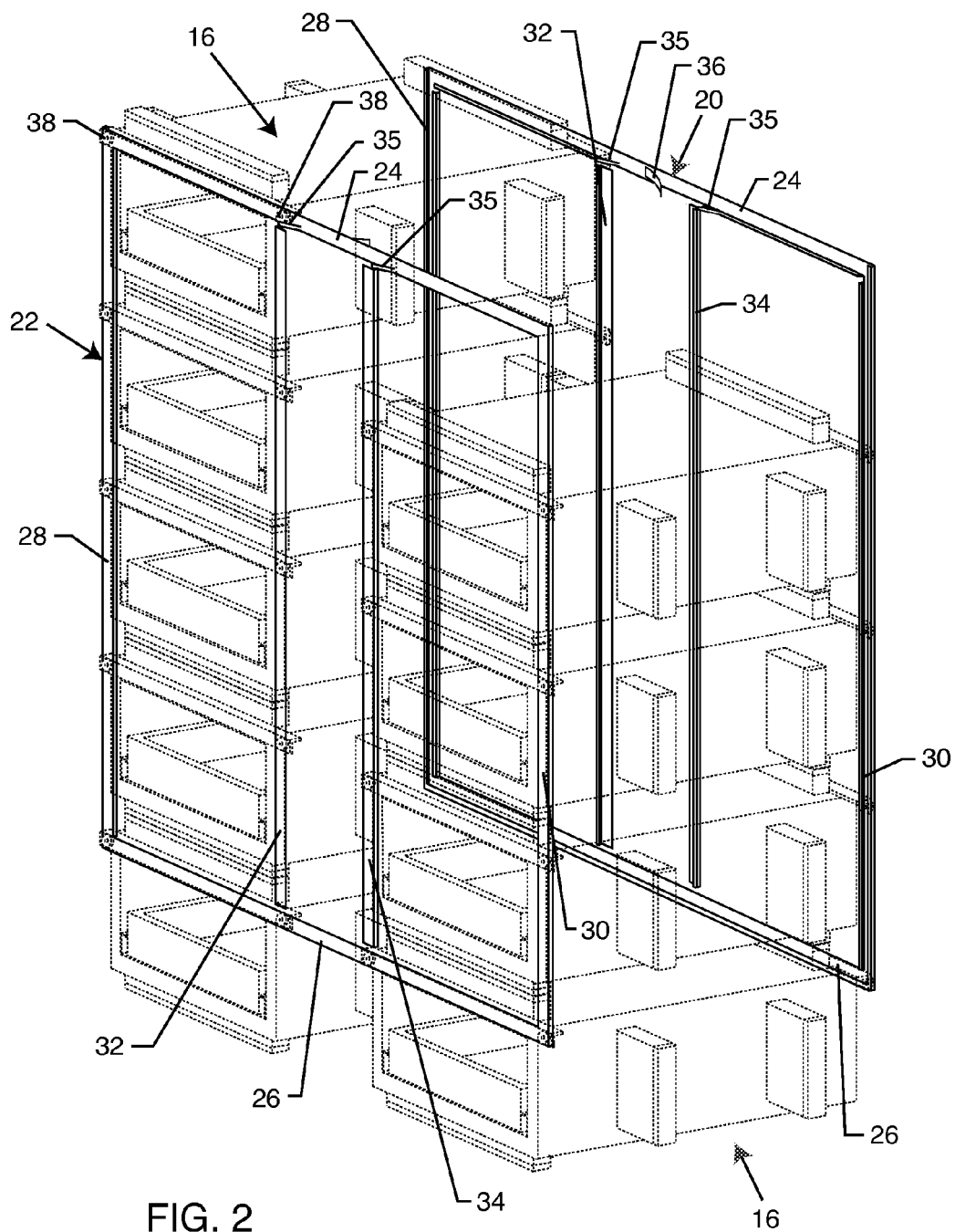
FIG. 2 is a perspective view of a single track system showing a plurality of stacked storage units operably connected thereto, in phantom.
Figure 3:
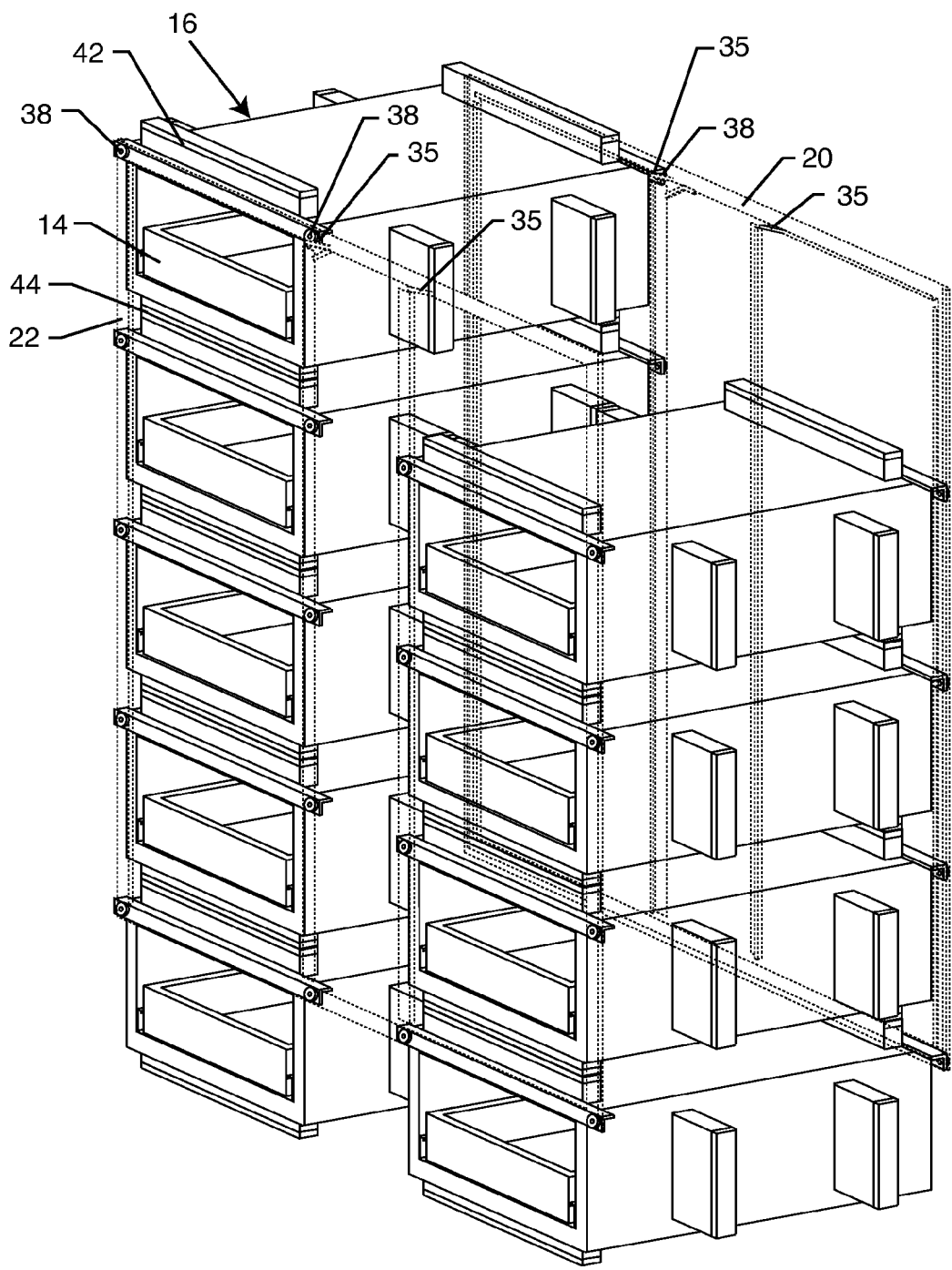
FIG. 3 is a perspective view of the stacked storage units, with the single track illustrated in phantom.
Figure 4:
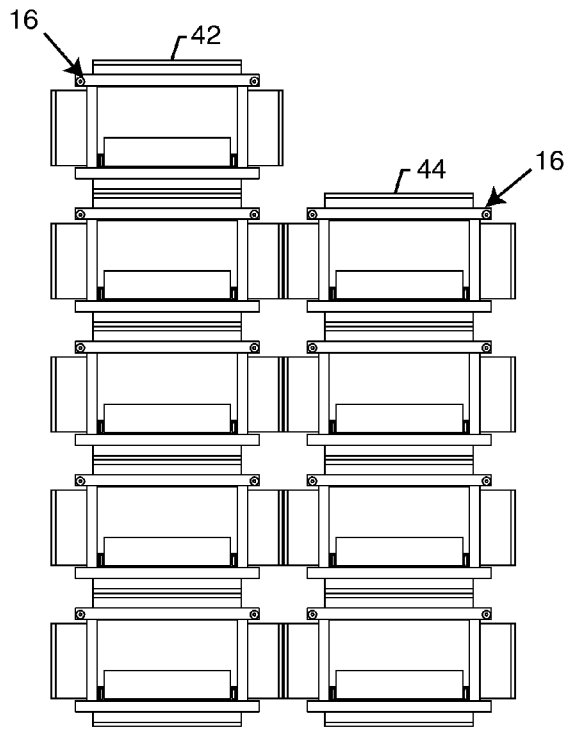
FIG. 4 is a front elevational view of the stacked storage units.
Figure 5:
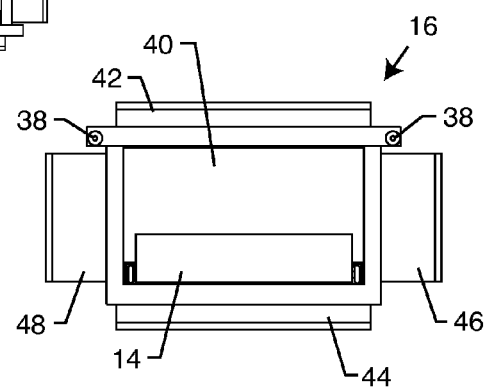
FIG. 5 is a front elevational view of a single storage unit.
Figure 6:
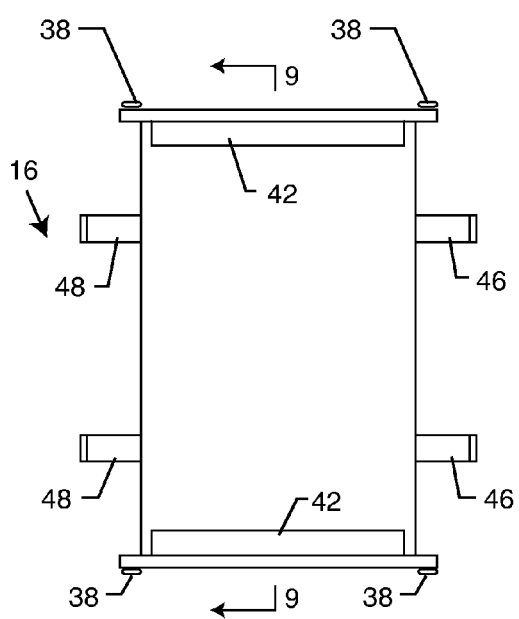
FIG. 6 is a top plan view of the storage unit of FIG. 5.
Figure 7:
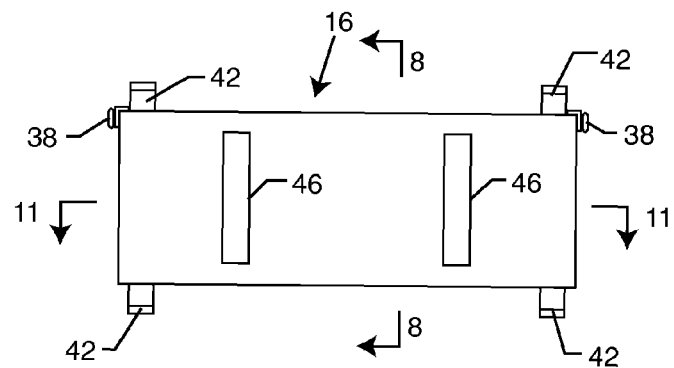
FIG. 7 is a side elevational view of the storage unit of FIG. 5.
Figure 8:
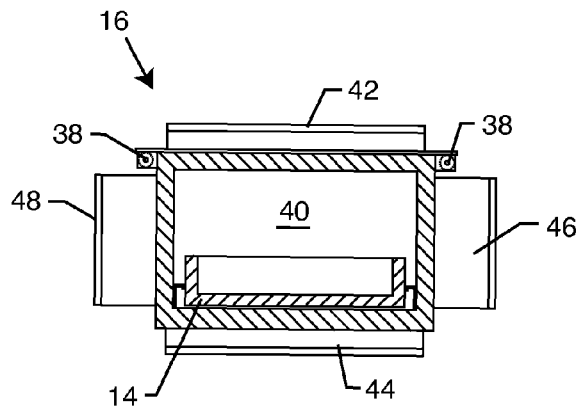
FIG. 8 is a cross-sectional view taken generally along line 8-8 of FIG. 7.
Figure 9:
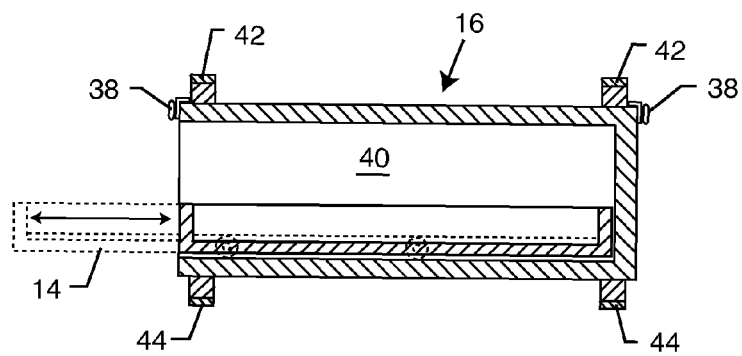
FIG. 9 is a cross-sectional view taken generally along line 9-9 of FIG. 6, illustrating a slidable drawer.

With reference now to FIGS. 2-4, an endless track is shown in FIG. 2 comprising tracks 20 and 22 which are positioned generally parallel to one another and spaced apart a distance substantially equal to the length of a storage unit 16. The word "endless" is used herein to convey the meaning that the storage unit 16 can travel in the pre-defined path, typically a circular path, continuously without end. The track system 20 and 22 illustrated in FIG. 2 comprises what is referred to herein as a single track system. That is, each track 20 and 22 includes upper and lower horizontal rails 24 and 26 vertically spaced from one another and positioned along the same plane. The rails 24 and 26 are interconnected with first and second end vertical rails 28 and 30. First and second intermediate rails 32 and 34 are spaced apart from one another and extend from the upper rail 24 to the lower rail 26. The first and second intermediate rails 32 and 34 are disposed intermediate the ends of the upper and lower rails 24 and 26. The first track 20 and the second track 22 are mirror images of one another, and are spaced apart and generally parallel to one another so as to form a continuous track. Moreover, the first end vertical rail 28 and its adjacent intermediate rail 32 form a portion of a first vertical track. The corresponding end vertical rail 28 and adjacent intermediate rail 32 form the other portion of the first vertical track, which the storage units 16 ride upon in their vertical motion at one end of the continuous track. Similarly, the second end vertical rail 30 of each track 20 and 22 and the intermediate rail 34 adjacent thereto form portions of a second vertical track which supports a column of storage units 16 at the opposite end of the continuous track.

Although the tracks 20 and 22 are generally square or rectangular, it will be appreciated by those skilled in the art that the movement of the storage unit 16 thereon is generally circular and continuous. The upper rails 24 may include a pair of ramps 35 to facilitate smooth transition of storage units 16 from one column to the next. The ramps 35 prevent the binding of the wheels 38 in the vertical track as the storage unit 16 moves horizontally to the right column.

As will be more fully discussed herein, each tracks 20 and 22 includes a flexible stop 36, typically along the upper rail 24, and possibly on the lower rail 26. The stop 36 is biased outwardly such that the storage unit 16 can pass thereby. But, the stop 36 springs back to prevent the storage unit 16 from reversing travel.

As can be seen in FIGS. 2 and 3, each storage unit 16 includes wheels 38 which engage the tracks 20 and 22 so that the storage unit 16 is slidably movable along the pair of tracks 20 and 22.

As can be seen from FIG. 2, the wheels 38 of a given storage unit 16 engage corresponding rails 28 and 32 or 30 and 34, when in a vertical motion, and upper rail 24 when positioned at an uppermost position, or bottom rail 26 when in a lower position.

Throughout the description hereof, similar functional structure or components in different embodiments may be labeled with the same reference number. Thus, as can be seen from the description above, the tracks 20 and 22 are substantially identical and mirror-imaged structures.

Of particular reference now to FIGS. 3 and 4, two columns of storage units 16 are illustrated. As discussed above, in the illustrated exemplary embodiment, a total of ten spaces or cavities are available within the structure 10. However, to provide movement of the storage unit 16 in sequential fashion, an empty space is provided, as illustrated in FIGS. 3 and 4. As will be seen herein, this empty space is typically in one of the four corners, or in the upper most and lower most spaces of the end columns. As will be more fully discussed herein, each storage unit 16 travels in a sequential, or generally circular, path during the course of operation.

With reference now to FIGS. 3-9, each storage unit 16 defines an inner cavity 40 for the storage of items therein. In a particularly preferred embodiment, the drawer 14 is disposed within the cavity 40, and is slidably extended and retracted out of and into the cavity 40, such as by rollers, cabinet sliders, tongue and groove inter-connection, etc. Such would enable the end user to pull out the drawer 14 and retrieve selected items therefrom during operation of the system. The storage units 16 of a given system are typically and preferably relatively the same size. There may be as few as a single drawer 14 within the inner compartment 40, or a plurality of drawers 14 within the inner compartment 40. Thus, for example, a storage unit 16 with a single drawer 14 could accommodate larger or taller items, such as a two liter bottle of soda. However, placing two or three drawers 14 within the same inner space 40 would enable the storage of smaller cans or other smaller items in each drawer 14. Of course, it will be appreciated that the drawer 14 is not necessary because, in an alternative embodiment, the items can be stored directly within the inner storage cavity 40.

In a particularly preferred embodiment, spacers 42 and 44 extend from the top and bottom of each storage unit 16. As illustrated in FIGS. 3 and 4, the lower spacers 44 of one storage unit 16 contact and rest or slide upon the upper spacers 42 of a storage unit 16 immediately below. Preferably, spacers 46 and 48 extend from the sides of each storage unit 16 as well, such that the storage units are in fixed spaced relationship with one another. In a particularly preferred embodiment, the spacers 42-48 are comprised of or include an outermost layer of relatively friction free material, such as Teflon, plastic, smooth metal, etc. which enable the storage unit 16 to slide past one another relatively easy even if the spacers 42-48 come into contact with one another during the movement of the storage unit 16.

Preferably, the wheels 38 extend from an upper portion of the storage unit 16, such that the storage unit 16 is essentially suspended from the upper or lower rails 24, 26. Suspension renders it relatively easy for the storage unit 16 to be horizontally moved across the upper or lower rails 24 or 26.

With reference to FIGS. 10-13, the storage units 16 are preferably loaded with items such that they are substantially balanced or such that the weight of the items placed therein are centered or substantially spread across the inner cavity 40 or drawer 14 of the storage unit 16. Extreme unbalancing may potentially cause the wheels 38 of the storage unit 16 to bind. Accordingly, means are contemplated for indicating balance of the storage unit 16.

Such means can be in the form of visual aids for the end user. For example, a bubble level device 50 can be placed on the storage unit, such as the front panel of the drawer 14. The individual can determine that the bubble of the level device 50 is within a safe range to ensure the storage unit 16 is substantially balanced.

Figure 11:
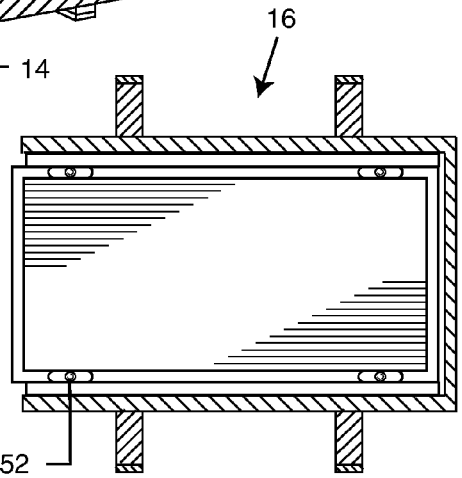
FIG. 11 is a cross-sectional view taken generally along line 11-11 of FIG. 7.

Alternatively, as illustrated in FIG. 11, the storage unit 16 may include electronic sensors 52 which detect when the storage unit 16 becomes unbalanced. When unbalanced, an alarm, such as a visual or audible alarm, may activate to alert the end user of the unbalanced situation.

Figure 10:
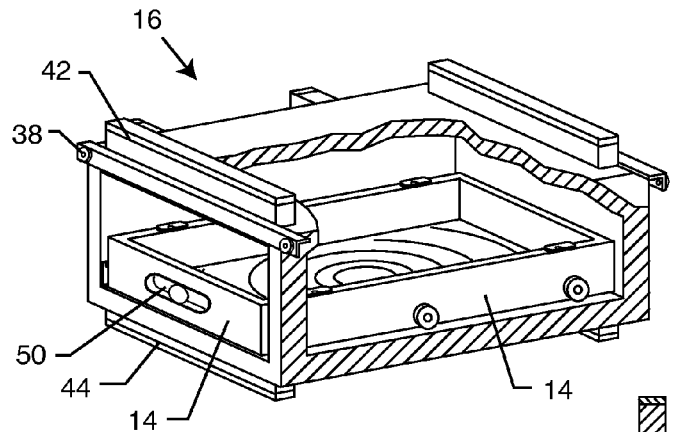
FIG. 10 is a partially sectioned and fragmented perspective view of a storage unit having balancing means incorporated therewith.
Figure 12:
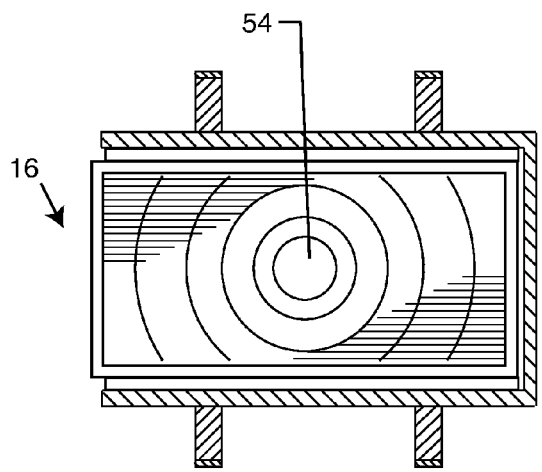
FIG. 12 is another cross-sectional view of the storage unit of FIG. 11, illustrating an alternative balancing means.
Figure 13:
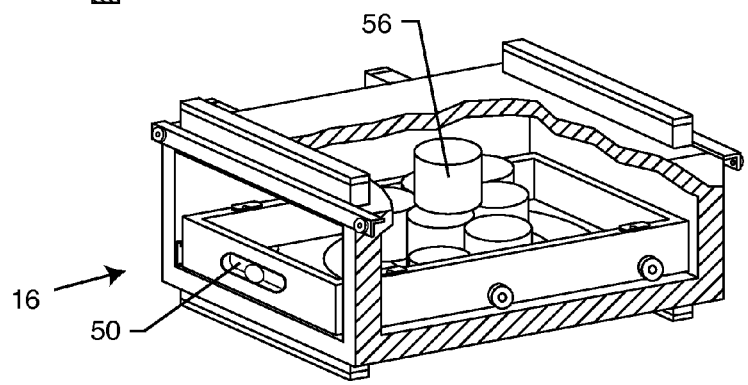
FIG. 13 is a view similar to FIG. 10, further illustrating containers within a drawer of the storage unit.

With reference to FIGS. 10 and 12, another visual means for identifying balance is illustrated. This is referred to herein as the "bulls-eye" method wherein concentric circles are formed in the bottom of the storage unit 16 or drawer 14. The inner most concentric circles 54 could be painted green, and then surrounding circles yellow, even further surrounding circles orange, and the outermost circles red. In addition, a free-floating disc or the like could be placed between the bottom panel of the storage unit 16 or drawer 14 and a clear floor such that if the storage unit 16 were unbalanced, the free-floating disk would travel into an orange or red area, indicating to the end user that the storage unit 16 was imbalanced. In this manner, as illustrated in FIG. 13, items 56 could be placed towards the center of the storage unit 16, or in a substantially uniform manner, such that the storage unit 16 would be more or less balanced.

Other means of balancing the storage unit 16, to the extent necessary, may be used. For example, each storage unit 16 could attach to a movable weight that slides on an independent track. The movable weight is used to counter the imbalance of weight within the storage unit 16 itself in both the X and Y planes. Placing the weight on an independent track minimizes the potential for binding since the storage unit 16 moves along the tracks 20 and 22 on wheels 38.

Figure 14:
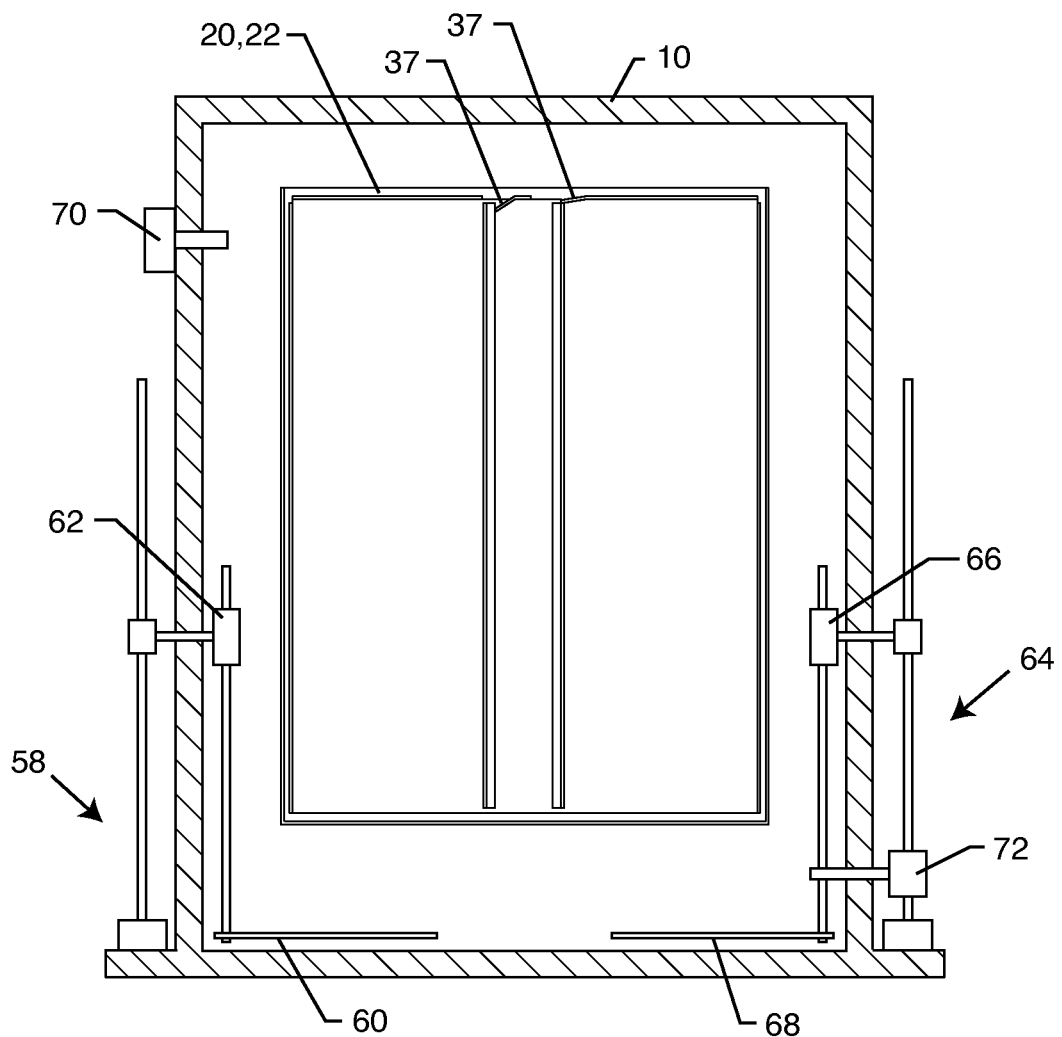
FIG. 14 is a diagrammatic view of a storage system with power-driven actuators positioned about the single track system.

With reference now to FIG. 14, the operation of the system with respect to the single track system will now be described. As discussed above, the tracks 20 and 22 are typically disposed within a housing and/or other structure, such as a cabinet or behind a wall. These structures may extend into a ceiling or span multiple floors. Although the tracks 20, 22 appear to be completely suspended within the structure 10, it will be understood that support members or the like hold the tracks 20 and 22 in place within the structure 10. The storage units 16, as illustrated and described above, are suspended and stacked between the parallel tracks 20, 22 so as to be at least partially supported by the tracks 20 and 22.

Actuators are used to move the storage units. Typically, as discussed above, the actuators are operated with control circuitry and are power-driven so as to be capable of lifting substantial weight. However, as will be more fully discussed herein, it is also possible to have a manual back-up system.

The system includes a first vertical actuator 58 which, as will be more fully described herein, serves to lift a column of storage units. The vertical actuator 58 includes an arm 60 which is selectively moveable over an arc, typically approximately a 90° arc, so as to be positioned below the storage units or to the side of the storage units. The vertical actuator 58 can comprise a linear actuator, such as that offered by Jaeger Industrial Co., Ltd., under the SuperTak trade name. Such linear actuators are capable of lifting 500 or even 1000 pounds. When a vertical linear actuator is utilized, a rotary actuator 62 is also required to rotate the arm 60 over its arc under and away from the storage units. Other vertical actuators 58 are also feasible, such as those referred to as "pick and place" actuators which are capable of both vertical as well as rotary motion. The cost and design of the system may dictate whether a "pick and place" actuator or multiple actuators 58 and 62 are utilized. Similarly, a second vertical actuator 64, and if necessary a second rotary actuator 66 to rotate a second arm 68, is disposed on the opposite end column to lower the stacked storage units 16, as will be more fully described herein.

A horizontal actuator 70 is disposed towards an upper left portion of the system and positioned so as to extend a ram or rod inwardly to move a storage unit 16 horizontally, as will be more fully described herein. Similarly, a horizontal actuator 72 is positioned in the lower right hand corner of the system so as to be positioned to push a storage unit 16 from a bottom position of one column to an adjacent column, as will be more fully described herein. This positioning, of course, relies upon a clockwise rotation or sequence of the storage units. If another sequence is desired, the actuators 58, 64, 70 and 72 are repositioned accordingly.

It will be appreciated by those skilled in the art that the system does not necessarily need to have a certain or predefined start position or sequence. Typically, the storage units 16 travel in either a clockwise or counter-clockwise manner. The position of the storage unit 16 does not need to be placed at a start point or the like. Instead, the storage unit 16 can be moved from their current position until the desired storage unit is accessible.

Figure 15:
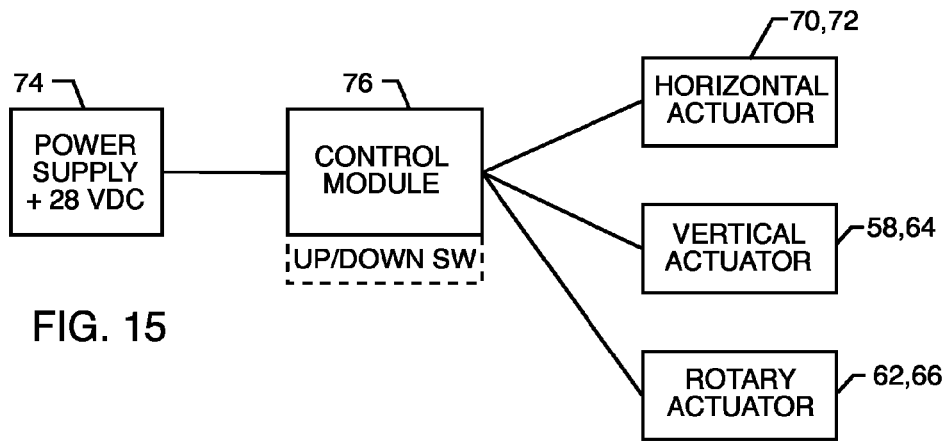
FIG. 15 is a diagrammatic view illustrating control of the power-driven actuators.
Figure 16:
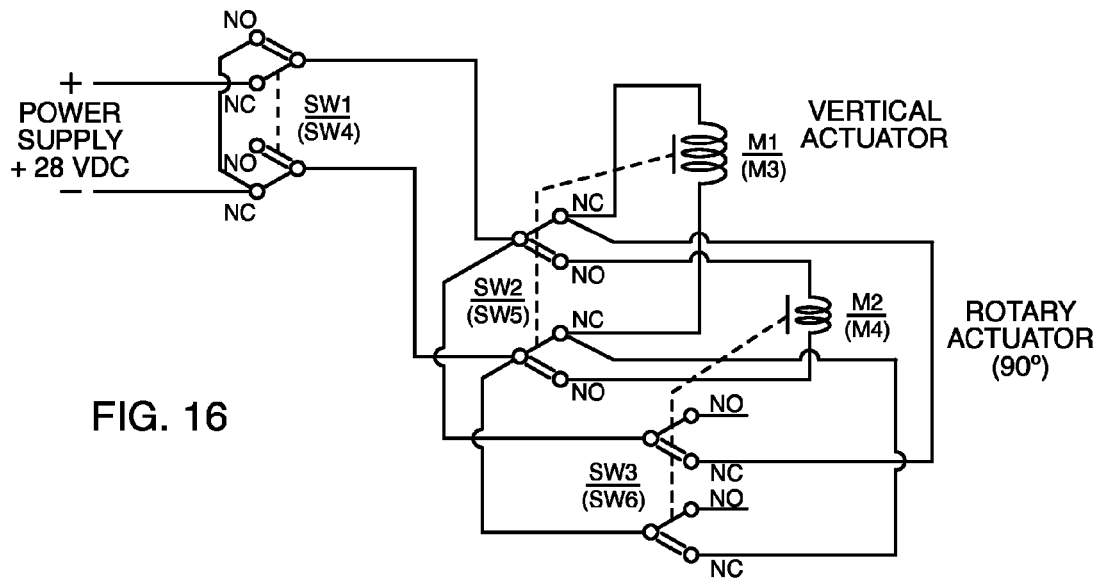
FIG. 16 is an electronic schematic illustrating the control circuitry for vertical and rotary actuators.
Figure 17:
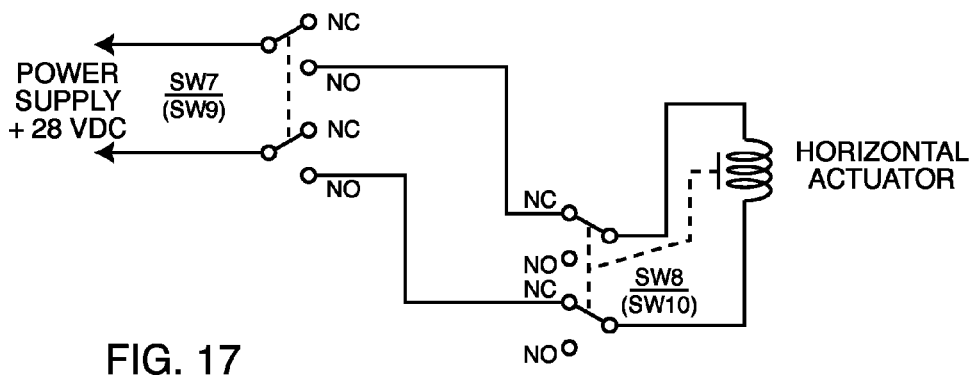
FIG. 17 is an electronic schematic of the control circuitry for operating the horizontal actuators.

In a preferred embodiment, the actuators are power-driven. As such, control circuits control the timing and movement of each of the actuators 58, 64, 70 and 72. With reference now to FIG. 15, a power supply 74, such as a 28 volt direct current power supply, supplies power to a control module 76 (e.g. controller 18 in FIG. 1) which controls the horizontal actuators 70 and 72, the vertical actuators 58 and 64 and the rotary actuators 62 and 66, if necessary. The controller 18 may include a power switch to power the control module 76 to cause the storage units 16 to rotate until the desired storage unit is available and accessible to the individual. Alternatively, circuitry can be implemented such that a particular storage unit 16 may be moved into a particular location, as determined by the individual. The control module 76 would then power on the actuators 58, 62, 64, 66, 70 and 72, if necessary. FIGS. 16 and 17 illustrate switches, such as the double-pole, double-throw switches which would be sequentially activated to supply power to the respective actuator. The control module 76 would determine the timing of such switch activation.

The operation of the system will now be described with reference now to FIG. 18. In the configuration illustrated, for exemplary purposes in this application, two columns having essentially ten vacancies or spaces S1-S10 are provided. Storage units 16 occupy all but one of these vacancies, as described above. It will be readily understood by those skilled in the art that regardless of the configuration of number of storage units, columns, etc., there must be one vacancy in order to sequentially move the storage unit 16. Accordingly, as will be described more fully herein, the vacancy is either present at the uppermost or lowermost position of the end columns.

Figure 18:
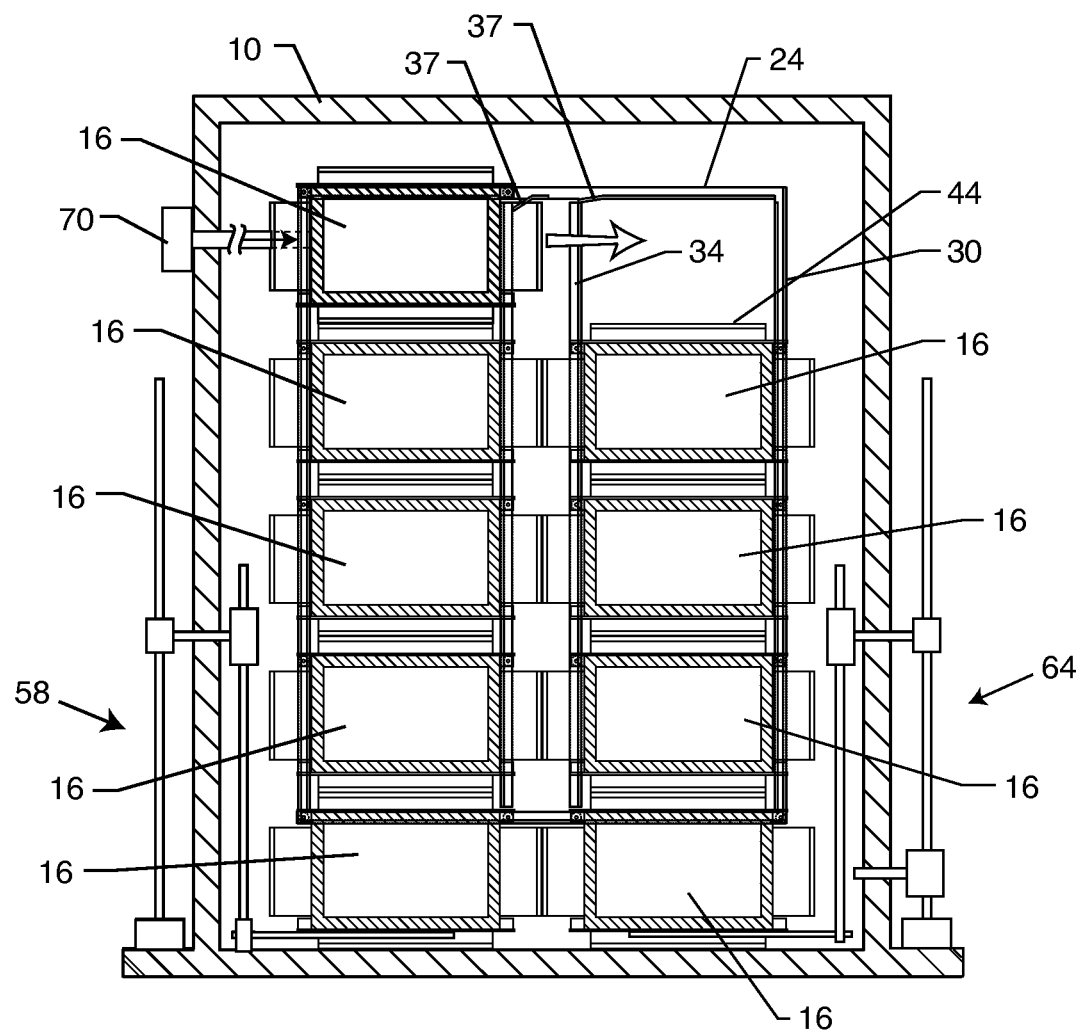
FIG. 18 is a diagrammatic view similar to FIG. 14, further illustrating two columns of storage units and the operation of the actuators moving a top storage unit from one column to an adjacent column.
Figure 19:
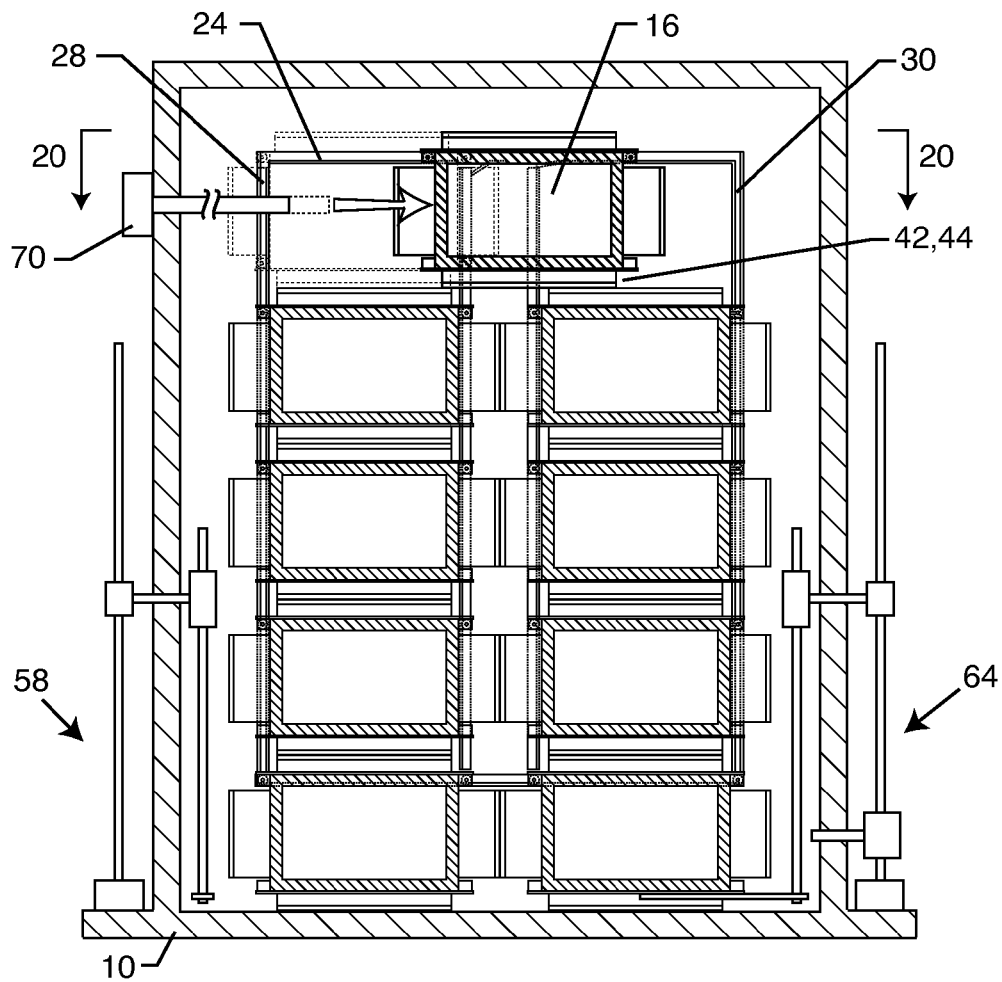
FIG. 19 is a diagrammatic view similar to FIG. 18, illustrating the top storage unit being moved.
Figure 20:
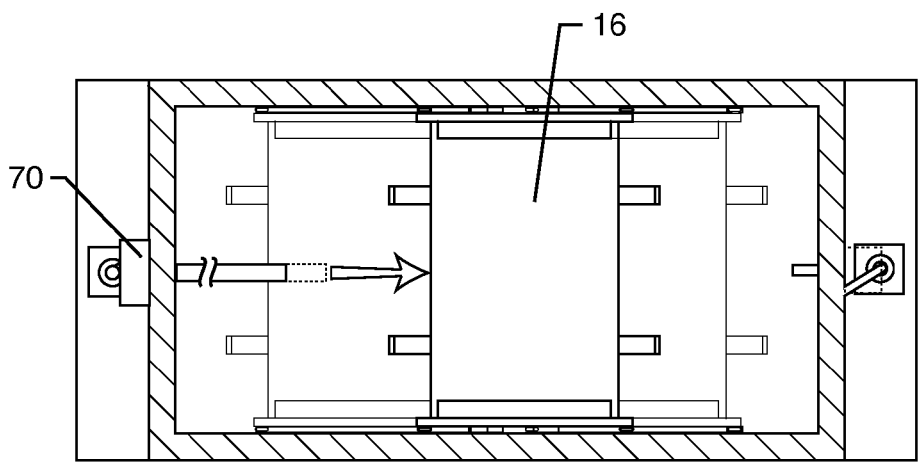
FIG. 20 is a cross-sectional view taken generally along line 20-20 of FIG. 19, illustrating the movement of the storage unit.
Figure 21:
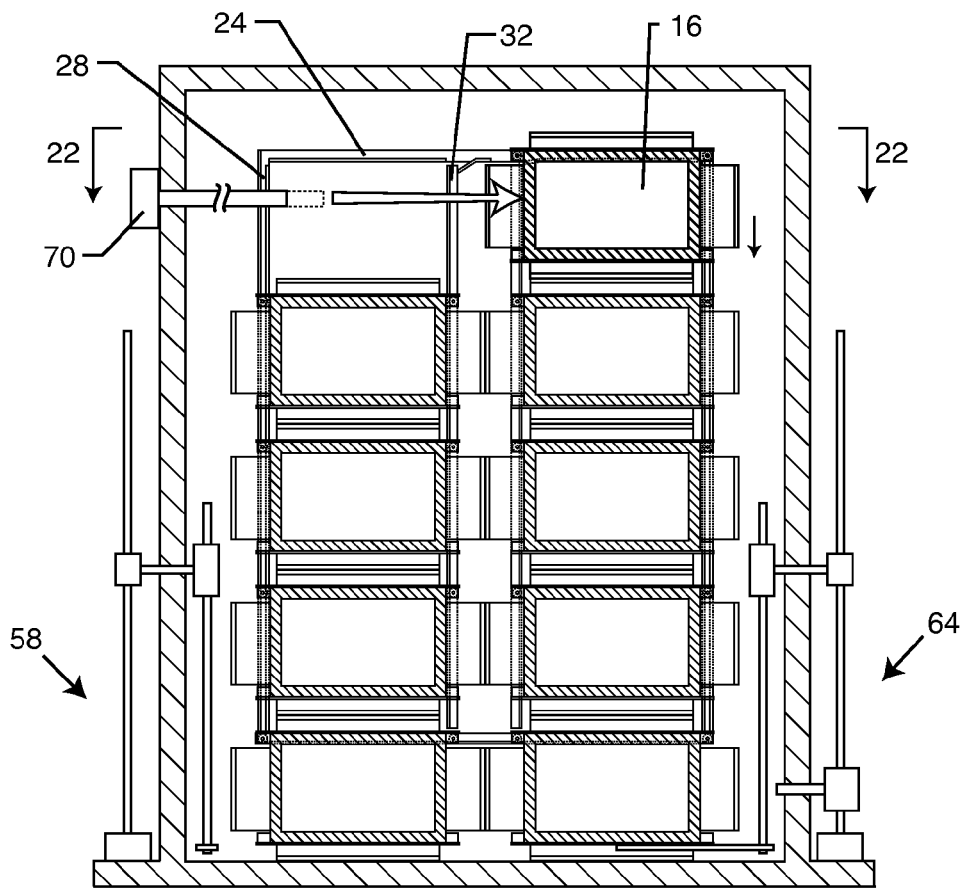
FIG. 21 is a diagrammatic view illustrating the repositioning of the storage unit from one column to another column.
Figure 22:
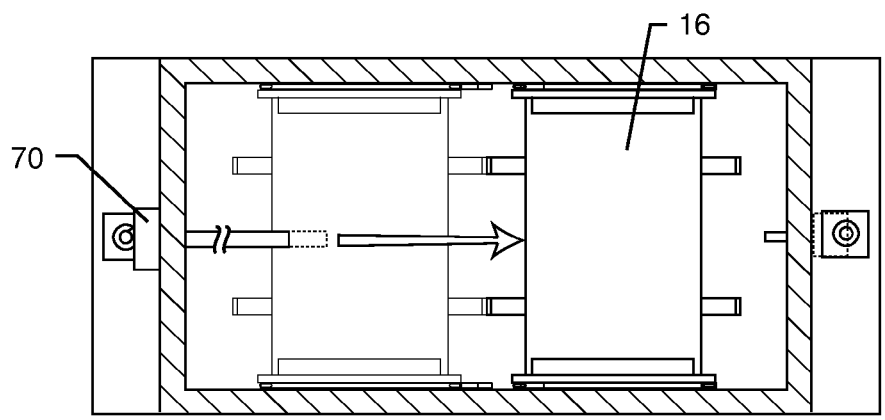
FIG. 22 is a cross-sectional view taken generally along line 22-22 of FIG. 21, illustrating the repositioned storage unit in another column.
Figure 23:
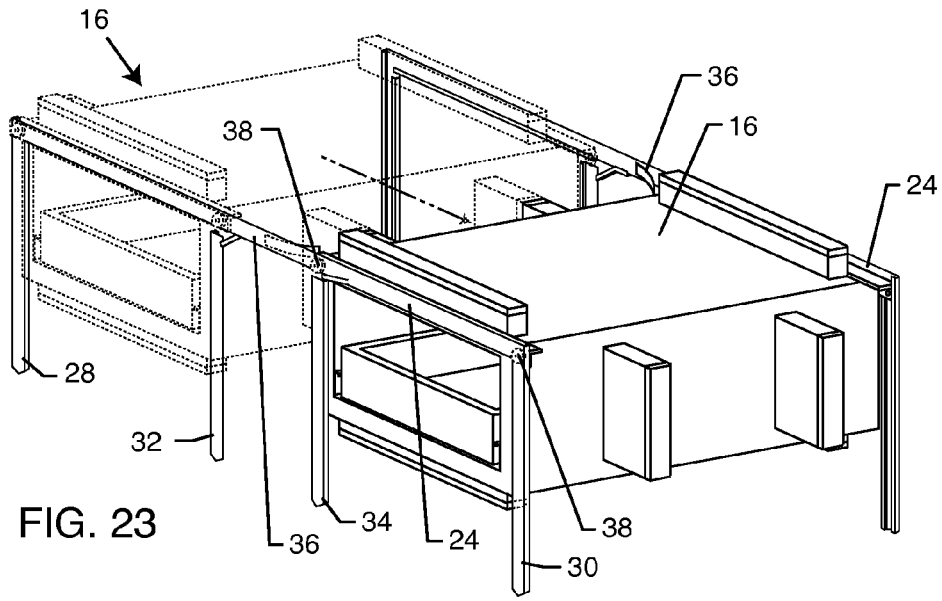
FIG. 23 is a perspective view illustrating the movement of the top storage unit from one column to an adjacent column along the single track system.
Figure 24:
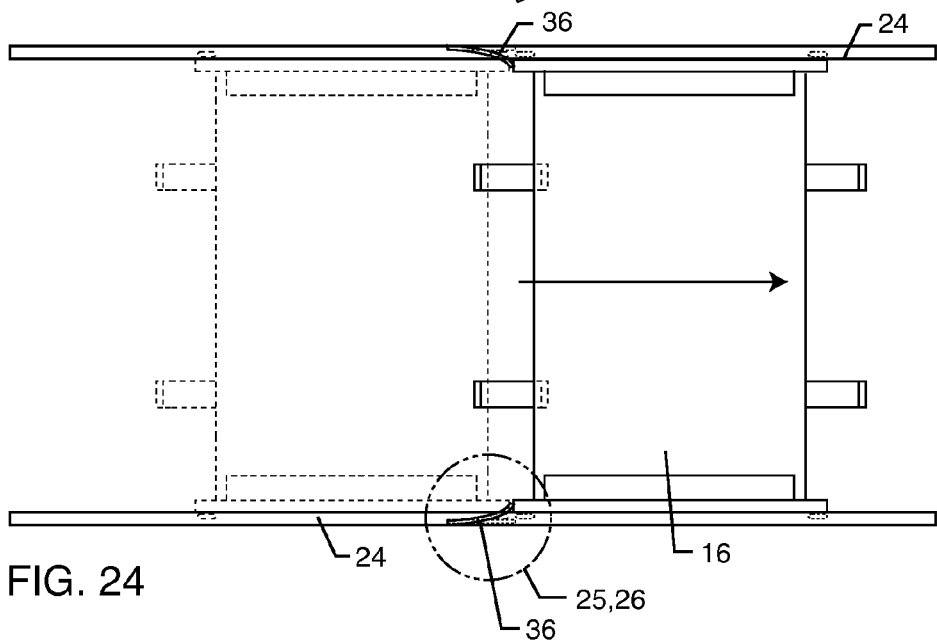
FIG. 24 is a top view of FIG. 23, illustrating the use of stops in the rails of the single track system to prevent reverse travel of the storage unit.

In FIG. 18, a vacancy is present in the upper right hand corner of the second column. When a user desires to have access to a storage unit 16 which is not currently available through an aperture 12, the end user may manually operate the system by depressing a button or the like. Alternatively, the system may automatically retrieve the desired bin when the user inputs the identity of a storage unit into the system through the control module 76. In the illustrated embodiment, the storage units 16 are moved sequentially in a clockwise direction.

Accordingly, control module 76 supplies power to the horizontal actuator 70, such as by activating switches SW7 and SW8. Typically, this will cause horizontal actuator 70 to extend a rod or ram outwardly into engagement with the storage unit 16 occupying space S1, as shown in FIG. 1. The rod or ram comprising the horizontal actuator 70 may telescope so as to be able to extend outwardly, yet telescope inwardly within a relatively small space in a housing or the like. Alternatively, the horizontal actuator 70 may comprise a screw or any other means necessary for physically moving the storage unit 16 as needed. The storage unit 16 is moved along the upper rails 24 of the tracks 20 and 22 and is partially supported by the low friction surface of spacers 42 and 44 until it is fully moved into space or vacancy S2, as illustrated in FIGS. 18-22. Ramps 35 minimize any binding effect of the wheels 38 bridging the gaps in the rails 24 created by the vertical rails 32 and 34.

At this point, the storage unit 16, now residing in space S2, is positioned at the top of the second column. Typically, the storage units 16 are stacked on to one another. This is due to the fact that the wheels 38 of the storage unit 16 travel from the vertical rails 28 and 32, across the upper rails 24, to the vertical rails 30 and 34 and to the second column of storage units. The spacers 42 and 44 are designed to enable an upper storage unit 16 to slide over the lower storage units 16 and into the desired position thereby avoiding contact with nearby storage units.

With reference now to FIGS. 23-26, in the single track system, the stop 36 is operably disposed on both of the upper rails 24 of the tracks 20 and 22. The purpose of the stop 36, as described above, is to prevent the storage unit 16 from traveling backwards once it has been moved into position. This is merely a precaution in the event that the overall system is not completely level, or that the storage unit 16 would reverse its course when the rod of the horizontal actuator 70 retracts.

Figure 25:
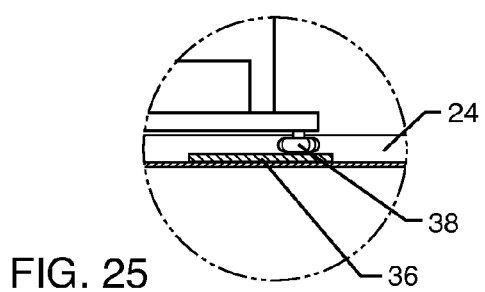
FIG. 25 is an enlarged view of area "25" of FIG. 24, illustrating the stop deflected as a wheel of the storage unit passes thereby.
Figure 26:
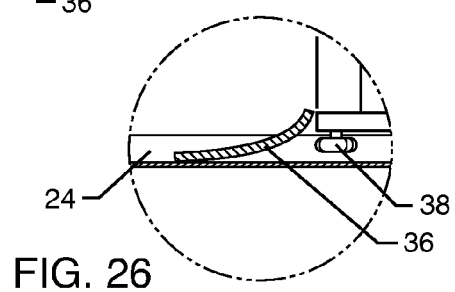
FIG. 26 is an enlarged view taken generally of area "26" of FIG. 24, illustrating the stop biased outwardly to prevent reverse travel of the storage unit.

As can be seen in FIGS. 23-26, the stop 36 is typically biased away from the rail 24. Preferably, the stop 36 comprises a leaf spring. As the storage unit 16 moves past the stop, as illustrated in FIG. 25, the stop 36 deflects into and against the rail 24 to permit the wheel 38 to pass thereby. Once the wheel 38 passes by the stop 36, the stop 36 biases outwardly from the rail 24, again, preventing rearward travel of the storage unit 16.

Figure 27:
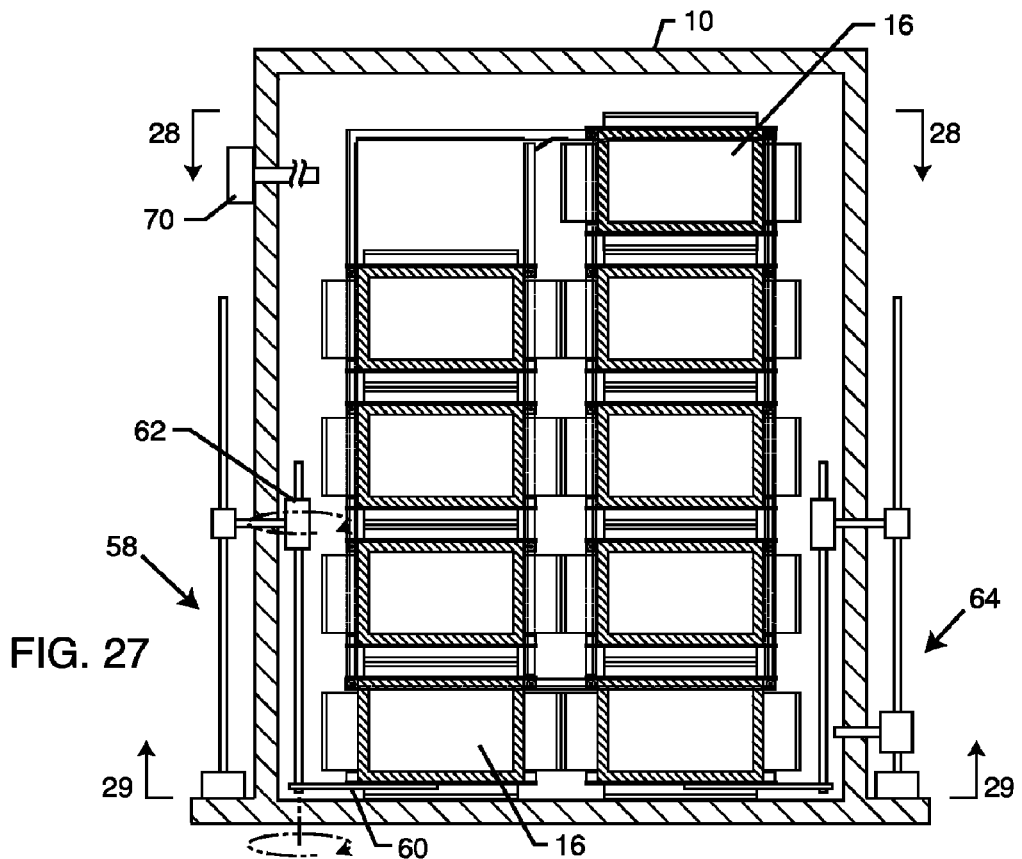
FIG. 27 is a diagrammatic view of the storage system with an actuator positioned below the first column of storage units.
Figure 28:
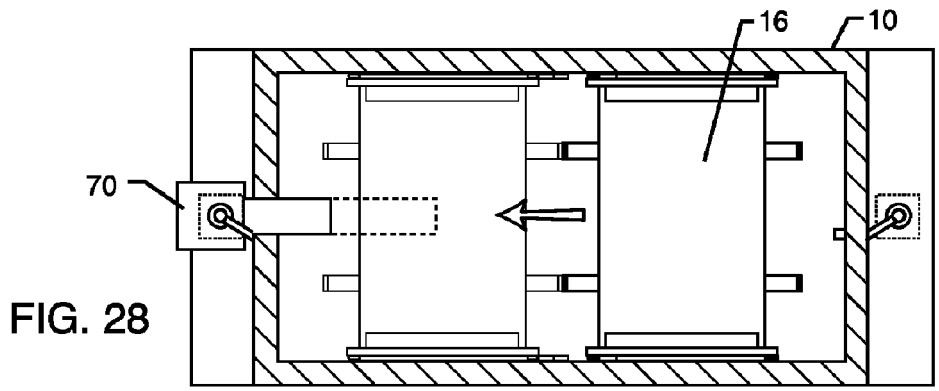
FIG. 28 is a cross-sectional view taken generally along line 28-28 of FIG. 27, illustrating the retraction of a ram of an upper horizontal actuator.
Figure 29:
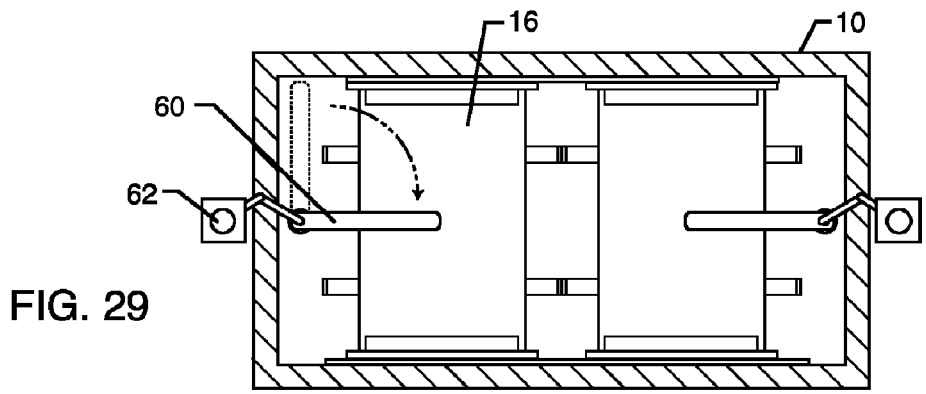
FIG. 29 is a cross-sectional view taken generally along line 29-29 of FIG. 27, illustrating the positioning of a swing arm by a vertical actuator.

With reference now to FIGS. 27-29, after the storage unit 16 moves from the top of the first end column to its adjacent column (in this case the second end column), the control module 76 activates the vertical actuator 58 such that the arm 60 swings approximately 90° to rest under the bottommost storage unit 16 of the first column. In the event that the vertical actuator 58 includes the rotary actuator 62, this would be done, for example, by powering the switches SW1, SW2 and SW3, so as to power the rotary actuator M2.

Figure 30:
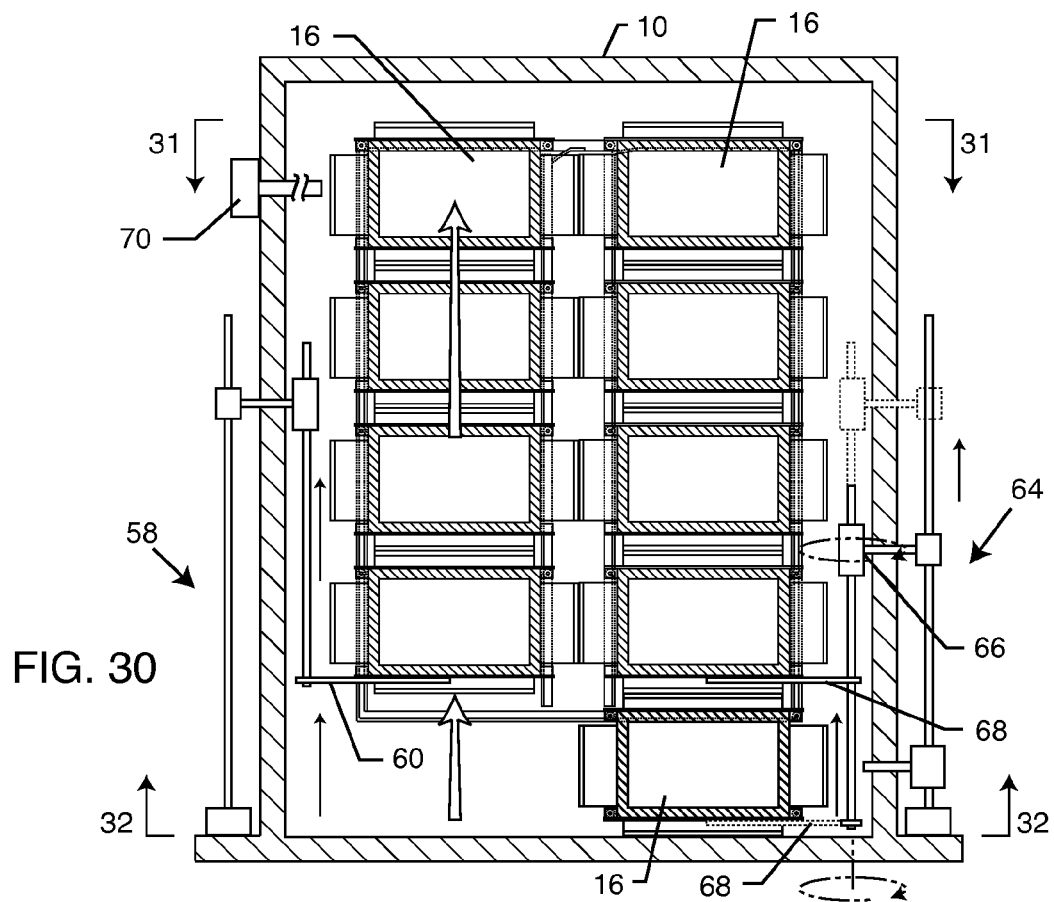
FIG. 30 is a diagrammatic view of the storage system, illustrating a vertical actuator lifting the first column of storage units.
Figure 31:
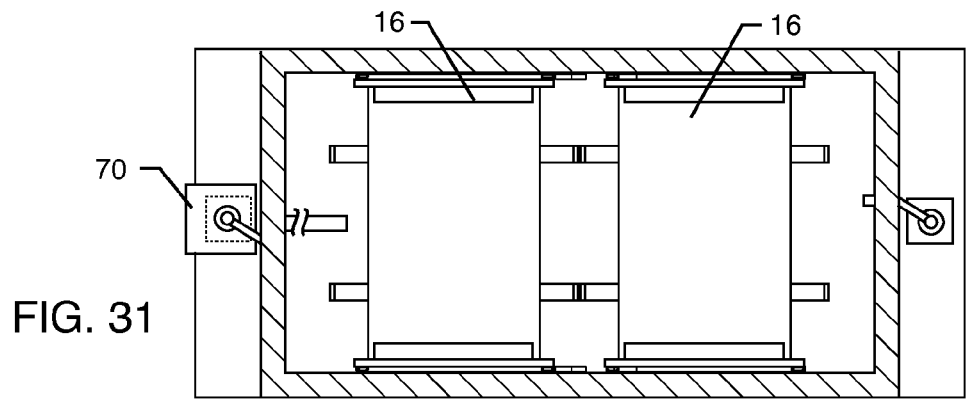
FIG. 31 is a cross-sectional view taken generally along line 31-31 of FIG. 30, illustrating the top two storage units of the adjacent columns.
Figure 32:
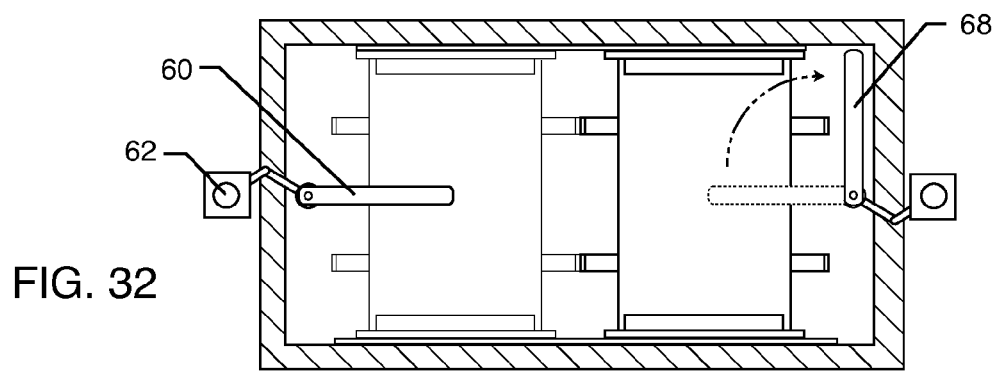
FIG. 32 is a cross-sectional view taken generally along line 32-32 of FIG. 30, illustrating movement of another swing arm by an actuator.

With reference now to FIGS. 30 and 31, once the arm 60 is positioned under the storage unit 16 occupying space S7, with the vacancy in space S1, the vertical actuator 58 activates to lift the first column of stacked storage units 16 such that the uppermost storage unit 16 now resides in space S1, creating a vacancy in space S7, as illustrated.

Figure 33:
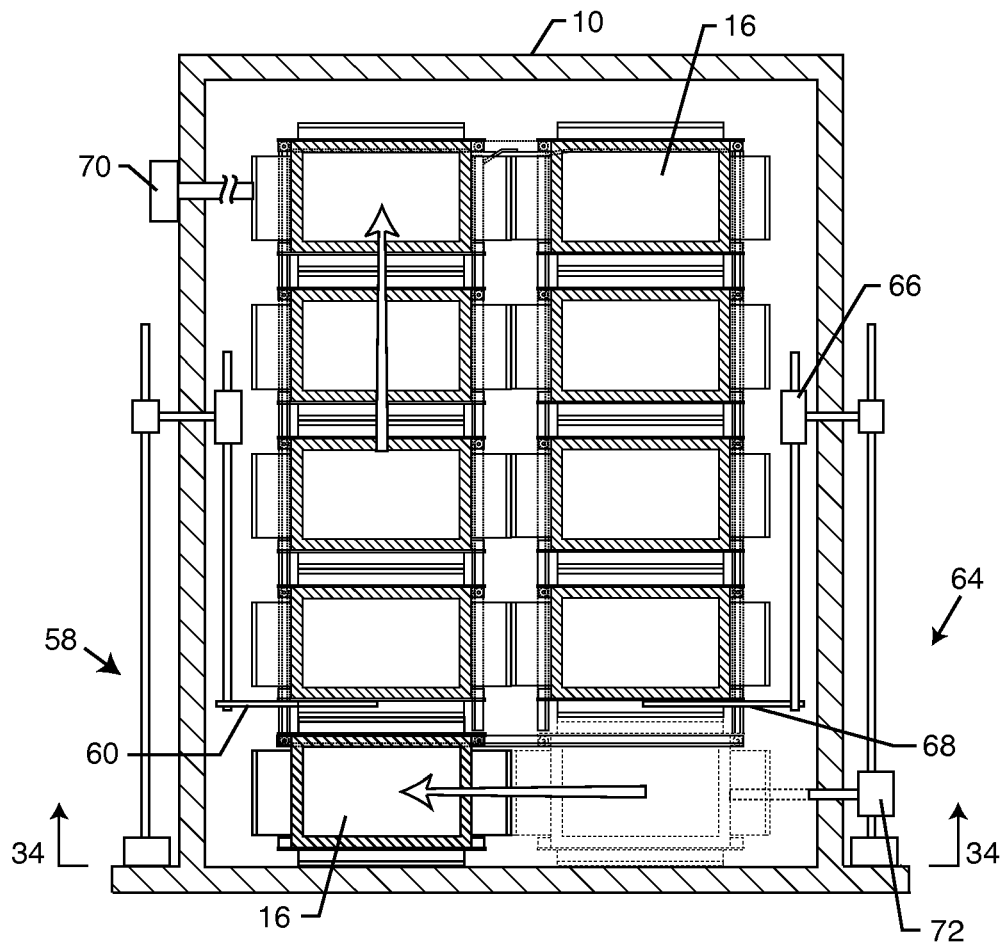
FIG. 33 is a diagrammatic view of the storage system, illustrating the supporting of all but the bottom storage unit of the second column, and the repositioning of the bottom storage unit from one column to another column.

With reference to FIGS. 30-33, preferably simultaneously, or immediately thereafter, the second vertical actuator 64 rotates the second swing arm 68, as necessary, from under the lowermost storage unit in the second column, such as by using the rotary actuator 66 to rotate the arm 68 90 degrees. The vertical actuator 64 then lifts the arm 68 and the rotary actuator 66 repositions the arm 68 under the storage unit 16 immediately above the lowest storage unit 16, as illustrated in FIGS. 30 and 33.

Figure 34:
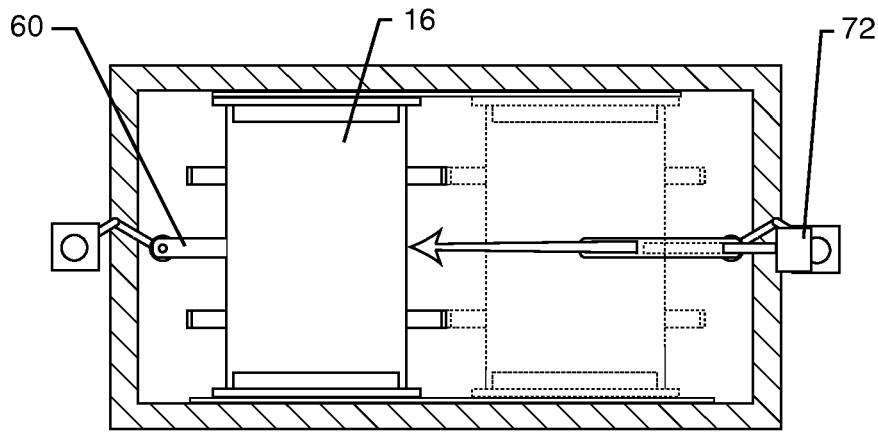
FIG. 34 is a cross-sectional view taken generally along line 34-34 of FIG. 33, illustrating the movement of the bottom storage unit from one column to an adjacent column.

With reference now to FIGS. 33 and 34, the second vertical actuator 64 either holds the stack of storage units 16 in the second column, or slightly lifts the column, with the exception of the bottommost storage unit 16. The second horizontal actuator 72 is now activated. Referring back to FIGS. 15 and 17, this occurs when control module 76 powers the necessary switches, such as switches SW9 and SW10. A rod or ram is then extended outwardly, as shown in FIG. 33, to move the lowermost storage unit 16 from space S6 in the second column to space S7 in the adjacent first column. Stops 36 may be used in the bottom horizontal rail 26, if necessary, to prevent the storage unit 16 from reversing its course, as discussed above.

Once the storage unit 16 moves into the open vacancy at the bottom of the first column, the second column of stacked storage units is lowered, as illustrated in FIG. 35. This can be done using the control module 76 and the vertical actuator switches SW4 and SW5 to activate the vertical actuator M3. This creates a vacancy in space S2, similar to the situation illustrated in FIG. 18. Preferably, simultaneously, or immediately thereafter, the vertical actuator 58 activates so as to rotate the arm 60 out from under the second to the bottom storage unit 16 to either a rest position, as illustrated in FIGS. 35 and 37, or to under the lowermost storage unit end space S7. The process then repeats itself until the desired storage unit 16 is presented within the desired open space 12 for access by the end user.

Figure 38:
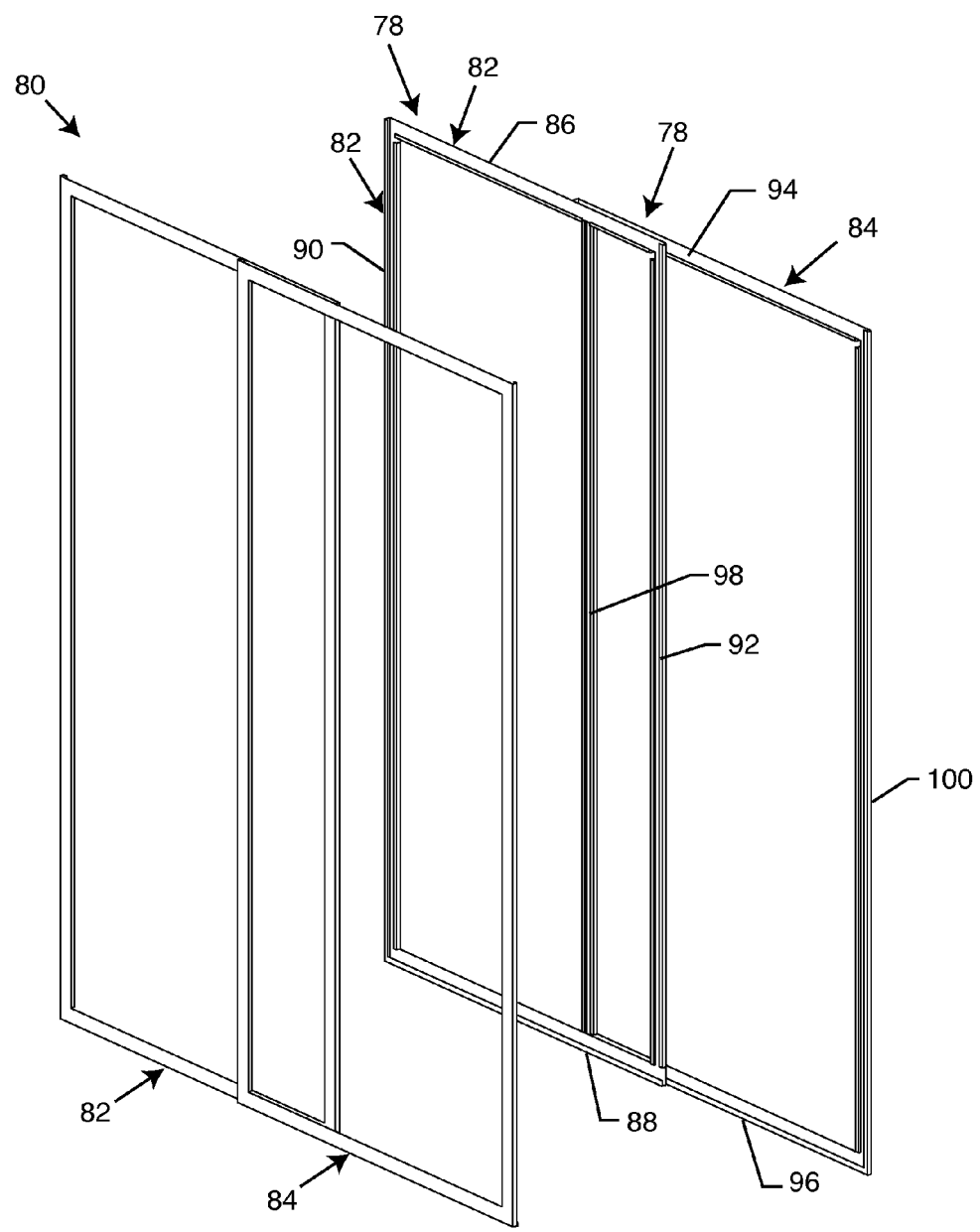
FIG. 38 is a perspective view of a dual track storage system.
Figure 39:
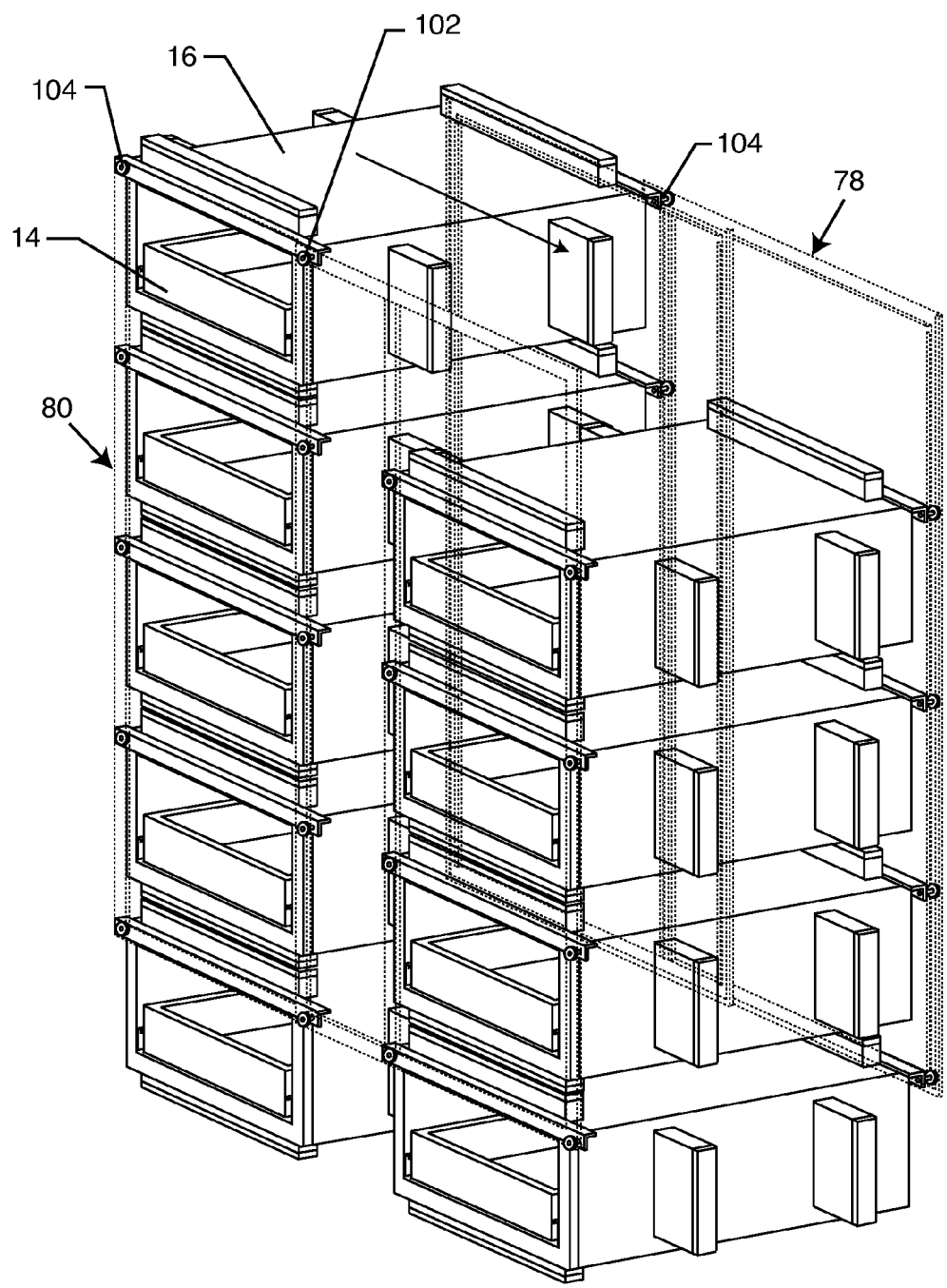
FIG. 39 is a perspective view of a plurality of stacked storage units operably connected to the dual track.

With reference now to FIGS. 38 and 39, a "dual track" embodiment is illustrated and will now be described. The dual track comprises first and second sets of tracks 78 and 80 which are substantially similar mirror images of one another, and spaced apart in generally parallel relation to one another approximately the width or length of a storage unit. Each track 78 and 80 comprises a first rail 82 in a first plane, and a second rail 84 in a second plane so as to be in a slightly overlapping arrangement with the first rail 82, as illustrated in FIG. 38. Essentially, each rail 82 and 84 form a generally circular path. The first rail 82 forms this path with upper and lower rails 86 and 88, as well as vertical side rails 90 and 92. Similarly, the second rail 84 forms a generally circular path with upper and lower rails 94 and 96 as well as vertical side rails 98 and 100. Each rail is generally circular, so as to be continuous and endless. This enables the wheels of the storage unit 16 to ride continuously within the rails 82 and 84, as will be more fully described herein. As mentioned above, the second track 80 is substantially similar to the first track 78 in structure and function.

As illustrated in FIG. 39, multiple columns of multiple storage units 16 stacked on one another operably engage the opposing tracks 78 and 80. The sequence of movement and the operation of the actuators 58, 64, 70 and 72 to selectively move the storage units 16 is described above with respect to the "single track" embodiment.

Figure 40:
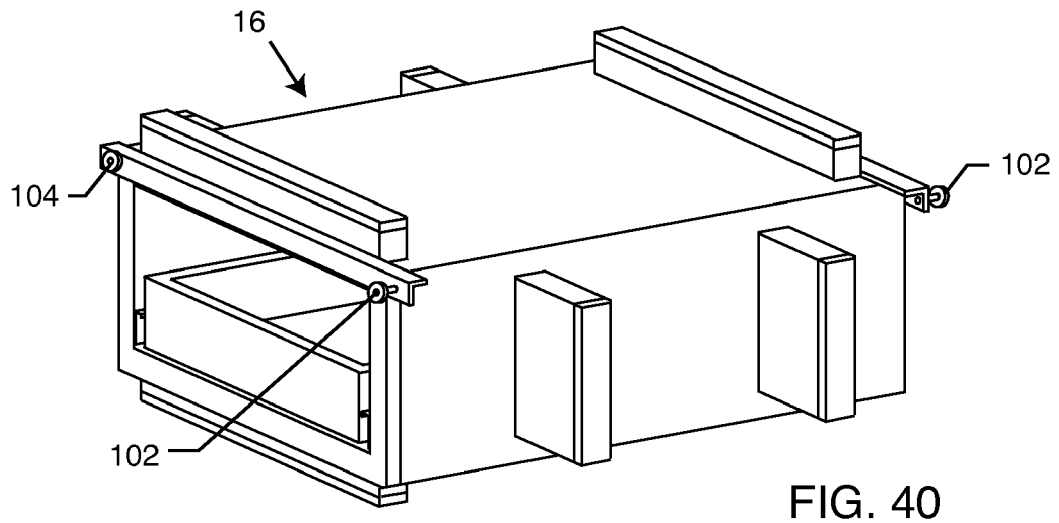
FIG. 40 is a perspective view of a storage unit having sets of wheels extending therefrom for use in the dual track embodiment.
Figure 41:
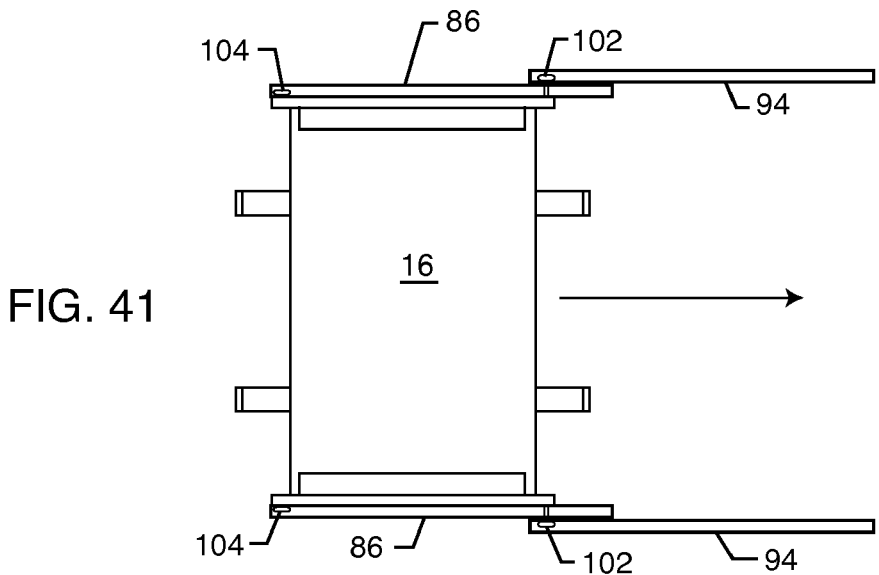
FIG. 41 is a top view illustrating a first set of wheels of the storage unit engaged with a first rail of the dual track.
Figure 42:
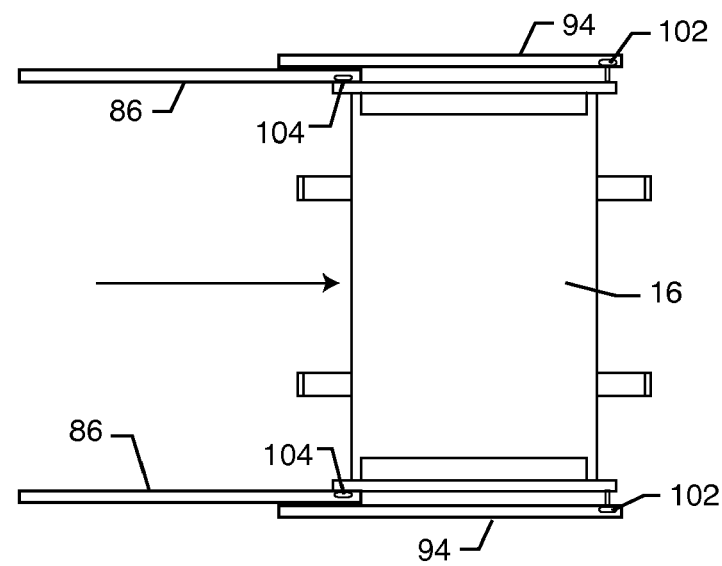
FIG. 42 is a top view illustrating a second set of wheels of the storage unit engaged with a second rail of the dual track.
Figure 43:
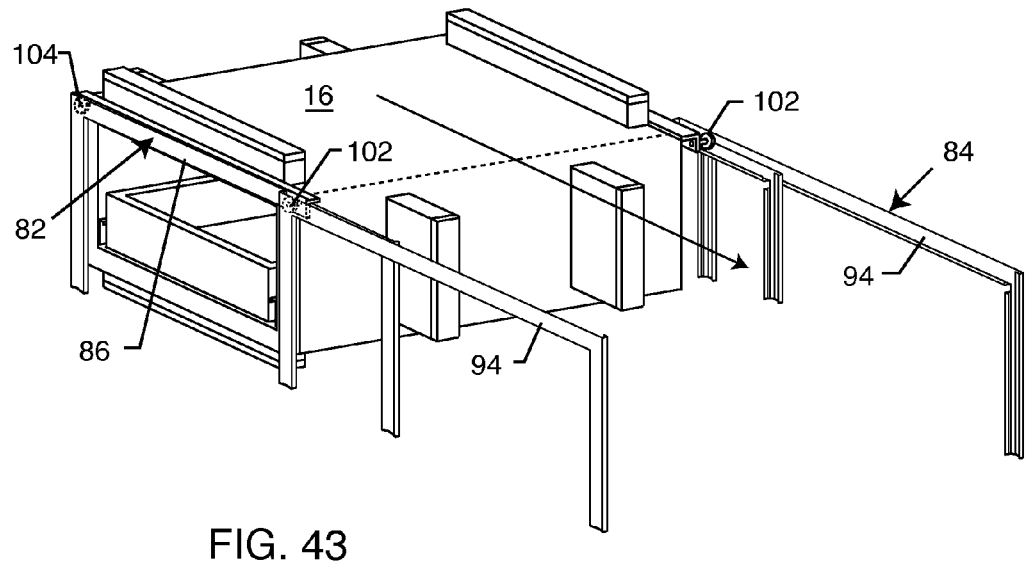
FIG. 43 is a perspective view illustrating movement of the storage unit along the dual track rails.
Figure 44:
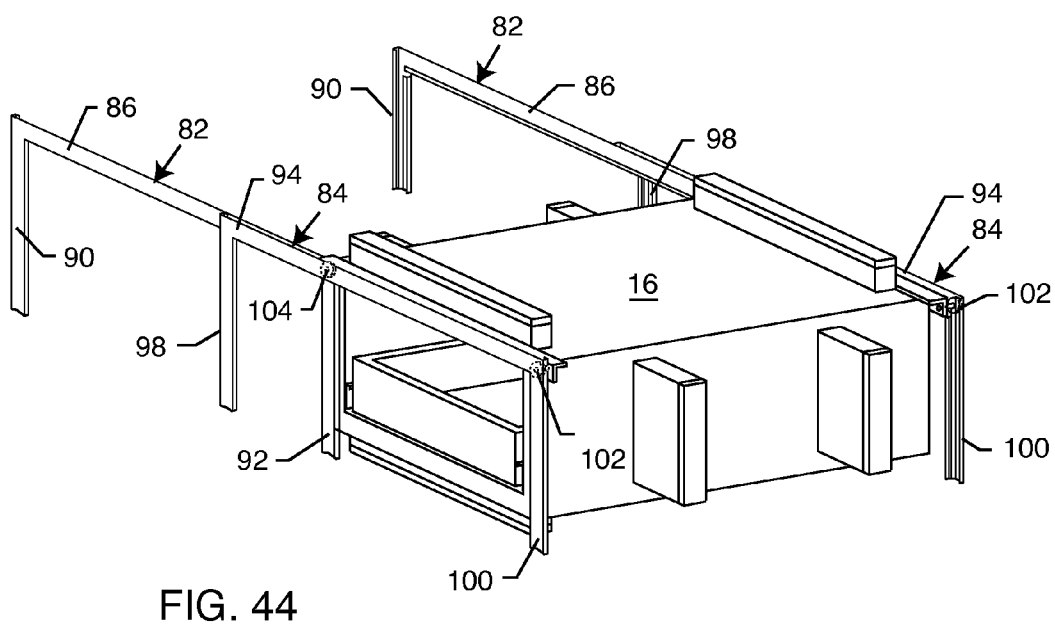
FIG. 44 is another perspective view illustrating movement of the storage unit along the dual track rails.

With reference now to FIGS. 40-42, an exemplary storage unit 16 used in this embodiment is illustrated. It will be noted that the storage unit 16 has two sets of wheels, 102 and 104, each set extending outwardly from the storage unit 16 a different distance. In the illustrated embodiment, wheels 102 on one side of the storage unit 16 extend out farther than the wheels 104 on the opposite side of the storage unit 16. Each set of wheels 102 and 104 reside and travel within a separate rail 84 and 82 of the track 78 or 80, as illustrated. Thus, the front wheels 102 travel in track or rail 84, including sub-rail portions 94, 96, 98 and 100. The back wheels 104 travel in the second set of tracks or rails 82, including sub-rail sections 86, 88, 90 and 92. As the rails 82 and 84 are in adjacent planes, the wheels 104 and 102 extend from the storage unit 16 at different distances to engage the respective rails 82 or 84. This will be seen in FIGS. 43 and 44, wherein the wheels 102 are engaged with the upper rail 94 of the second rail 84, while the opposite wheels 104 remain engaged with the upper rail 86 of the first rail 82 while the storage unit 16 is moved from one column to a vacancy in an adjacent column. When traveling downwardly, the first set of wheels 102 travel downwardly on the vertical rail section 100 of the second rail 84, or rails 84, while the second set of wheels 104 travel down the vertical side rail 92 of the first rail 82. When moving horizontally across the bottom of the tracks 78 and 80, the outer wheels 102 engage with the lower rail 96, while the inner wheels 104 engage the lower rail 88. When moving upwardly, the outer wheels 102 travel along the vertical side 98 of the second rail 84, while the inner wheels 104 travel along the vertical side rail 90 of the first rail 82. Thus, the wheels 102 and 104 are in continuous travel and engagement with each respective rail 82 and 84 while the storage unit 16 is moved into the various spaces S1-S10 of the columns.

FIG. 15 illustrates that both the single track and dual track embodiments may be controlled electronically using the control module 76 to power the various actuators in a timed sequence so as to move the storage unit 16, as described above. This requires the power supply 74, typically in the form of a direct current voltage. Thus, a transformer or the like is typically used to transform the 120V or 240V (or 12 volts or 24 volts, if available) alternating current voltage to the appropriate direct current voltage. In the event of a power outage or the like, a battery back-up system may be used to power the control module 76 and the actuators 58, 62, 64, 66, 70 and 72. Such a battery can be built into the system and periodically or continuously recharged, or one or two twelve volt automobile batteries may be connected to the system.

Figure 45:
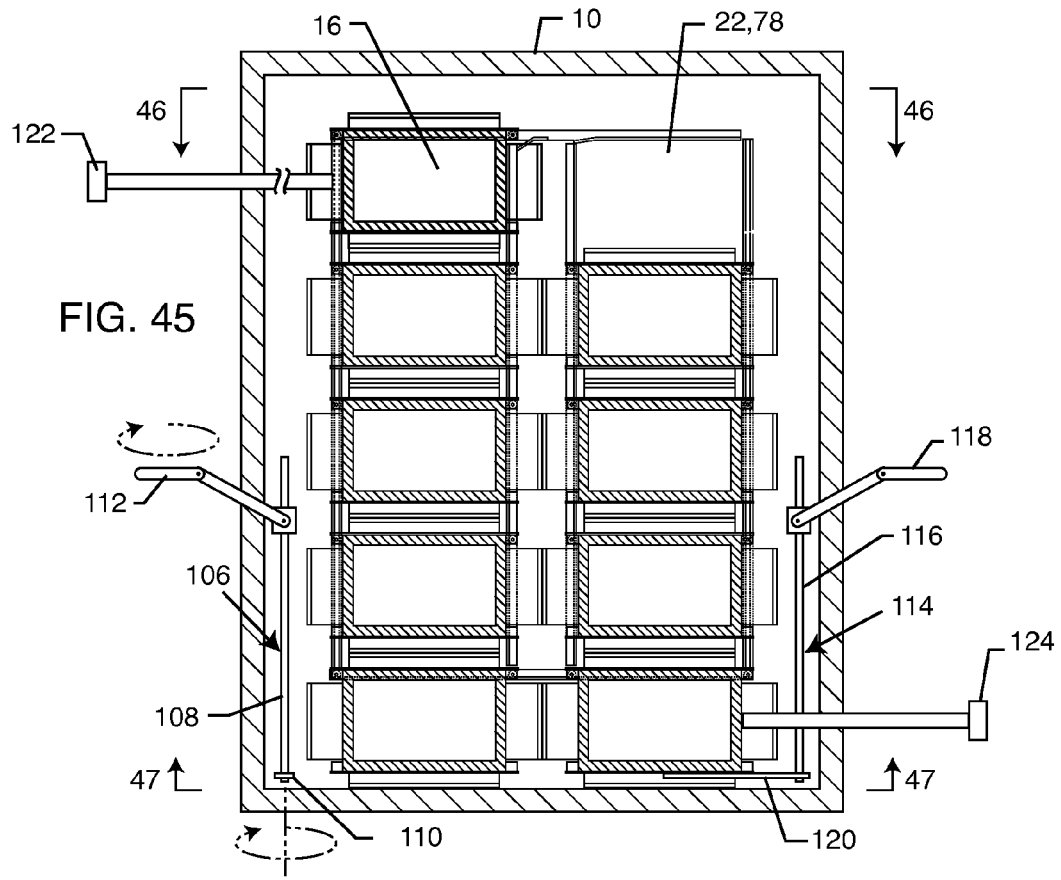
FIG. 45 is a diagrammatic view of the storage system, utilizing a manually operated actuating system.
Figure 46:
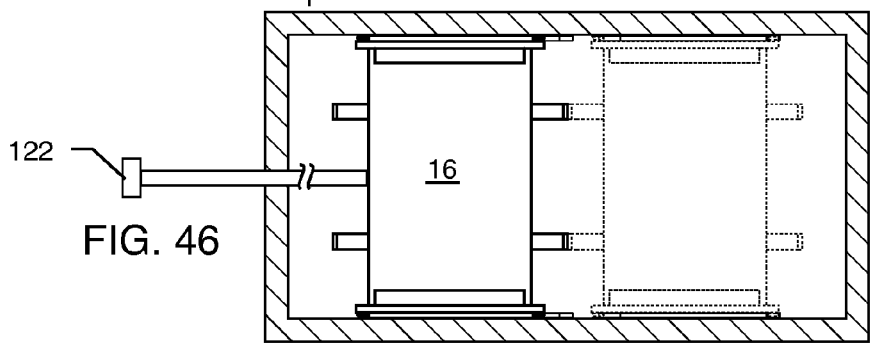
FIG. 46 is a cross-sectional view taken generally along line 46-46 of FIG. 45.
Figure 47:
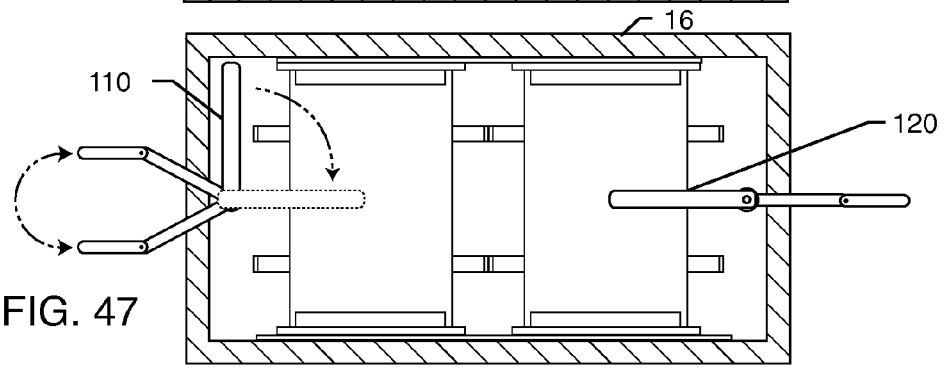
FIG. 47 is a cross-sectional view taken generally along line 47-47 of FIG. 45.
Figures 48, 49, 50:
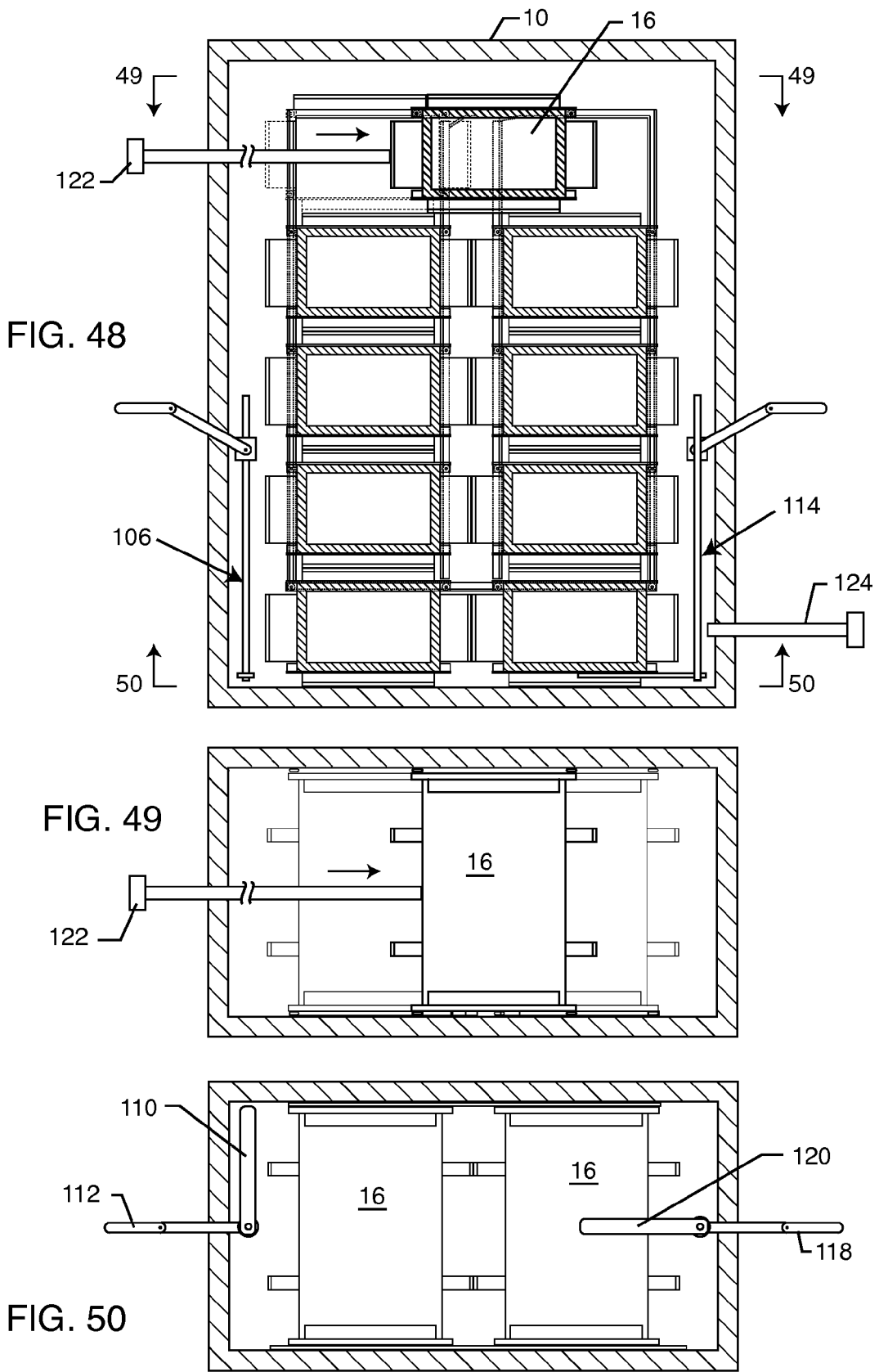
FIG. 48 is a diagrammatic view of the storage system, illustrating the movement of a storage unit from one column to an adjacent second column.
FIG. 49 is a cross-sectional view taken generally along line 49-49 of FIG. 48.
FIG. 50 is a cross-sectional view taken generally along line 50-50 of FIG. 48.

Alternatively, the system can rely upon manual movement of the storage units 16. Such is illustrated in FIGS. 45-64. A plurality of storage units 16 are stacked upon one another in multiple columns within the structure 10, as described above. The structure 10 may be a housing or built within walls and ceilings or spaces within houses and business establishments or the like. Access to the storage units 16 is provided through the sides of the end columns, as illustrated in FIG. 45. It will be understood by those skilled in the art that the manual system can be a separate system entirely, or be incorporated into the power-driven system described above. For example, the manual system may be used in emergency situations where power is not available to drive the power-driven actuators. As such, the manual system will be described herein as if completely separate from the power-driven actuators, although this is not necessarily the case.

A vertical actuator 106 is operably positioned at the lower left hand corner, or the bottom of the first end column. The vertical actuator 106 includes a rod 108 and an arm 110. A lever 112 is used to rotate the arm 110, such as by rotating the rod 108, and lifting the rod 108 and the arm 110. Such may be accomplished by simple mechanical advantage, using lever principles. However, as the storage units 16 may have a considerable amount of aggregate weight, the vertical actuator 106 may take the form of a screw lift or hydraulic lift or jack. A similar vertical actuator 114 is positioned on the lower portion of the opposite end column, as illustrated in FIG. 45. Such would include a rod or screw 116, a lever 118, as well as a swingable arm 120.

The levers 112 and 118 extend through the structure 10 into operable engagement with the vertical actuators 106 and 114, respectively. Similarly, the passageway is available for the insertion of a pair of rods 122 and 124 to move the storage unit 16 from a top position of an end column to a top position in a vacancy of an adjacent column and from one bottom position of a column to another, respectively.

With reference now to FIGS. 45-52, in the manual system, the rod 122 is inserted so as to be in engagement with the top storage unit 16 in the end column. The rod 122 pushes the storage unit 16 along the single or dual tracks to the vacancy (in this case space S2) of the adjacent column, as illustrated. The vertical actuator 106 rotates the arm 110, as necessary, to a rest position insertable underneath the lower most storage unit 16 of the left end column.

Figure 51:
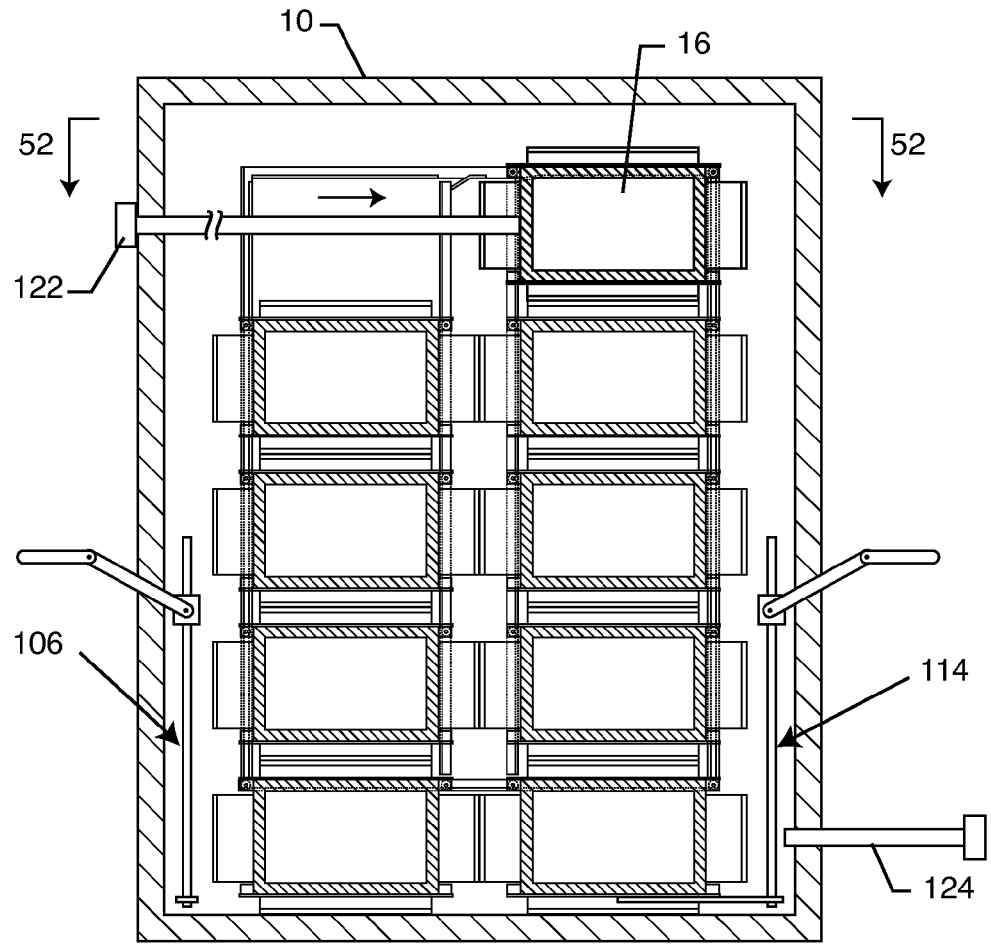
FIG. 51 is a diagrammatic view of the storage system, illustrating the final placement of the top storage unit from one column to an adjacent column.
Figure 52:
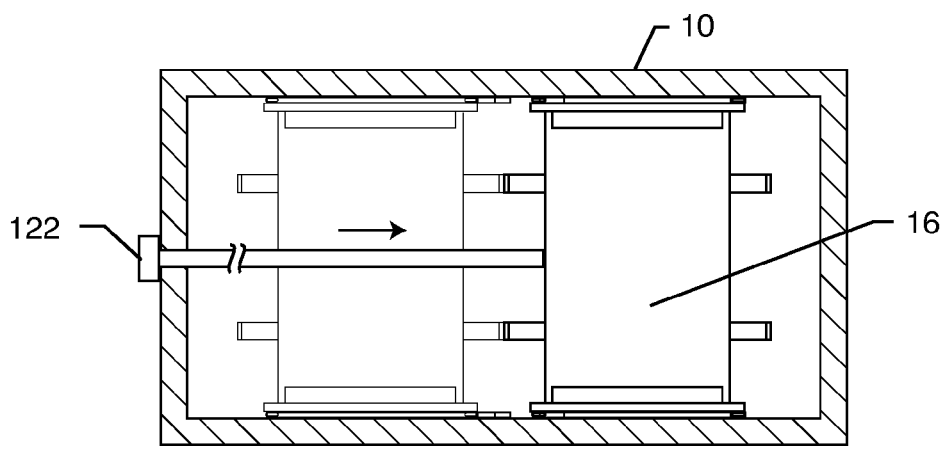
FIG. 52 is a cross-sectional view taken generally along line 52-52 of FIG. 51.
Figure 53:
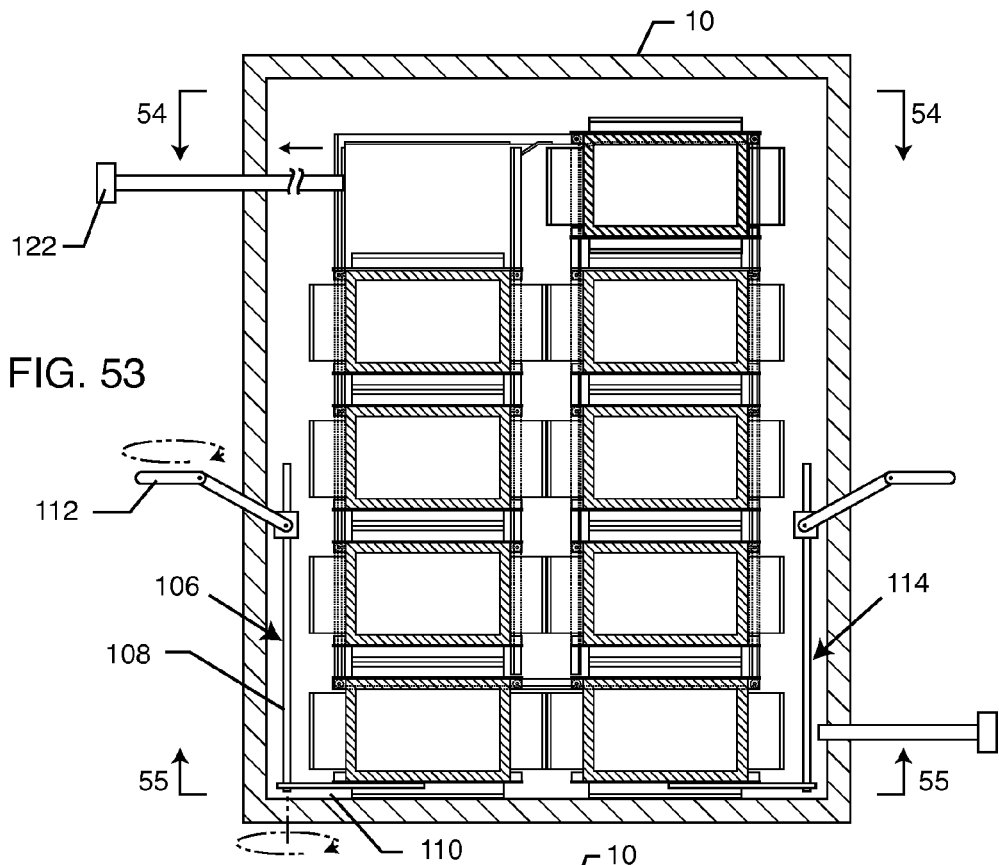
FIG. 53 is a diagrammatic view of the storage system, illustrating placement of a swing arm under the storage units of the first column.
Figure 54:
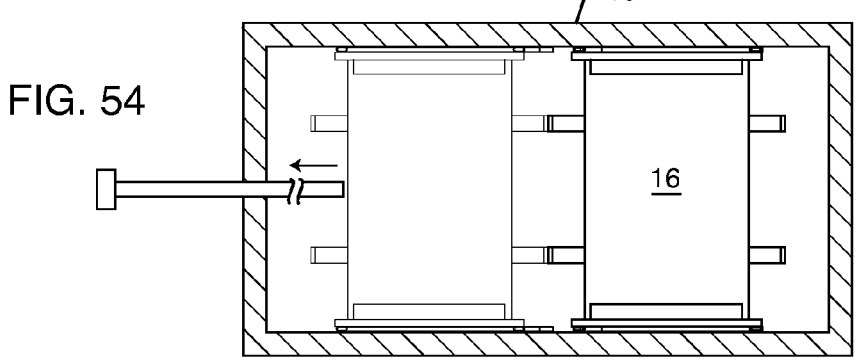
FIG. 54 is a cross-sectional view taken generally along line 54-54 of FIG. 53, illustrating retraction of the upper horizontal actuator.
Figure 55:
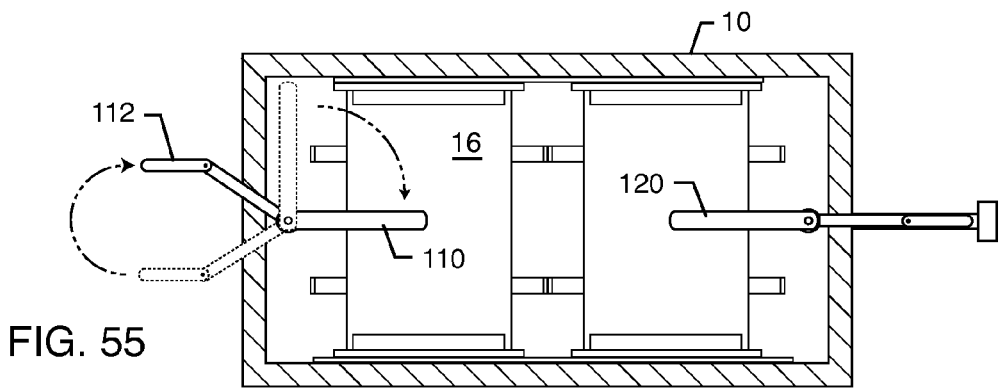
FIG. 55 is a cross-sectional view taken generally along line 55-55 of FIG. 53, illustrating placement of the swing arm under the first column of storage units.
Figure 56:
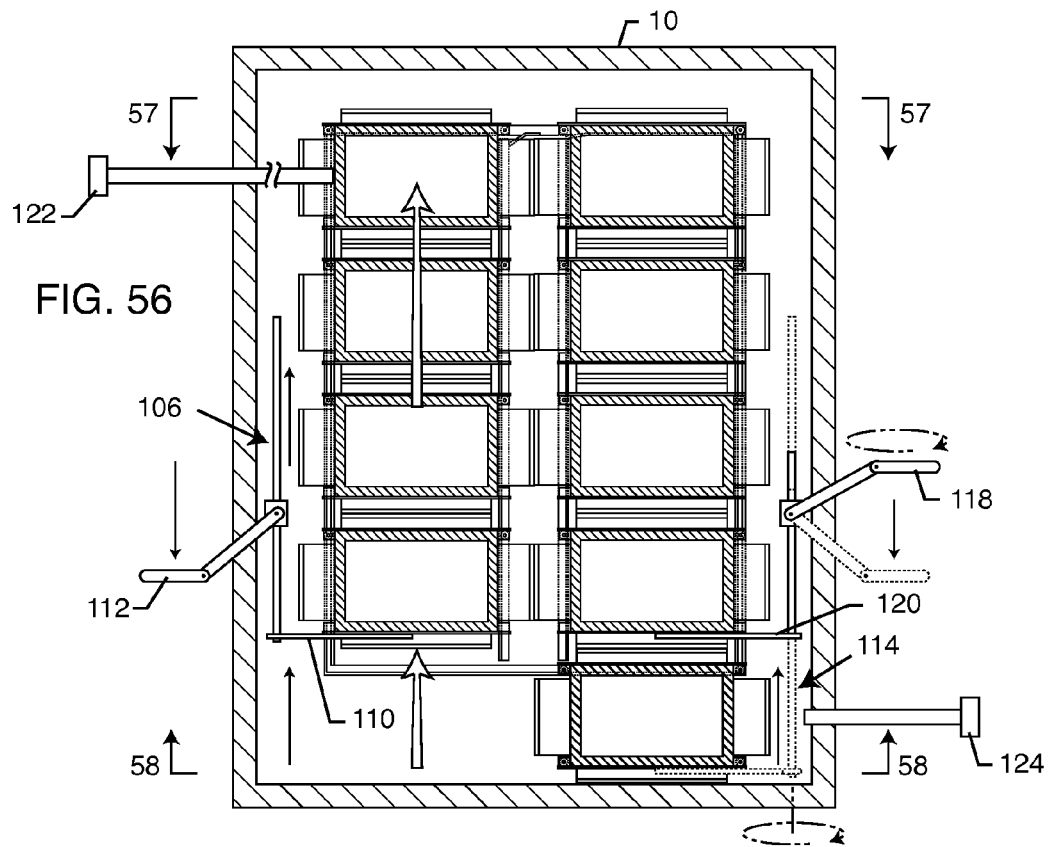
FIG. 56 is a diagrammatic view of the storage system, illustrating the lifting of the first column of storage units using a vertical actuator.

Once the upper most storage unit 16 (space S1) moves from the end column to the vacancy (space S2) in the adjacent column, as illustrated in FIGS. 51 and 52, the rod 122 retracts out of the housing or track path. The arm 110 then swings into position under the storage unit 16 at the bottom of the first end column, as illustrated in FIGS. 53 and 55, using the lever 112. The stack of storage units 16 and the end column is then lifted upwardly to create a vacancy in space S7, as shown in FIG. 56. As discussed above, given the weight of the storage units 16, a screw lift, hydraulic lift or jack may be used in this step.

Figure 57:
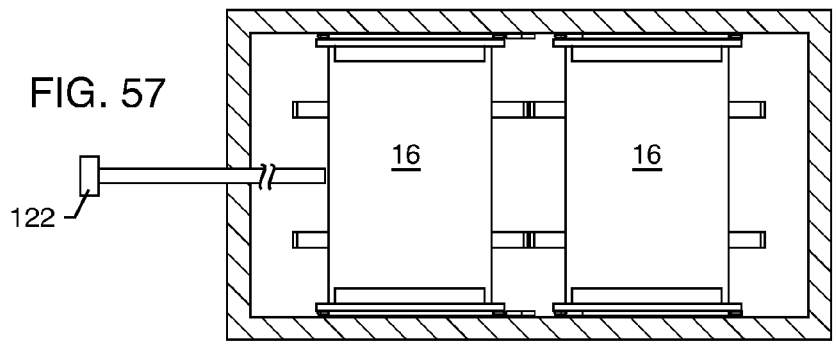
FIG. 57 is a cross-sectional view taken generally along line 57-57 of FIG. 56.
Figure 58:
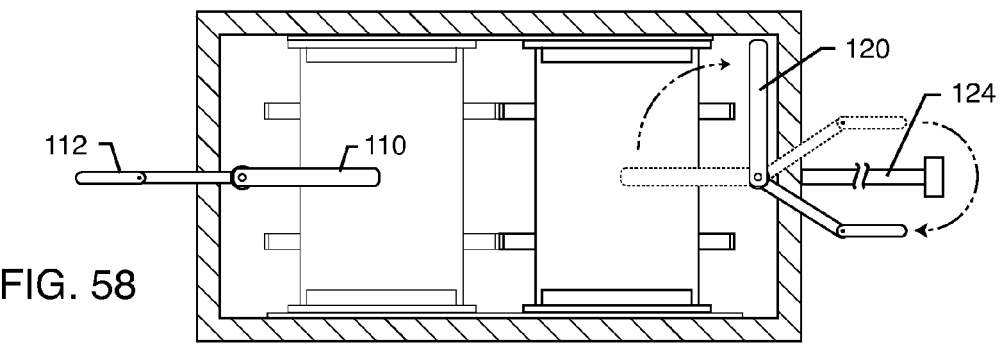
FIG. 58 is a cross-sectional view taken generally along line 58-58 of FIG. 56, illustrating placement of the swing arms.
Figure 59:
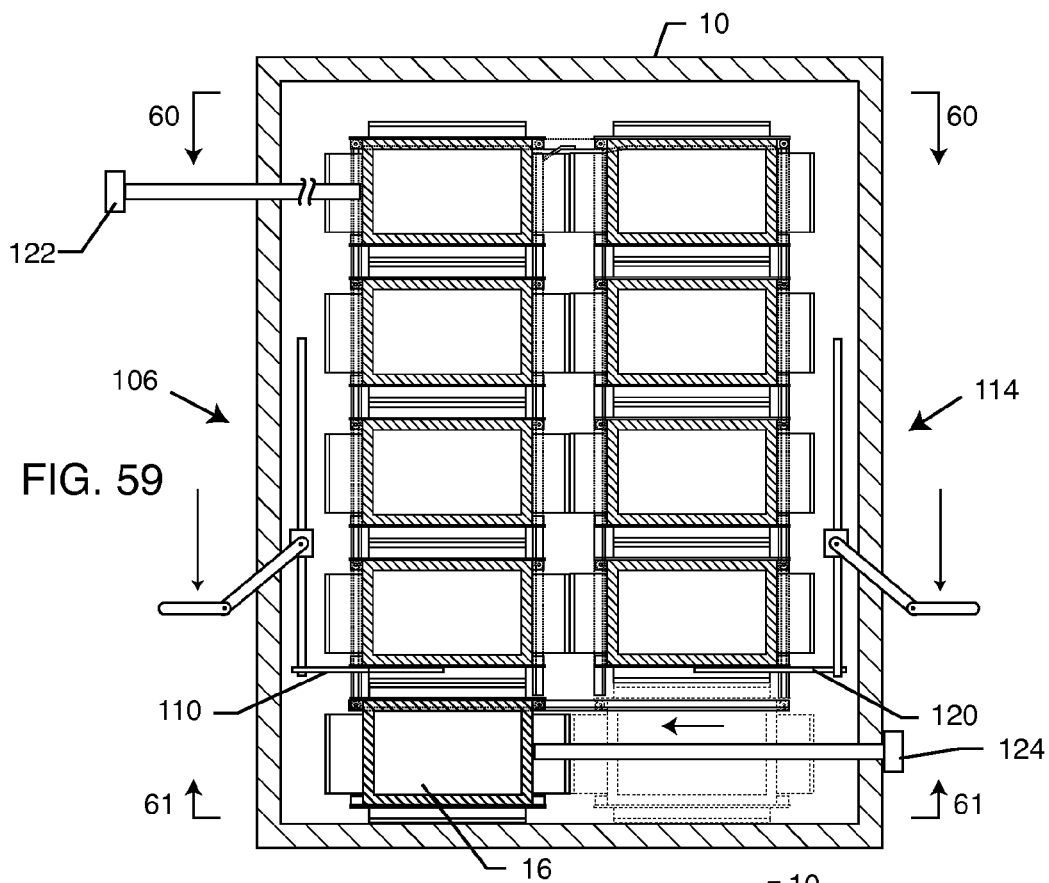
FIG. 59 is a diagrammatic view of the storage system, illustrating movement of a bottom storage unit from one column to another column.
Figure 60:
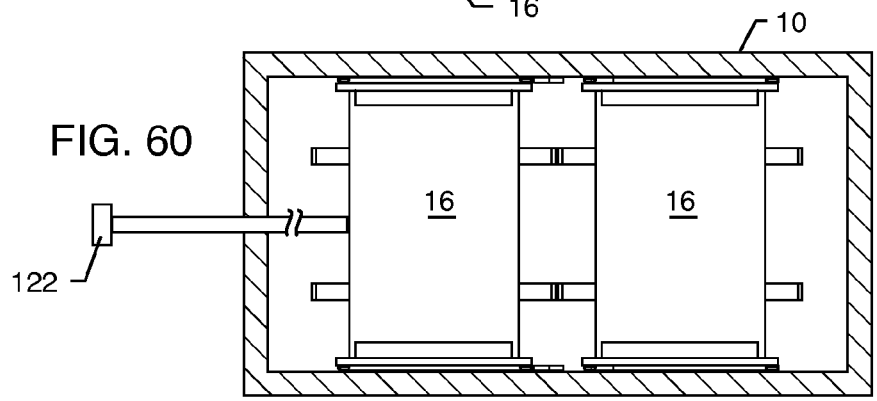
FIG. 60 is a cross-sectional view taken generally along line 60-60 of FIG. 59.
Figure 61:
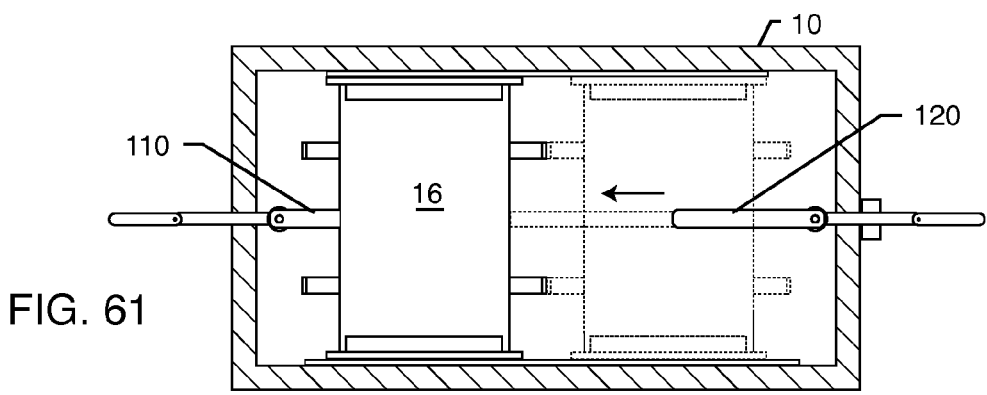
FIG. 61 is a cross-sectional view taken generally along line 61-61 of FIG. 59.

The arm 120 then moves into position using the vertical actuator 114, such that it rests between the two bottommost storage units 16, as illustrated in FIG. 56. The rod 124 pushes the lowermost storage unit from space S6 into space S7 in the first end column, as illustrated in FIGS. 56-59. In FIGS. 56-58, FIG. 58 illustrates an intermediate step in the movement of the handle, levers and arms, with FIG. 56 illustrating an initial and end position of these structures.

Figure 62:
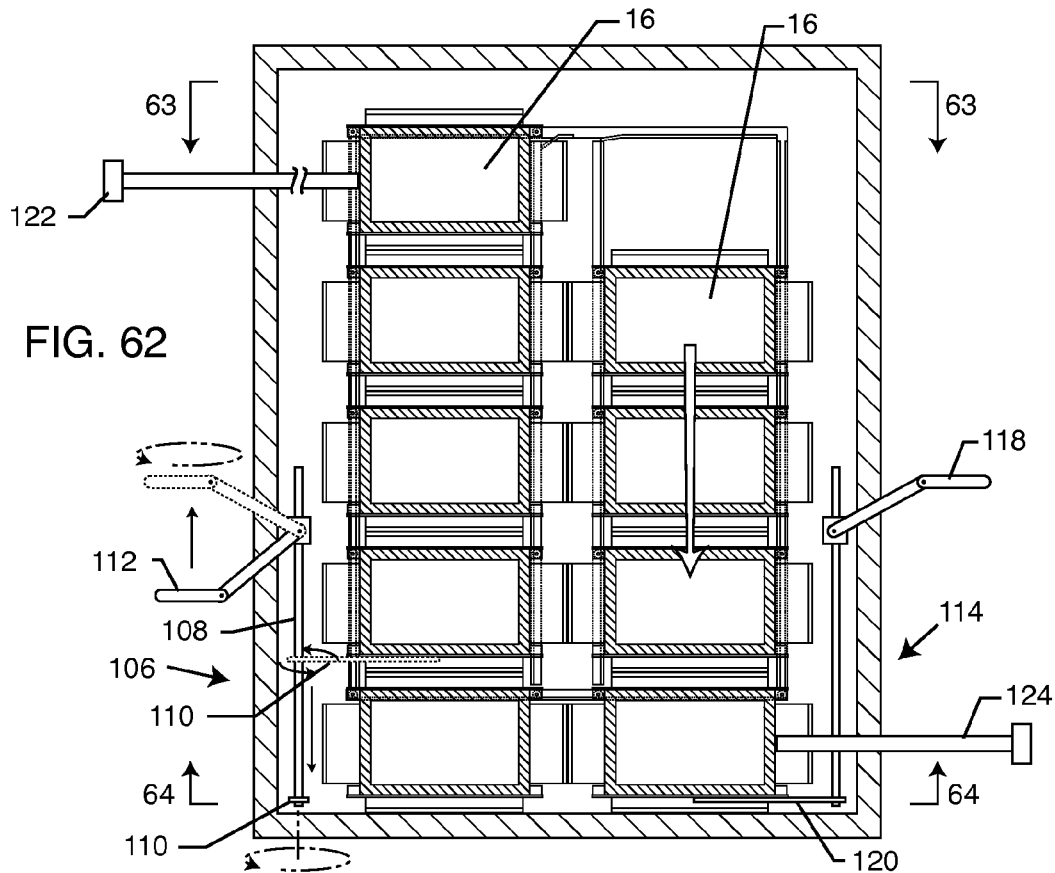
FIG. 62 is a diagrammatic view of the storage system, illustrating the lowering of the second column of storage units.
Figure 63:
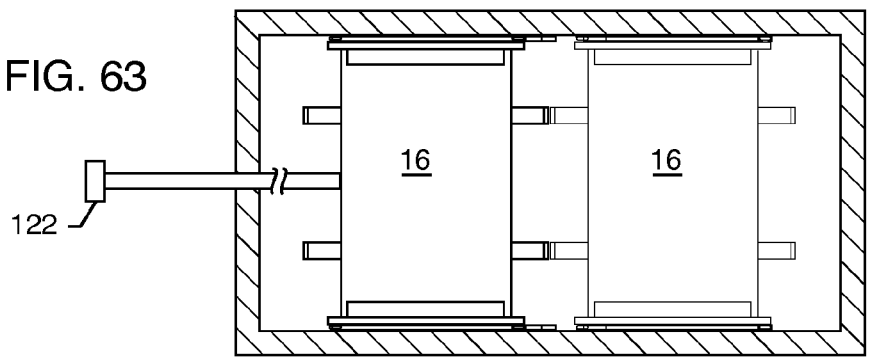
FIG. 63 is a cross-sectional view taken generally along line 63-63 of FIG. 62.
Figure 64:
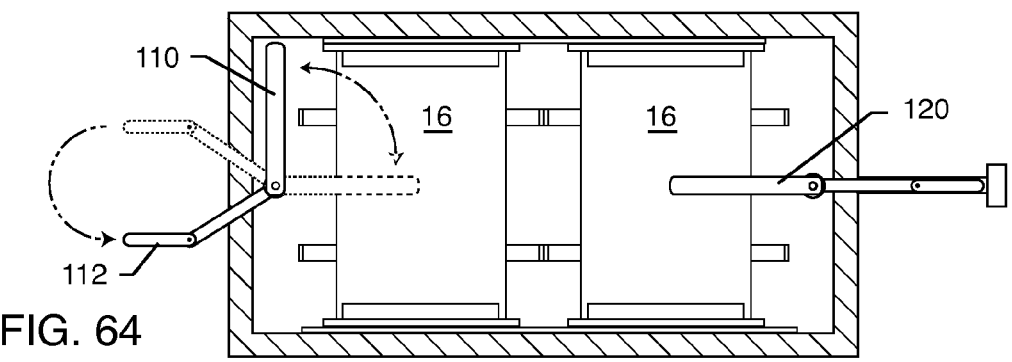
FIG. 64 is a cross-sectional view taken generally along line 64-64 of FIG. 62, illustrating placement of the swing arms.

The rod 124 then retracts away from the track system and the second end column of now four stacked storage units 16 are lowered to create a vacancy in space S2, as illustrated in FIG. 62. Thereafter, the arm 110 pivots, such as by rotating the rod 108 using the lever 112, from the bottom of the second of the lowest stacked storage unit into a rest position, as illustrated in FIGS. 62 and 64. The sequence then repeats as necessary until the desired storage unit is accessible.

Figure 65:
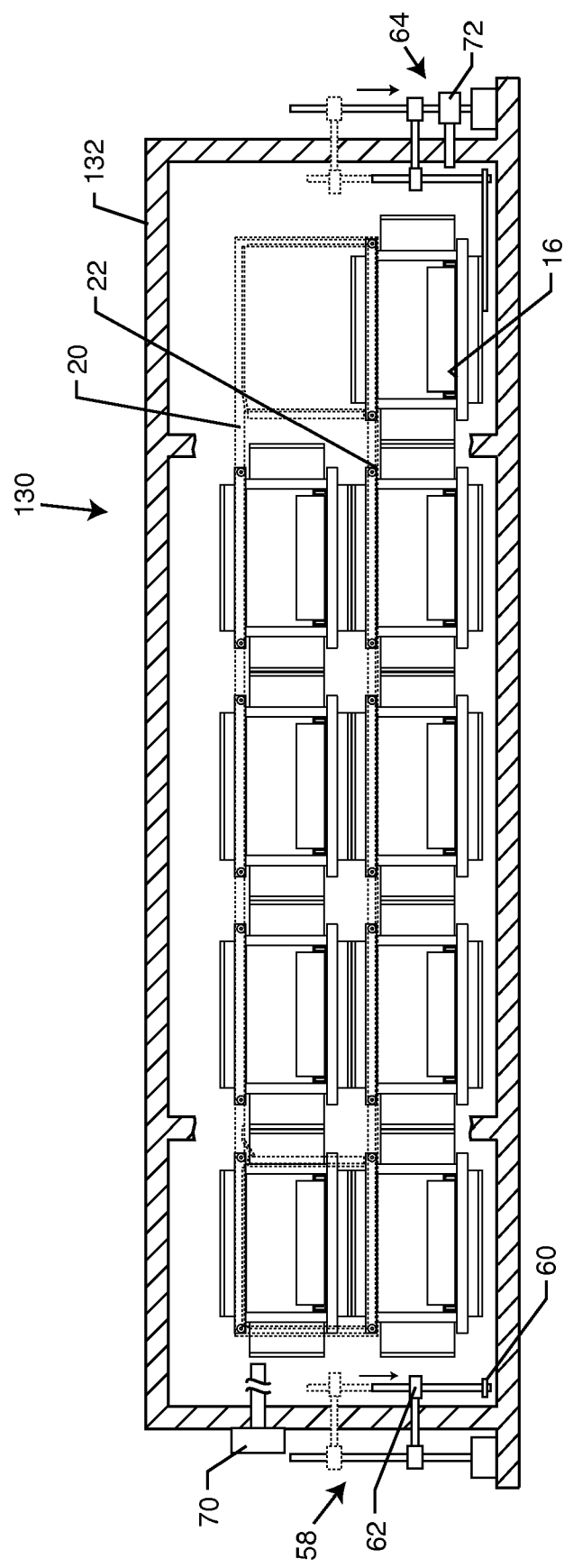
FIG. 65 is a diagrammatic view of a horizontal storage system having two rows of storage units.

In FIGS. 1-64, the system was described as primarily having two adjacent vertical columns. But, a person of ordinary skill in the art will readily understand that this is not the only configuration of the system. For example, with reference to FIG. 65, a horizontal system 130 is shown having two horizontal rows of storage units 16. The storage units 16 may be similar in configuration as described above, and partially supported and slidably movable along tracks 20 and 22. However, in this case, there are only two rows of storage units 16 with a plurality of storage units (in this case five) horizontally aligned. The storage units 16 may be contained within a counter or filing cabinet 132. This configuration is particularly adapted and designed for office drawer systems wherein elongated rows of drawers with a relatively low table or counter space are found. Such applications can also be found in other settings, such as the kitchen where an elongated and relatively low counter is present. The vertical actuators 58 and 64 and the horizontal actuators 70 and 72 are used in a similar manner as described above with respect to FIG. 35 to rotate the storage units 16 to the desired position for access by the end user. The two end columns (in this case only two storage units 16 in height) are lifted, supported, and moved as discussed above. The difference being that instead of a storage unit 16 moving from one vertical column to an adjacent column, the storage unit 16 is moved into a horizontal row of storage units until it is positioned in one of the four corners comprising the vertical columns, as illustrated.

Figure 66:
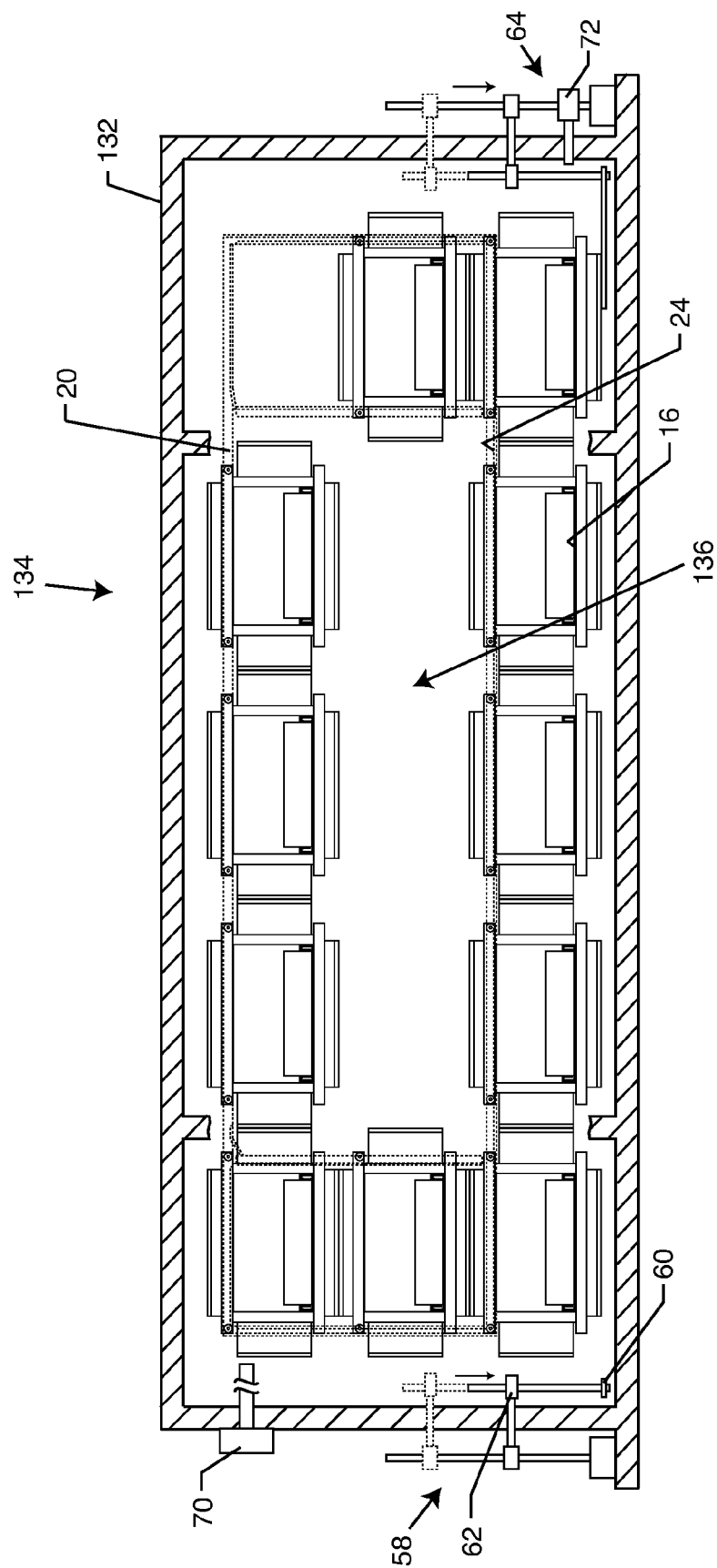
FIG. 66 is a diagrammatic view of an alternative horizontal storage system having three stacked storage units at opposite end columns.

With reference now to FIG. 66, an alternative storage system 134 is shown wherein it will be appreciated that the end columns need not be restricted to two drawers in height. Instead, three or more storage units 16 may form the end vertical columns, with the uppermost and lowermost storage unit 16 resting on the horizontal portions of tracks 20 and 24 to form the elongated row of storage units 16, as illustrated in FIG. 66. In this embodiment, a space or cavity 136 exists between the end columns and the upper and lower rows of storage units 16. The space or cavity 136 is versatile and may be used for storage or to house wiring, an appliance, or other items that are not easily removable, and which must have the alternative storage system 134 built around it. Using an example of a kitchen, the individual storage units 16 can store condiments and other food items. The cavity 136 between the storage units 16 can be a counter or work space, or additional slide-out drawers or the like which house frequently accessed items such as spoons, bowls, etc.

The contents of the individual storage units 16 may be tracked, such as using bar code symbols or the like, so that the contents of any given storage unit 16 are readily ascertainable. A user may access a keypad or electronic interface to determine in which storage unit a given object is located. Alternatively, the user may automatically move a given storage unit 16 into the desired location by inputting its assigned number, scanning a bar code from a product, etc.

Figure 67:
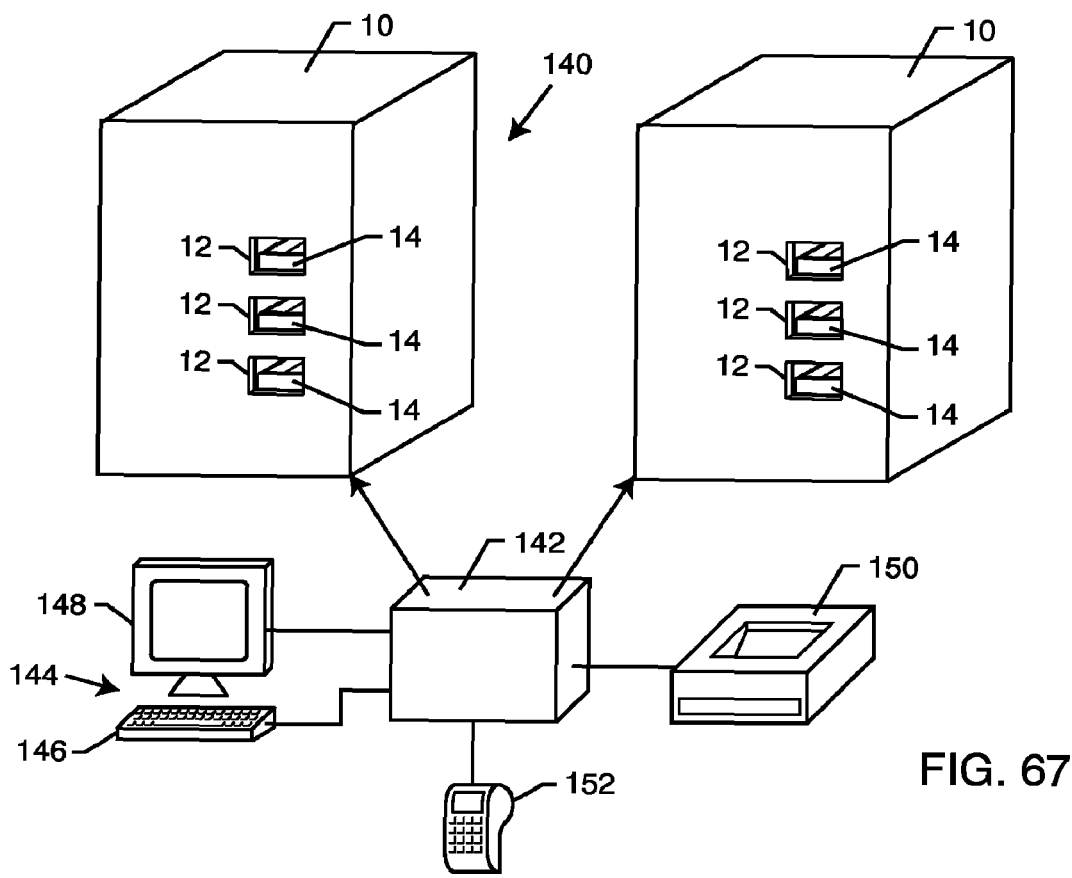
FIG. 67 is a perspective view of an inventory control system for use with one or more storage modules.

Therefore, in accordance with another embodiment, the system includes an inventory control system 140. With reference to FIG. 67, the inventory control system 140 operationally controls one or more of the storage modules (e.g. in the form of the upright box structures 10 described above) with controller 142, similar to the controller 18 and the control module 76 described above. The controller 142 may mount to the structure(s) 10, a wall, or mount to a location in another room. Alternatively, the controller 142 may be in the form of a wireless controller. As described above, each box structure 10 has a continuous track and a plurality of individual storage units 16 stacked in multiple columns. Each storage unit 16 is engaged with the track for selective movement along the track. The box structures 10 may be in the same room, placed in different rooms or even in different buildings (e.g., one box structure 10 in a house and another box structure 10 in a detached garage, guest house, pool house or the like). One of the upright box structures 10 may be refrigerated or contain one or more individually refrigerated storage units 16. The controller 142 is operationally connected (i.e., electrically, mechanically, wirelessly, and/or electronically) to a user interface 144 (e.g., keyboard and/or keypad 146, a display or monitor 148 or the like), and a printer 150. The controller 142 associated with the box structure(s) 10 is operationally connected to and/or includes a mechanism 152 for inputting object information, including storage unit placement, that is associated with a particular item 56. The controller 142 may be built into a personal digital assistant (PDA). The controller 142 allows a user to determine whether or not an object (i.e., an item 56) is in a storage location (i.e., within a home, office; box structure 10 within the home or office, and the storage unit 16); in which part of the storage location the object is located (i.e., which room the box structure 10 is located in); and find the object no matter where the object is stored (i.e., provide a searchable inventory database that provides object information as well as the location where the object is stored). The inventory control system 140 can use pre-existing object information to associate that object with a particular location as well as associate certain information with an object to identify that object and its location. The controller 142 is adapted to receive and store object information from all the structures 10 that are part of the inventory control system 140.

Figure 68:
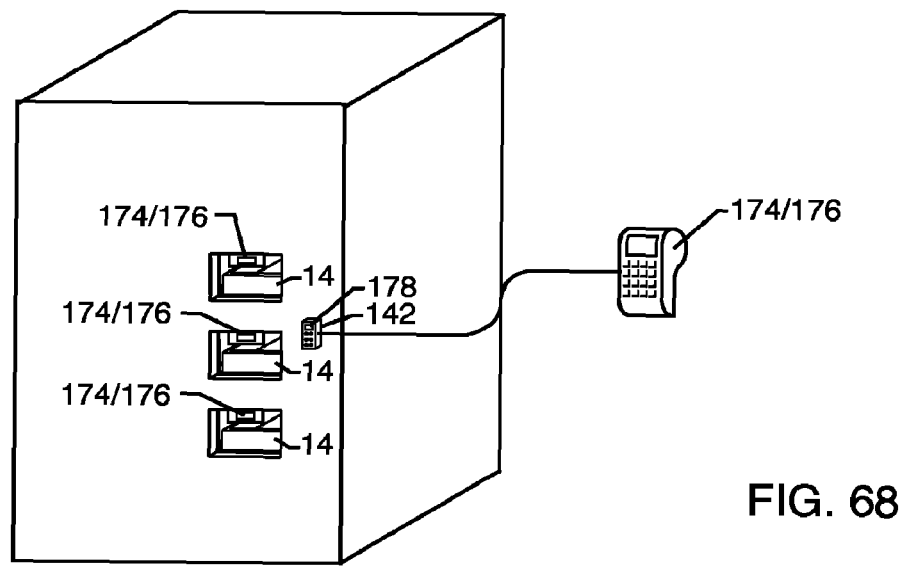
FIG. 68 is a perspective view of a storage module using data readers.
Figure 69:
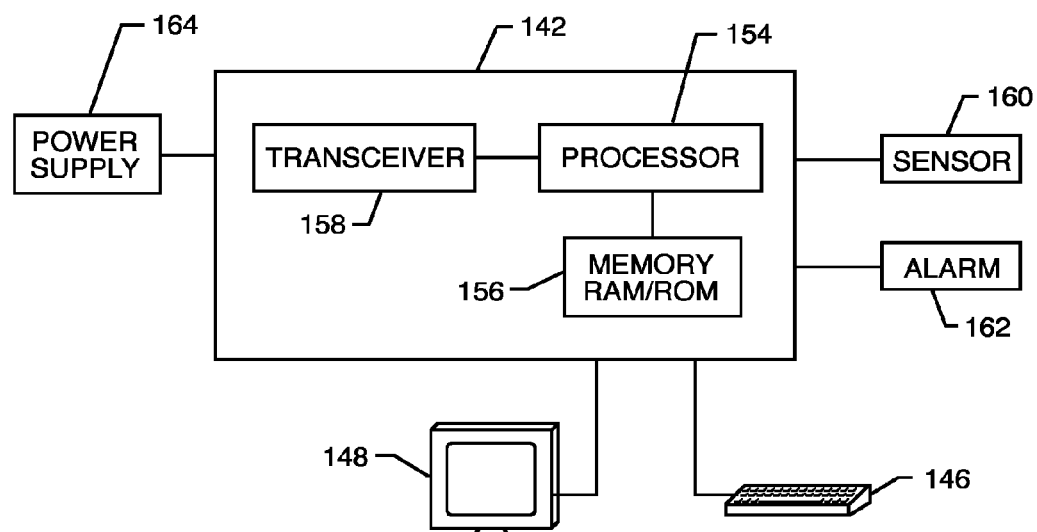
FIG. 69 is a diagram illustrating connections between a control unit and various devices of the inventory control system.

With reference now to FIGS. 68 and 69, the controller 142 includes control circuitry that performs the functions described with respect to the controller 18 and the control module 76. The controller 142 includes a digital computer including, without limitation, a processor 154, a memory 156 (including RAM and ROM) operationally connected to the processor, and a transceiver 158 for allowing the controller 142 to communicate with the upright box structure(s) 10. The controller 142 may be operationally connected to a number of sensors 160 (temperature sensors, movement sensors, humidity sensors) and at least one audio alarm 162. A power supply 164 is connected to the controller 142 and the box structure(s) 10.

The processor 154 receives the object information associated with a particular item 56 from the inputting mechanism 152, and stores the object information in the memory 156 for user access therefrom via the user interface 144. In a preferred embodiment, the inputting mechanism 152 comprises at least one data reader adapted to read machine readable codes associated with the items 56. However, the inputting means can also comprise the keyboard/keypad 146, or other inputting means.

The controller 142 coordinates and controls the functions of the box structure(s) 10 (including the temperature of refrigerated storage units 16), the printer 150, the user interface 144 and the data reader 152. The processor 154 of the controller 142 coordinates movement of the storage units 16 and the items 56 associated therewith. The processor 154 is adapted to provide an inventory of the items 56 in the storage units 16 of the box structure(s) 10 as well as to review object information to determine if an expiration date has been exceeded.

The user interface 144 allows a user to program and operate the inventory control system 140. The user interface 144 is adapted to access information about a particular item, search for a particular item using one or more pieces of information about the item 56, locate a particular item 56 within the structure 10, and input information about a particular item 56 into the memory 156. In addition to the keypad or keyboard 146, the user interface 144 may also include, without limitation, knobs, dials, switches, buttons or the like. The display 148 provides a user with a graphical user interface, liquid crystal display or the like. A computer mouse, light pen or stylus may be used in conjunction with the user interface 144. A computer program stored within the memory 156 includes at least one program, executed by the processor 154, which operates the various functions including, without limitation, control, monitoring, and printing functions, when the processor 154 receives electrical signals from the user interface 144 and/or identification information based on a barcode scan or RFID scan from the data reader 152. The information may be input manually by keyboard 146 to the inventory control system 140 as well via a graphical user interface 148.

Figure 70:
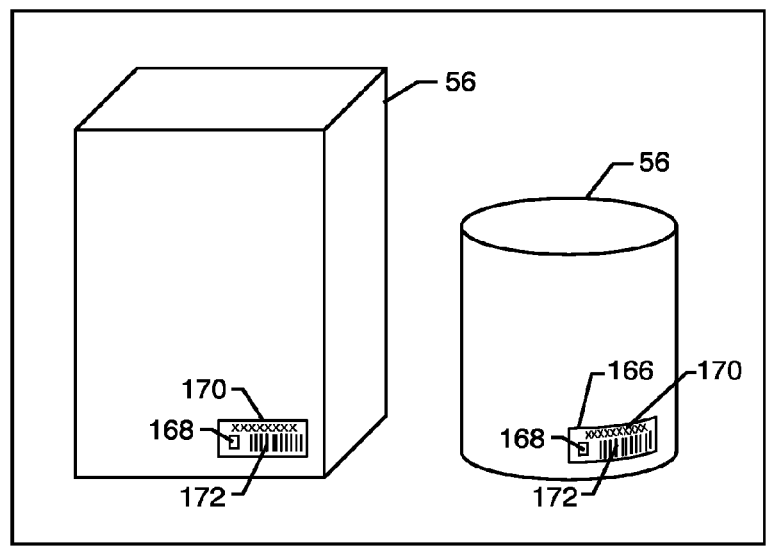
FIG. 70 is a perspective view of labeled objects for storage within a storage unit of a storage module.

The printer 150 is for printing human and machine readable indicia on a label 166 for attachment to an item 56, as seen in FIG. 70. The printer 150 is electrically, electronically, wirelessly and/or mechanically connected to the controller 142. The printer 150 may be built into the box structure 10 itself. The printer 150 may be selected from one of several types, including impact printers (e.g., dot matrix, typewriter-like imprint), ion deposition printers, ink jet printers, laser printers, direct thermal printers, and thermal transfer printers. Alternatively, identification information may also be printed directly on the items 56 by laser etching. If direct thermal printing is used, an imaging coating must be provided on any label 166 to be attached to an item 56. The label 166 may include an adhesive surface that allows the label 166 to be attached to the item 56. Information, including but not limited to identifying data (e.g., description of the item 56), expiration dates, etc., may be placed on the label 166 prior to the label 166 being applied to the item 56. The label 166 may also have an RFID inlet or receiver (i.e., chip & antenna) 168 attached, with the information about the item 56 also written to the RFID inlet 168 as well as on the label 166 attached to the side of the item 56. Alternatively, the RFID inlet 168 may be attached to the item 56, either by being embedded within the item 56 or attached to the item 56 by an adhesive or the like either prior to or after the identifying data and the like are imparted to the RFID inlet 168. The item 56 may have had a pre-existing RFID inlet 168 as the RFID inlet 168 may be embedded within a label of a grocery item during the manufacture of the label, just as a UPC number is printed on the label. Identifying data and the like of the item 56 may be written to the RFID inlet 168 on the label 166 either prior to or after the label 166 is attached to the item 56. Human and machine readable text includes, but is not limited to, text indicia 170, bar code indicia 172 (including, but not limited to UPC number), graphical indicia or the like.

At least one software program is stored in the memory 156 to be operated on by the processor 154 within the controller 142. This program may include a first sub-routine for operating the user interface 144. The program may also include a second sub-routine for printing information on the label 166 to be attached to an item 56. The program may further include a third sub-routine for receiving information transmitted to the controller 142 via RFID or barcode reader technology. A data reader 152 including, but not limited to, bar code readers/laser scanners 174 and RFID readers 176 is electrically, electronically, and mechanically connected to the controller 142 such that the reader 152 is able to scan a barcode 172 or RFID inlet 168 associated with a particular item 56 so that the information can be stored in the memory 156 of the controller 142. Information relating to that particular barcode 172 or RFID inlet 168 may have already been downloaded to the controller 142 which is then able to correlate the scanned barcode 172 or RFID inlet 168 with particular information relating to the item 56, such as how many identical items 56 are already in one or more storage units 16. The controller 142 can differentiate otherwise identical items 56 by differing expiration dates. A sub-routine may be dedicated to monitoring whether the expiration dates of various items 56 in the storage units 16 have been exceeded. Another sub-routine may be dedicated to creating an inventory of all items 56 held within the storage units 16. The controller 142 may include a sub-routine for associating a particular scanned barcode 172 or RFID transmitted information with a particular item 56 that the controller 142 then directs the printer 150 to print out a label containing that particular barcode on a label 166 for attachment to that item 56. For example, this would allow a user to scan in the barcode on a tag attached to a newly purchased shirt which will soon have that tag removed. After the shirt has been worn and cleaned, the user can then create a label 166 having that identifying barcode, attach the label 166 to the shirt and then store the shirt in a storage unit 16. The controller 142 includes a sub-routine that allows a user to input information that will later be printed onto a label 166 or read onto an RFID inlet 168 for attachment to an item 56. The processor 154 also includes a sub-routine that provides (via the printer 150, the user interface 144 or the like) an inventory of the items 56 in the structure(s) 10.

There may be mutual communication between the data reader 152 and the controller 142. Initially, the circuitry of the reader 152 is programmed to provide identifying and other information and the controller 142 is capable of eliciting such information from the circuitry of the reader 152. The identifying data may include the name of the item 56, size of the item 56 (e.g., one liter bottle), etc. The controller 142 may then use the printer 150 to print this data on a label 166 for the item 56 at any time during the process, including printing the name of the item 56 on the label 166 in barcode form or printing the expiration date, name, etc. of the item 56 on the label 166. In a read/write configuration of the circuitry of the controller 142, the reader 152 may also impart information to, alter information on, or delete information from the controller 142. Likewise, the controller 142 is capable of providing identifying and other information to the RFID circuitry of a particular item 56.

The controller 142 may also include a built-in user interface 178 which includes a display (such as a liquid crystal display), a thumb print reader, alpha-numeric keypad, and/or various knobs, switches, and controls used to activate/operate the structure(s) 10. The display of the interface 178 could employ touchscreen technology that would eliminate the need for physical switches, keypads, or the like.

As outlined above, a number of sensors 160 are associated with the processor 154 and distributed throughout the interior of the structure(s) 10 to determine conditions (e.g., temperature, movement, humidity, etc.) within the structure(s) 10. The sensors 160 are associated with the track within the structure(s) 10, actuators, and individual storage units 16. Upon detection by one or more sensors 160 of any unauthorized entry of the structure(s) 10 (such as a hand or other object reaching into the structure(s) 10, pulling on the storage unit(s) 16, forcing a storage unit 16 along the track, etc.), a sub-routine run by the processor 154 performs at least one security function. These security functions include sounding an audio alarm via the alarm 162, displaying a graphical alarm via the display 148, and preventing movement of storage units 16 within the structure(s) by shutting off the actuators that move storage units 16 within the structure(s) 10. The processor 154 can send an email alert to a user via the Internet that informs the user of the security situation. A sub-routine run by the processor 154 also monitors and controls temperature within a number of the refrigerated storage units 16 to prevent spoilage of items 56 therein. In the event the processor 154 is unable to maintain temperature within one or more of the refrigerated storage units 16 within an acceptable range, the processor 154 will perform one or more of the security functions described above, including alerting a user to the spoilage situation.

In use, information may be conveyed to the controller 142 before an item or object is placed into the structure(s) 10. Identification information may be conveyed in several ways including, but not limited to, direct input from a user, a bar code assigned to and/or printed on a item 56 that can be read by a data reader 152 operationally connected to the controller 142, and an RFID transport medium on the item 52 that can be read by the controller 142.

The process of entering information which can be pre-printed on the item(s) 56 can begin when the item(s) are brought into a location containing the structure(s) 10. A user can scan the item(s) 56 with the data reader 152 or use the user interface 144 to manually enter the item(s) into the system 140. The data reader 152, 174, 176 may be positioned within the structure 10, near an upper portion of an opening 12 to the storage unit 16, above the drawer 14 so as to scan the item 56 as the item 56 is placed in the drawer 14 of the storage unit 16. Identification and other object information may be downloaded or written to the controller 142 using various technologies including, but not limited to, bar code and RFID technology. The controller 142 can be part of the structure 10 or function as a stand alone unit that does not need to be networked or connected to an IS system located within the home or any other system whereby information may be conveyed to the controller 142. The information obtained by the scan or manually input by the user is stored within the controller 142 and may then be imprinted on the label 166 to be attached to the item and/or written to the RFID chip attached to the item 56, either directly or as part of the label 166. Alternatively, the controller 142 may be networked to the home inventory control system from which the controller 142 can receive constant updates of information, such as power supply.

The item 56 to be stored, depending on its size, will be placed in a storage unit 16 large enough to accommodate its size or, if the item 56 is a perishable item, will be placed in a refrigerated storage unit 16. The label 166, if one is needed, may be affixed to the item 56 after the object information data is transferred to the label 166. The object information can be transferred to the item 56 in a number of ways including, without limitation, by printing human readable text (i.e., alpha-numeric lettering) on the label 166 of the item 56, printing machine readable text (e.g., bar code) on the label 166 of the item 56 or by transmission to the RFID inlet 168 attached to the item 56. Any commercially available RFID chip may be used, including, for example, Hitachi Corporation's mu-chip which is wireless accessible at 2.4-2.45 GHz, can store up to 128 bits of data, and at 0.4 mm square is thin enough to be embedded in a label attached to the item 56 or within a part of the item 56 itself. An antenna for receiving incoming data is connected to the RFID chip.

It is well known to those skilled in the art that RFID circuitry of the type under discussion is provided in a plurality of configurations; for example, read only, read/write, passive, and active. The read only provides previously installed information from the RFID circuit through a compatible reader. The read/write circuit permits the reader to install or alter information stored in the circuit. The passive circuit is one which depends for activation and operating power upon the signal emitted by the reader while the active circuit includes a battery or other internal power source which may be activated by the signal from the reader.

The controller 142 may be powered by an outside source (e.g., a power cord connecting the controller 142 to a wall socket, the electrical system of the structure 10 or the like) or by a battery located within the controller 142. The user interface 144, data reader 152 and/or the printer 150 may be powered in similar fashion. The battery may be a rechargeable battery that is rechargeable while still within the controller 142 by connecting the controller 142 to an outside power source 164.

The controller 142 can come in various forms including, but not limited to, being a part of the structure 10, a personal computer, central server, handheld device, etc. that is electronically, electrically and/or mechanically connected to the structure 10 either by cables, RFID or wireless technology.

In the alternative, the item's 56 identification and other object information may be downloaded and/or written to a home central server at the time the item 56 is brought into the home either by scanning the item 56 or manually entering the information into the central server which is controlling the structure(s) 10 within the home. The home central server may contain a data base of all identification and other information of every item 56 brought into the home where that item's 56 identification and other object information has been entered into the server. This central server could be linked with other homes owned by the user, city or nationwide, to share data in order to maintain an inventory of all items 56 stored by the user in those locations. In this situation, the data file stored on the RFID chip on an item's label 166 is also stored in the home's central server so that the information may be referred to at a later time. In the alternative, additional information can be stored by including a digital photo of the item 56. This photo could be taken by a digital camera and the information then stored within the home central server. The photo could also be printed on the item's label 166. This would further facilitate identification of stored items 56 for insurance purposes in the event of a disaster as the stored photo provides a visual record of an item 56 that may have been destroyed. This would also allow the digital photo to be displayed on the display 148 forming part of the user interface 144 connected to the controller 142. The display 148 allows the item's 56 information to be displayed as well as the digital photo of the item 56.

In another alternative, networking capabilities could be added to the controller 142 that would allow the controller 142 to use an always-on wireless method in order to enable the controller 142 to be in constant communication with the home's central server.

Figure 71:
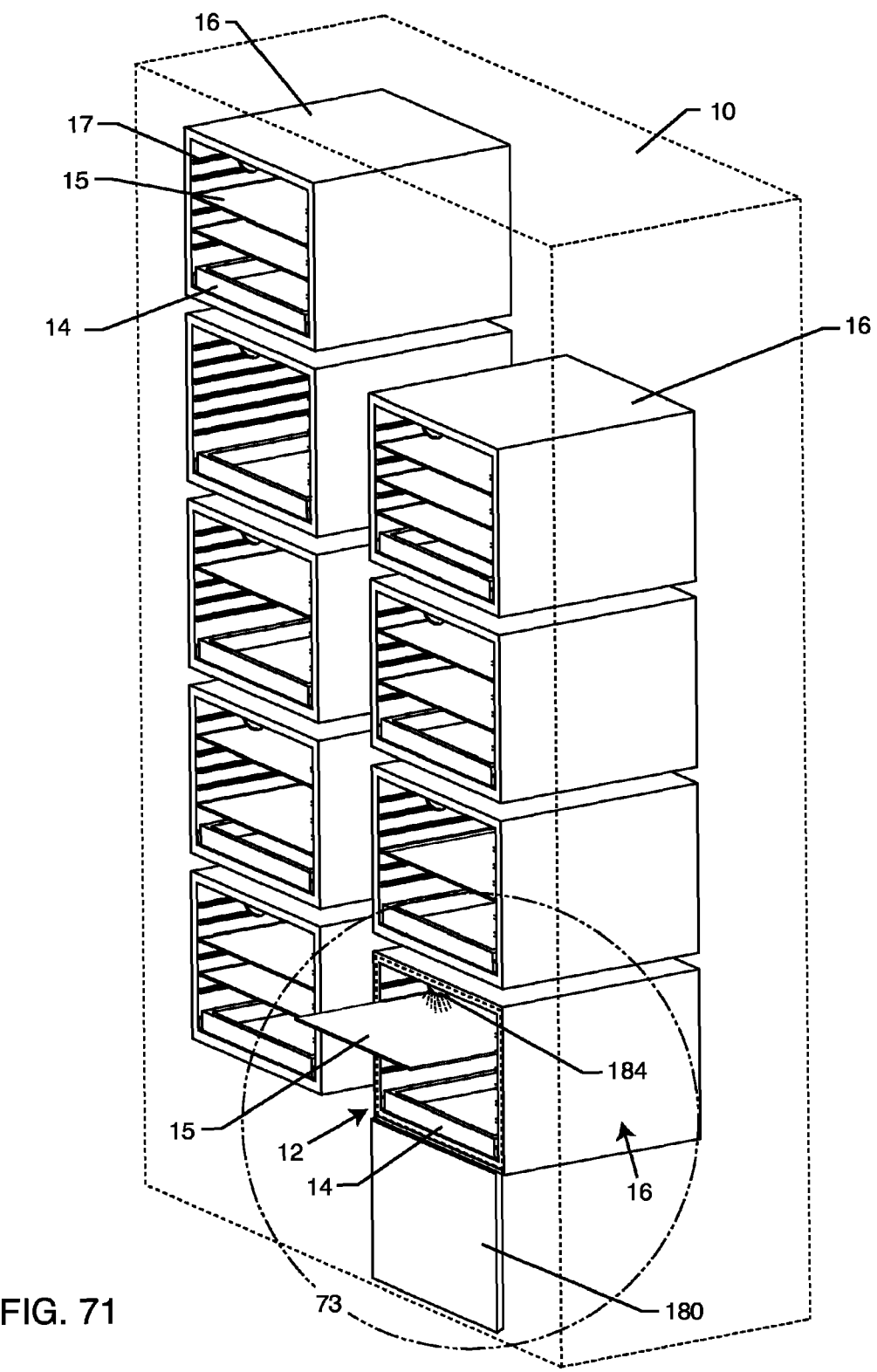
FIG. 71 is a front perspective view of a storage and retrieval system encased within a wall or housing, without illustrating the tracks, for purposes of clarification.
Figure 72:
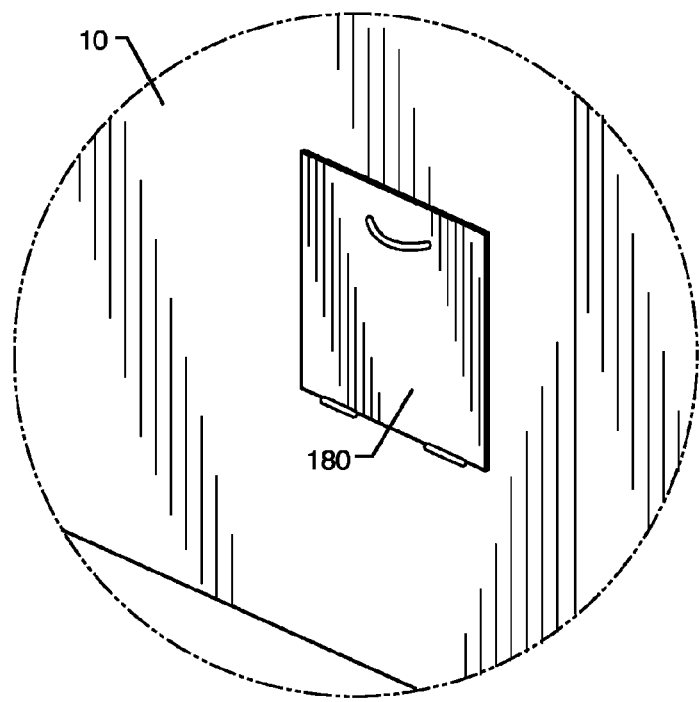
FIG. 72 is an enlarged view of a door in the housing or wall providing access to a storage unit.
Figure 73:
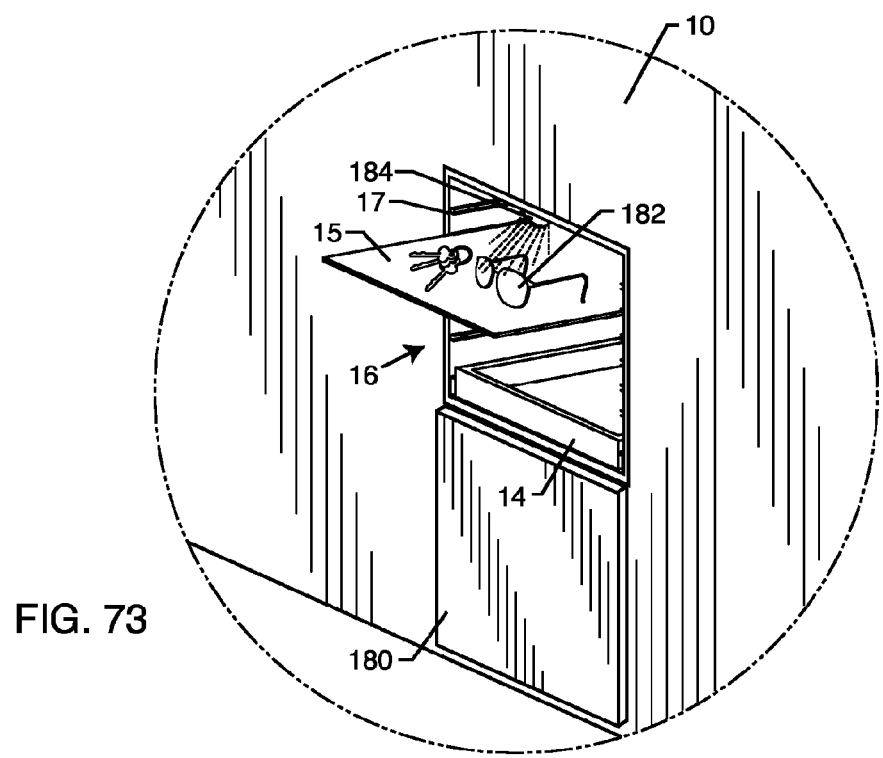
FIG. 73 is an enlarged view of area "73" of FIG. 71, illustrating the retrieval of a desired item from a particular storage unit.
Figure 74:
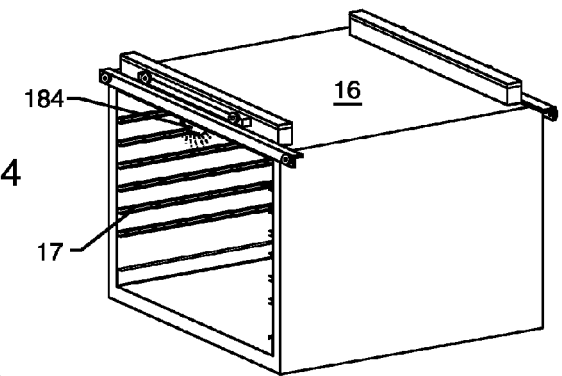
FIG. 74 is a front perspective view of a storage unit for use with the storage and retrieval system.
Figure 75:
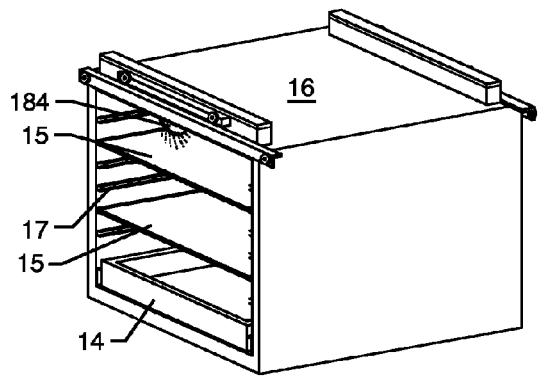
FIG. 75 is a perspective view similar to FIG. 74, but wherein the storage unit has two shelves and a drawer contained therein.
Figure 76:
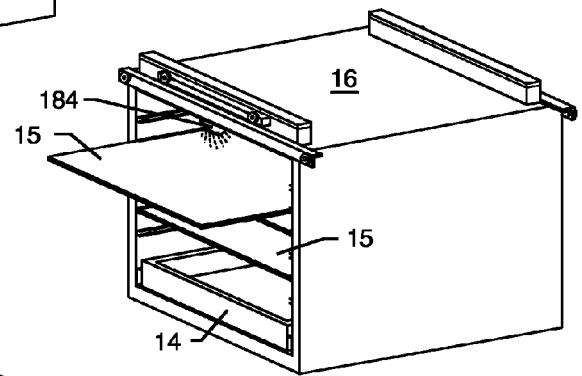
FIG. 76 is a perspective view similar to FIG. 75, illustrating the extension of a shelf having a light shining on at least a portion thereof.
Figure 77:
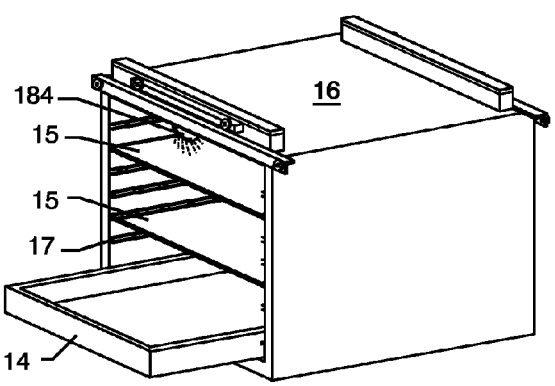
FIG. 77 is a view similar to FIG. 76, but illustrating a drawer of the storage unit extending outwardly.

With reference now to FIGS. 71-73, two columns of a plurality of stacked storage units 16 are illustrated within a structure 10, typically located in a wall space of a house, office or the like. Using the inventory control system 140, as described above, the user selects a drawer or item. The system then automatically moves the storage unit 16 until the desired storage unit having the desired object is disposed in alignment with an opening 12, as described above. It will be appreciated by those skilled in the art that the opening may have a hinged door 180 or the like which must be opened, as illustrated in FIGS. 71 and 73, in order to access the storage unit 16. In a particularly preferred embodiment, the door 180 is capable of opening a full one-hundred-eighty degrees against the side of the wall or the structure 10, so as not to impede access to the storage unit 16, particularly when the user is confined to a wheelchair or the like.

With particular reference to FIG. 73, in a particularly preferred embodiment, the storage unit 16 is capable of holding one or more drawers 14, as well as one or more shelves 15, such as on tracks 17 formed within the storage unit 16. This enables multiple objects to be stored within the storage unit 16, with a drawer 14 or shelf 15 selectively extended, as illustrated in FIG. 73, so as to retrieve the desired object 182. It will be appreciated that the number of drawers 14 and/or shelves 15 depend upon the size and number of objects 182 to be placed within the storage unit 16. In some cases, the storage unit 16 may not include any drawers 14 or shelves 15, the one or more objects merely being placed inside the storage unit 16. However, in other cases, a plurality of drawers 14, a plurality of shelves 15, or a combination thereof, as illustrated in FIGS. 71 and 74-77, can be used.

With particular reference again to FIG. 73, in a particularly preferred embodiment, the inventory control system 140 includes means for locating the position of a particular item in a given storage unit 16. An example of such means includes a light 184 which can be used to view the object 182 in the drawer 14 or on the shelf 15. In a particularly preferred embodiment, the light source 184 is moved or selectively illuminated so as to shine directly onto the portion of the drawer 14 or shelf 15 containing the object. For example, the light source 184 may comprise a single light emitting diode (LED), a plurality of LEDs, or a set of LEDs that illuminate a specific portion of the drawer 14 or shelf 15 where the desired object is to be found. The location of the object can be tracked in several ways. This can be done by entering the placement of the object in the drawer 14 or on the shelf 15, such as in a grid pattern. Another option is to use sensors to determine the location of the object 182. For example, the object 182 can be labeled with an RFID chip, and a sensor, such as a sensing grid in the drawer 14 or shelf 15 that can relay the position of the object 182 in the drawer 14 or on the shelf 15, such that light is directed to that area to assist in retrieving the object. It will be appreciated that this can be particularly useful for the elderly or mentally impaired.

Figure 78:
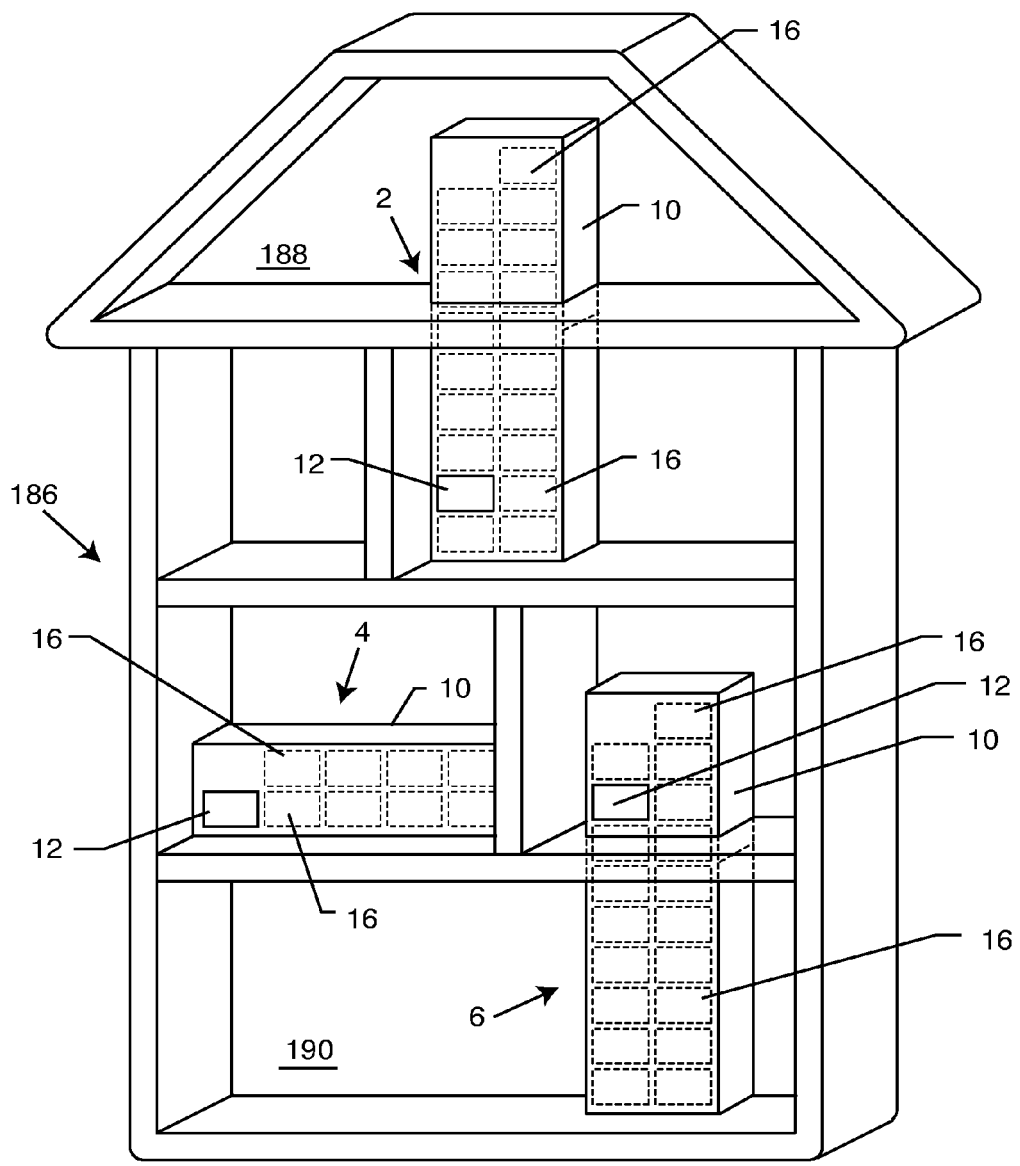
FIG. 78 is a diagrammatic view of a structure having a plurality of storage and retrieval systems operably disposed therein.

With reference now to FIG. 78, a structure 186, representing a residence, an office, or other structure, includes a plurality of systems 2-6. The systems 2-6 are typically built between wall cavities of the structure 186, although they can have a housing structure separate from the walls to have the appearance of a cabinet or the like. It will be appreciated from the drawing that the system can have either a vertical or a horizontal configuration. Moreover, otherwise wasted space, such as in the attic or basement, can be used for storage purposes. For example, the system 2 includes storage units 16 stacked within the structure 10 on the level or floor which include the access point 12, as well as storage units 16 which extend upwardly into an attic 188 portion of the structure 186. Similarly, the system identified by reference number 6 has storage unit 16 extending into a basement 190 of the structure 186. Thus, the otherwise wasted space in the attic 188 or the basement 190 can be used to house the systems 2-6 and the storage units 16 so as to create an effective storage space, while the individual storage units 16 are accessible on the livable and main levels of the structure 186.

With reference now to FIGS. 79-84, a problem encountered with the single track arrangement is that the wheels 38 of the storage unit 16 can fall into the intermediate vertical rails as the storage unit 16 is moved from one end of the track to the opposite end of the track. As described above, the ramps 35, as illustrated in FIG. 3, assist the storage unit 16 from moving between the first vertical set of rails, to the second set of vertical rails. Of course, as shown and described above, this requires that the first set of wheels 38 at a leading edge of the storage unit 16 move from the left intermediate rails 32, past the right intermediate rails 34, and the gap therebetween, and to the far right vertical end rails 30. During this movement, the trailing wheels 38 travel from the far left vertical end rails 28, past the first intermediate rails 32, and into alignment with the second intermediate rails 34, to be disposed in the second vertical track and in the second end column. Notwithstanding the use of the ramps 35, however, there still exists the possibility that the wheels 38 could slip into and become jammed in the intermediate rails 32 or 34.

Figure 83:
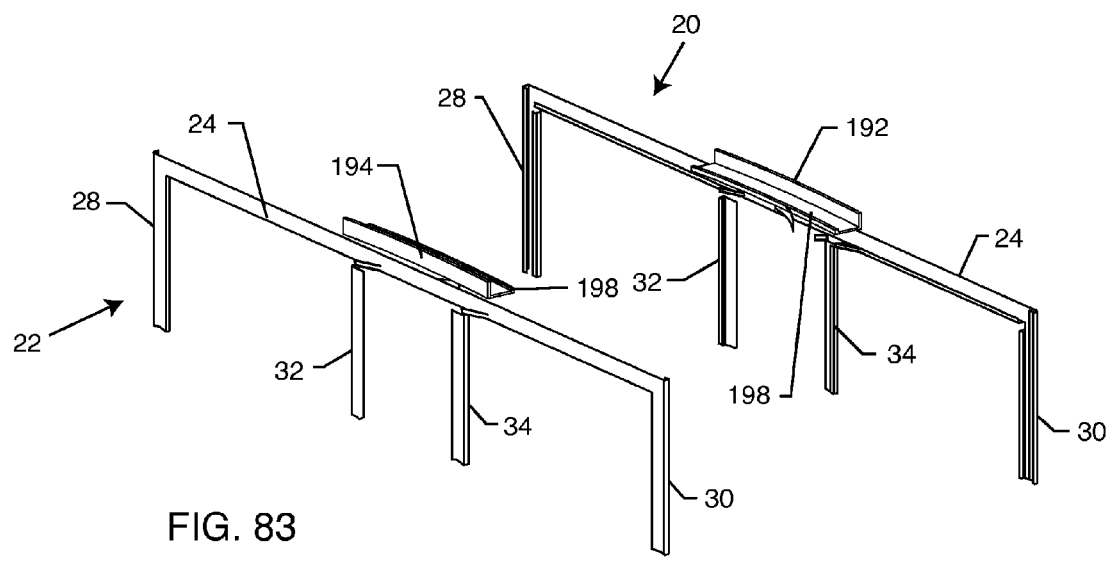
FIG. 83 is a partial perspective view of first and second tracks, each track having a support rail spanning intermediate vertical rails thereof.

Accordingly, first and second support rails 192 and 194 are disposed above the upper rails 24 of the first and second tracks 20 and 22. The upper support rails 192 and 194 have a length at least as long as the gap between intermediate rails 32 and 34, but are shorter in length than the upper rails 24. Also, as illustrated in FIG. 83, the support rails 192 and 194 are preferably bowed somewhat, so as to serve to lift the storage unit 16 as the first set of wheels 38 pass over the gap formed by the intermediate rails 32 and 34.

Figure 84:
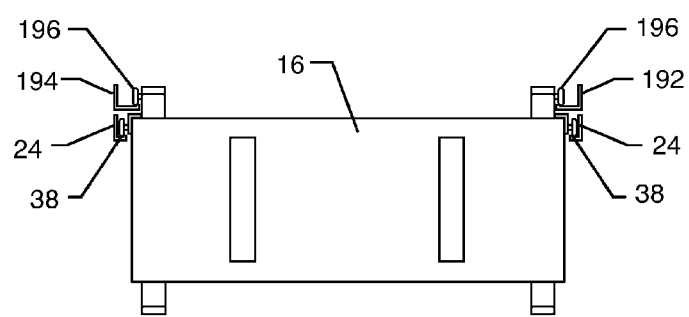
FIG. 84 is a diagrammatic view of a storage unit having its first and second sets of wheels engaging upper rails and support rails.

With reference now to FIGS. 79-81, the storage units 16, in this embodiment, have been modified to include a second set of wheels 196 which are configured and adapted to engage the support rails 192 and 194. More particularly, as illustrated in FIGS. 79 and 80, the second set of wheels 196 are disposed above, and somewhat inwardly, from the main wheels 38. Moreover, as illustrated in FIGS. 81 and 84, the second set of wheels 196 extend outwardly a shorter distance than the main set of wheels 38. This arrangement allows the second set of wheels 196 to clear the upper rail 24 or the lower rail 26 as the storage unit 16 moves upwardly or downwardly in the first or second sets of vertical tracks. As such, the support rails 192 and 194 are either offset from the upper rails 24, or include a lower traveling lift which is somewhat elongated, as illustrated in FIG. 84, so that the second set of wheels 196 can come into engagement therewith and be supported along the lower elongated ledge 198 of the support rail 192 and 194.

With reference now to FIG. 82, two end columns are illustrated without the rails or tracks for purposes of clarity. It will be appreciated that the number of storage units 16 in each column can vary, as well as the fact that there can be additional columns of storage units 16 disposed between the end columns. Nonetheless, an uppermost storage unit 16 in the left end column will need to be moved to an adjacent right column, in this case the far right end column. The means for moving the storage unit 16 have been described above with the use of various actuators.

Figure 85:
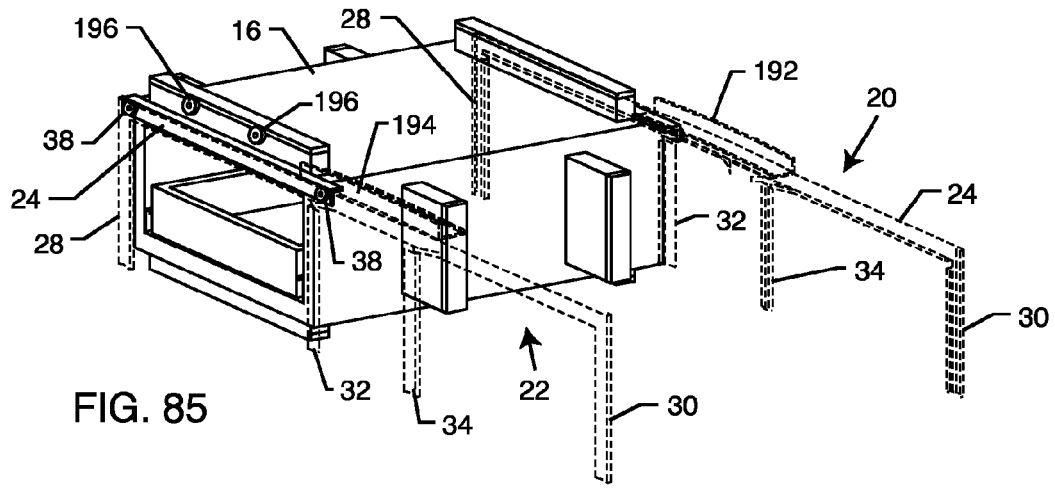
FIG. 85 is a perspective view of a storage unit disposed at a first end of a vertical track of the storage system.
Figure 86:
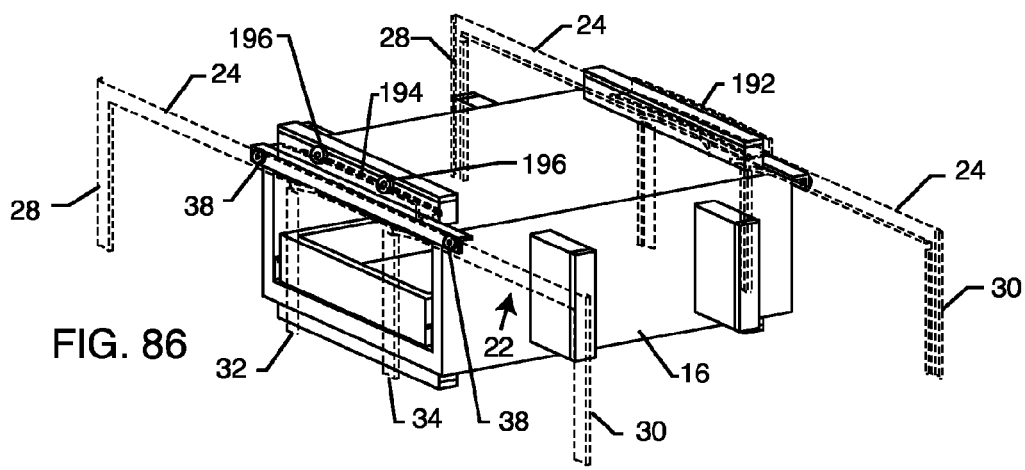
FIG. 86 is a view similar to FIG. 85, illustrating the storage unit's second set of wheels engaging upper support rails as the storage unit passes intermediate vertical rails.
Figure 87:
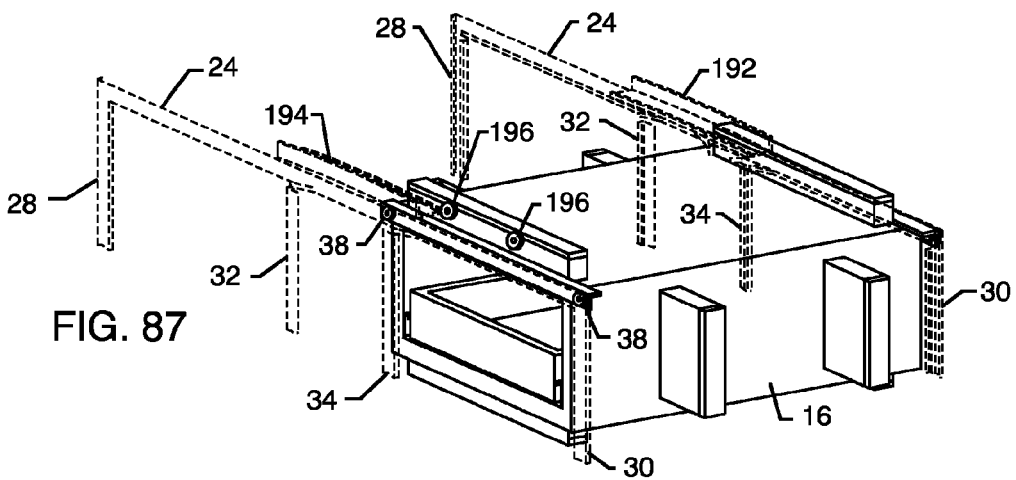
FIG. 87 is a perspective view similar to FIGS. 85 and 86, illustrating the storage unit disposed at an opposite second end of the vertical track of the storage system.
Figure 88:
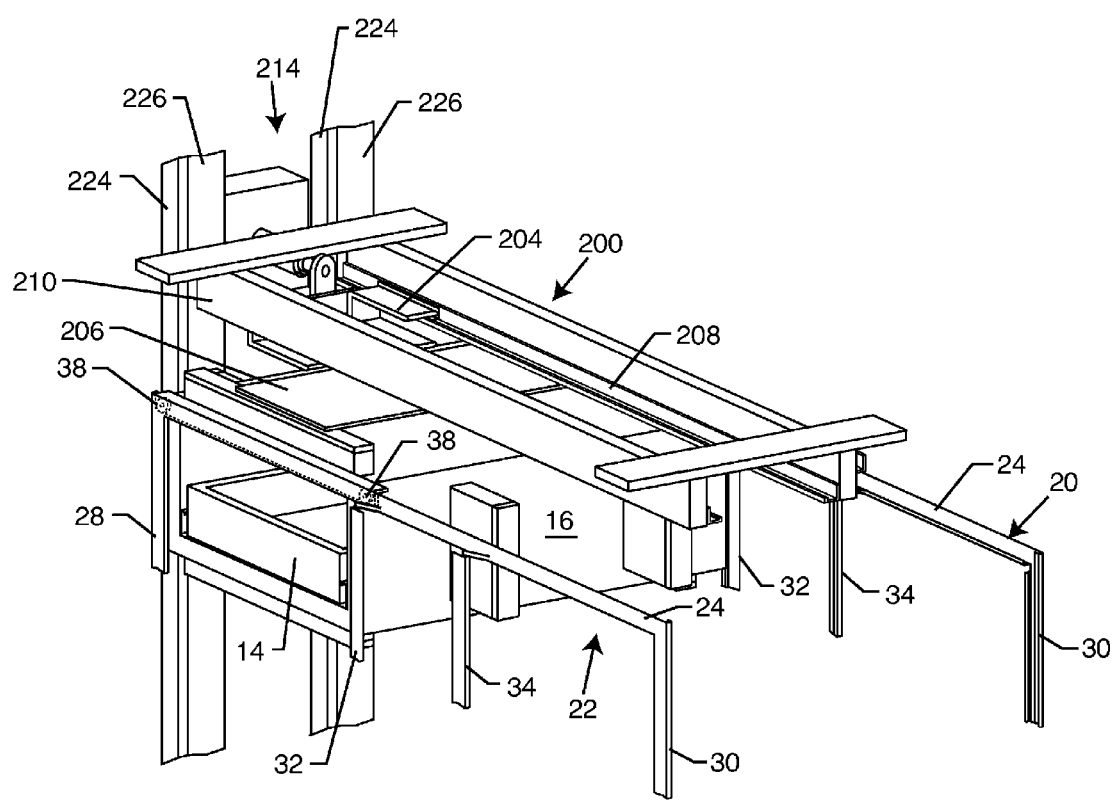
FIG. 88 is a partially fragmented perspective view of a storage and retrieval system incorporating a conveyor apparatus.
Figure 89:
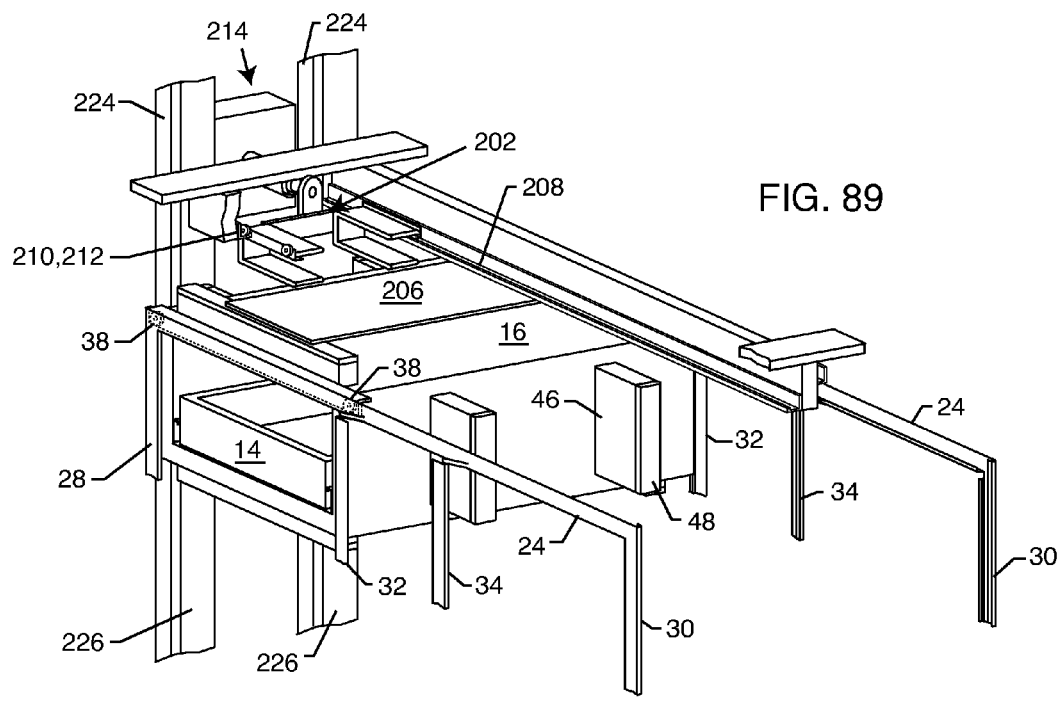
FIG. 89 is a perspective view similar to FIG. 88, but fragmented to show various component parts thereof.

With reference now to FIGS. 85-87, a storage unit 16 disposed at the uppermost position in the far left or first end column is shown moved, such as by the horizontal actuator ram apparatus 70, described above, to the adjacent column, in this case, the far right end column. More particularly, with reference to FIG. 85, the first set of wheels 38 are in engagement with the first end vertical rail 28 and the first intermediate rail 32 of each of the first and second tracks 20 and 22. As the storage unit 16 moves, as illustrated in FIG. 86, the second set of upper wheels 196 come into engagement with the first and second support rails 192 and 194. More particularly, the leading second set of wheels 196 engage the support rails 192 and 194 before the leading main wheels 38 pass over the second inner rail 34. Thus, the storage unit 16 is supported by the second set of wheels 196 on the support rails 192 and 194 as the storage unit 16 passes between the first and second intermediate rails 32 and 34, and the gap therebetween.

With continuing reference to FIGS. 86 and 87, the trailing second set of wheels 196 comes into contact with and rides upon the first and second support rails 192 and 194 before the trailing main wheels 38 come into alignment with the first intermediate rail 32 to prevent the trailing main wheels 38 from falling into the gap thereof and becoming bound. As described above, in a particularly preferred embodiment, the first and second support rails 192 and 194 are slightly bowed so that the main wheels 38 are lifted somewhat from the upper rails 24, particularly when the main wheels 38 are positioned over the intermediate rails 32 and 34. This prevents the main wheels 38 from becoming lodged in the gap thereof. The storage unit 16 is then finally moved to the far end, or second column, wherein the main wheels 38 are in alignment with the second intermediate rail 34 and the second end vertical rails 30, or the second vertical track, to be vertically movable along the length thereof, as described above.

With reference now to FIGS. 88-92, in another embodiment, a conveyor apparatus 200 pulls, and somewhat lifts, the storage unit 16 from the end column to an adjacent column, as illustrated the second end column. More particularly, the conveyor apparatus 200 includes a hook assembly 202 including at least one hook member 204 which is configured and adapted to releasably engage a catch 206 extending from the storage unit 16. In a particularly preferred embodiment, as illustrated, the catch 206 comprises a member extending from a top portion of the storage unit 16, such as a metal or rigid sheet or the like extending across spacers 42 and 44.

Typically, the conveyor apparatus 200 includes a first and second rail 208 and 210 which are disposed above the upper rails 24 of the first and second track 20 and 22 and positioned to engage a set of wheels 212 operably associated and connected to the hook assembly 202. Although the wheels 212 may extend directly from the one or more hooks 204, as illustrated, more typically the hooks 204 are part of a sub-assembly which extends between the support rails 208 and 210. The wheels 212 are rotatably and operably attached thereof to ride along the rails 208 and 210. Moreover, similar to that described above, in a particularly preferred embodiment the rails 208 and 210 are slightly bowed or curved so as to lift the storage unit 16 over the gaps of the inner rails 32 and 34, so that the first set or main wheels 38 of the storage unit 16 do not become caught therein.

An actuator 214 is operably connected to the hook assembly 202 and adapted to move the hook assembly 202 into engagement with the catch 206 of the storage unit 16 to push, and somewhat lift, the storage unit 16 across the length of the upper rails 24 until the storage unit 16 is disposed in the desired column. In one embodiment, the actuator 214 comprises a telescopic ram 216, having one end thereof attached to the hook assembly 202, and another end thereof operably connected to a power drive or gear box 218, which selectively extends and retracts the ram 216 in a controlled manner.

Figure 90:
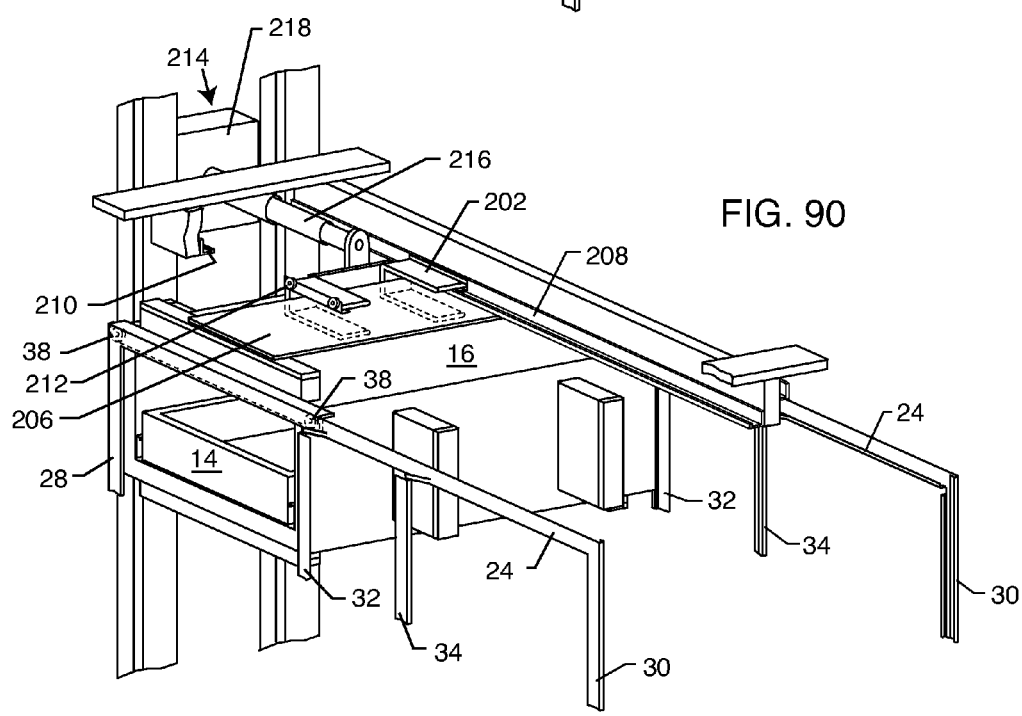
FIG. 90 is a perspective view similar to FIG. 89, but illustrating a hook assembly thereof engaged with a catch of the storage unit.

In FIGS. 88-92, the storage unit 16 is in the first vertical end track with the wheels 38 positioned in the vertical tracks 28 and 32. Here, the storage unit 16 is in the uppermost position of the column of storage units. To move the storage unit 16, the actuator 214 activates and extends the ram 216 outwardly causing the hook assembly 212, and more particularly the one or more hooks 204, to engage the catch 206 of the storage unit 16 (FIG. 90).

As mentioned above, the wheels 212 of the hook assembly 202 are moved along the rails 208 and 210. The main or first set of wheels 38 of the storage unit 16 ride upon the upper rails, or are lifted slightly out of engagement therewith. This prevents the wheels 38 from falling into the inner rail 32 or 34 before the storage unit 16 has been moved to the adjacent column, or the second vertical track in the end column, as illustrated.

Figure 91:
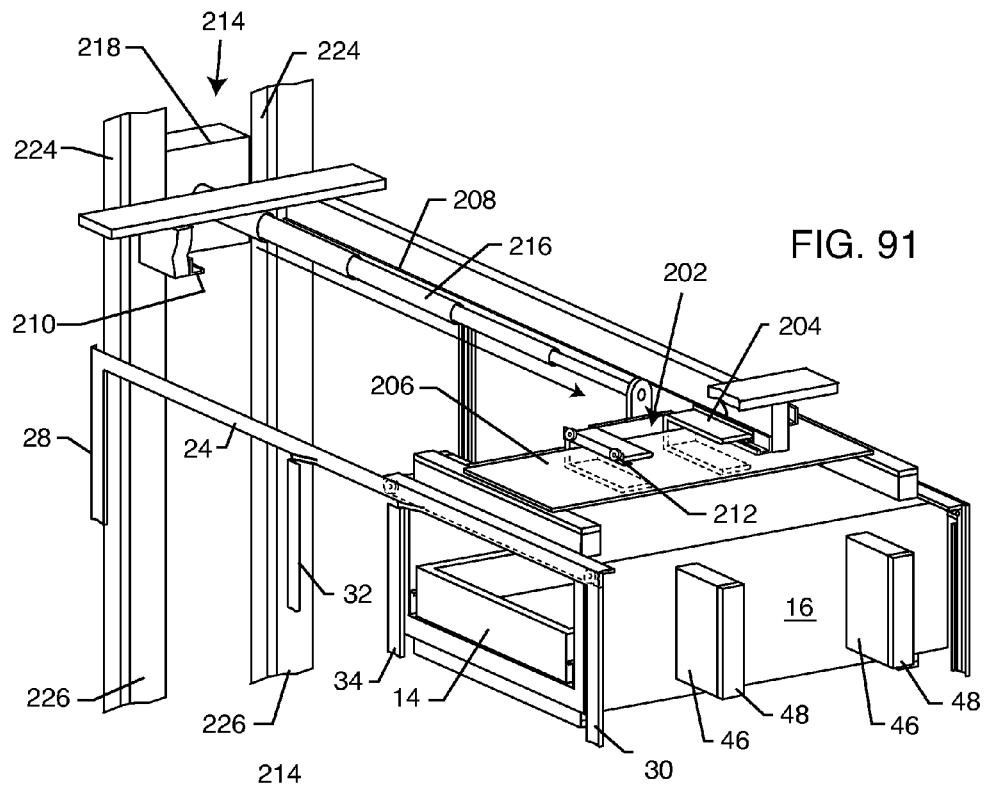
FIG. 91 is a partially fragmented perspective view similar to FIG. 90, but illustrating the storage unit moved from a first vertical track to a second vertical track.
Figure 92:
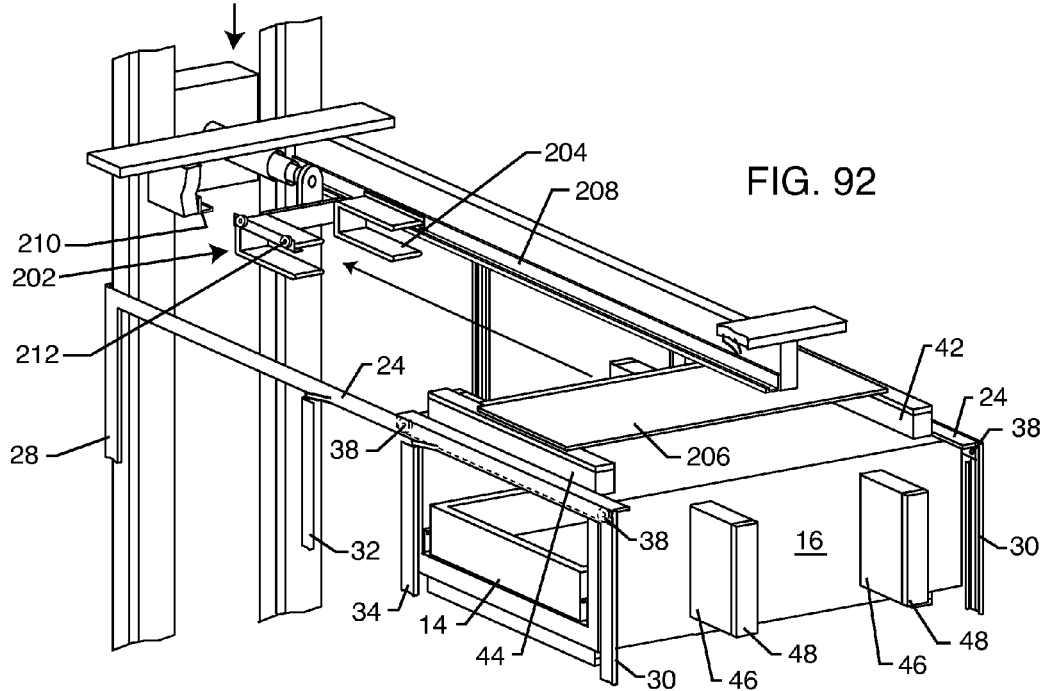
FIG. 92 is a partially fragmented perspective view similar to FIG. 91, but illustrating the retraction of the hook assembly.

In FIGS. 91 and 92, the actuator 214 continues to extend the ram 216 along with the hook assembly 202 and the storage unit 16 until the storage unit 16 is in the proper column, i.e. the far right end column, wherein the wheels 38 align with the rails 30 and 34 of the second vertical track. At this point, the actuator 214 reverses and withdraws the ram 216 to reposition the hook assembly 202 back to its starting point in a reciprocal manner.

Figure 93:
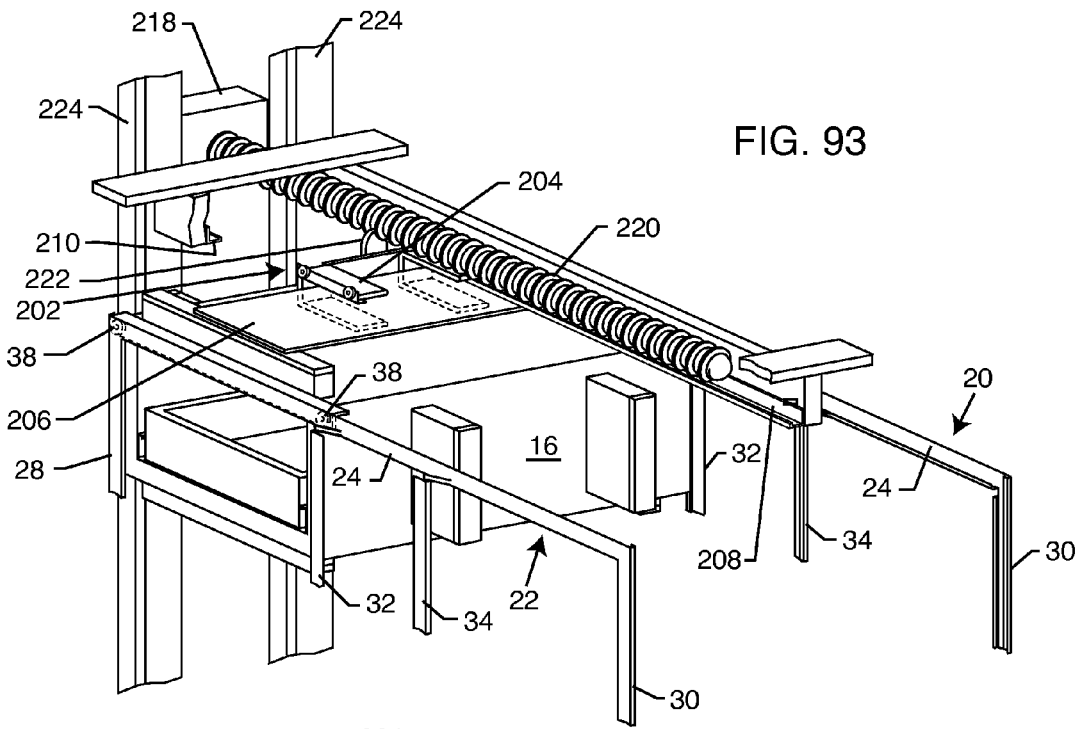
FIG. 93 is a perspective view illustrating a conveyor apparatus with a worm drive actuator.
Figure 94:
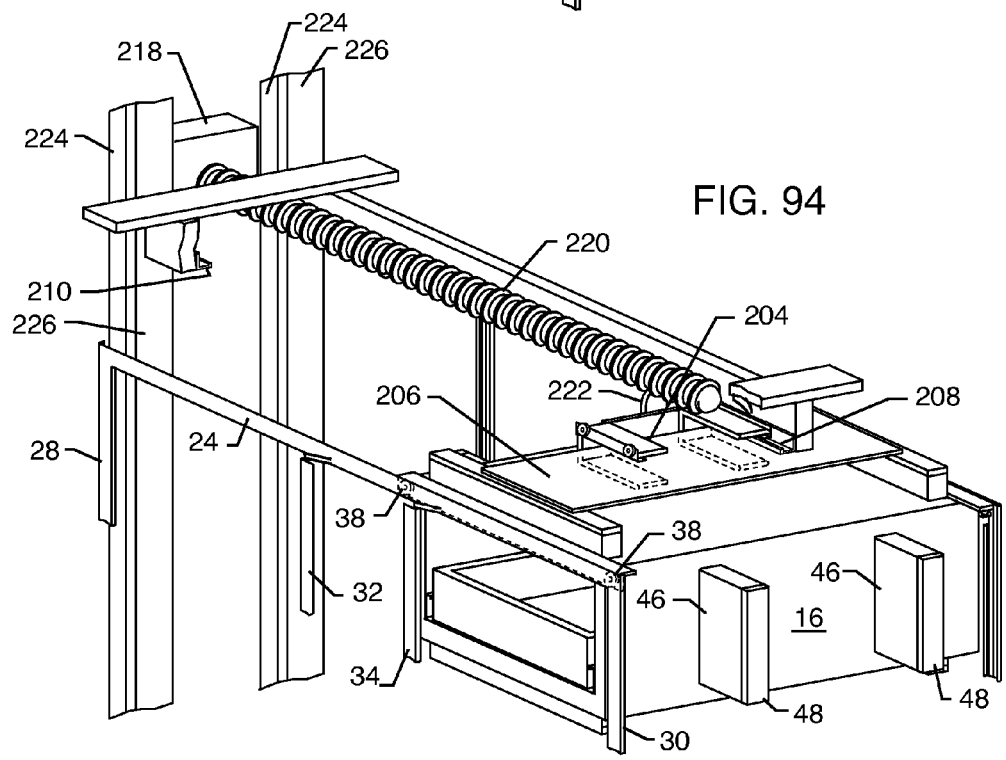
FIG. 94 is a perspective view similar to FIG. 93, but illustrating the hook assembly and storage unit moved from one end of the track to the opposite end of the track.

FIGS. 93 and 94 illustrate other types of actuators designed to engage the hook assembly 202 with the catch 206 to move the storage unit 16. For example, a worm screw 220 may rotate in a first direction to engage an extension and coupling member 222 of the hook assembly 202. Rotation of the worm screw or drive 220 in a first direction moves the coupling 222, and thus the hook assembly 202 from left to right. Reversing the rotation of the worm screw 220 returns the hook assembly 202 to its original start position.

The storage unit 16 may, particularly when heavy laden with objects, swing somewhat outwardly, particularly when residing in the vertical tracks 28-34. This can present problems in the smooth travel and alignment of the storage units 16 in their various columns. To remedy this drawback, a set of vertical support guides or beams 224 are disposed at opposite ends of the continuous track. FIGS. 88-94 illustrate a first set of such vertical support beams 224 at a first end of the track. A second set of such guides or beams 224 are also positioned at the opposite end of the track. The second set of guides or beams 224 are not illustrated to clarify the operation of the conveyor apparatus 200, disclosed above.

In a particularly preferred embodiment, the support beams or guides 224 are vertical and extend substantially the length of the columns of stacked storage units—that is slightly above the upper rails 24 and slightly below the lower rails 26. The elongated guides or supports 224 typically include a front face material 226 having low friction characteristics, such as Teflon. These Teflon faces 226 come into contact with the Teflon faces of the spacers 46, 48 extending outwardly from each side or end of the storage unit 16. In this manner, as the Teflon faces 226 moves past the spacers 46, 48, there is a relatively low amount of friction which permits the storage units 16 to move vertically downwardly or upwardly as needed. At the same time, the elongated guide members 224 prevent the storage units 16 from pivoting outwardly. It will be appreciated that the Teflon faces 226 can always be in contact with one another when the storage units 16 are in the first and second end columns, or slightly spaced apart from one another such that they only contact when the storage unit 16 moves out of vertical alignment slightly.

FIGS. 95-100 illustrate an alternative embodiment of the inventory control system 140 described above. This inventory control system 140' is designed to track virtually any object, regardless of size, shape, material, etc. The inventory control system 140' is designed to prevent any object from being lost, ever. Importantly, the modified inventory control system 140' can locate objects stored within or outside of the storage and retrieval system described above. Each of these embodiments will be described in more detail below.

Figure 95:
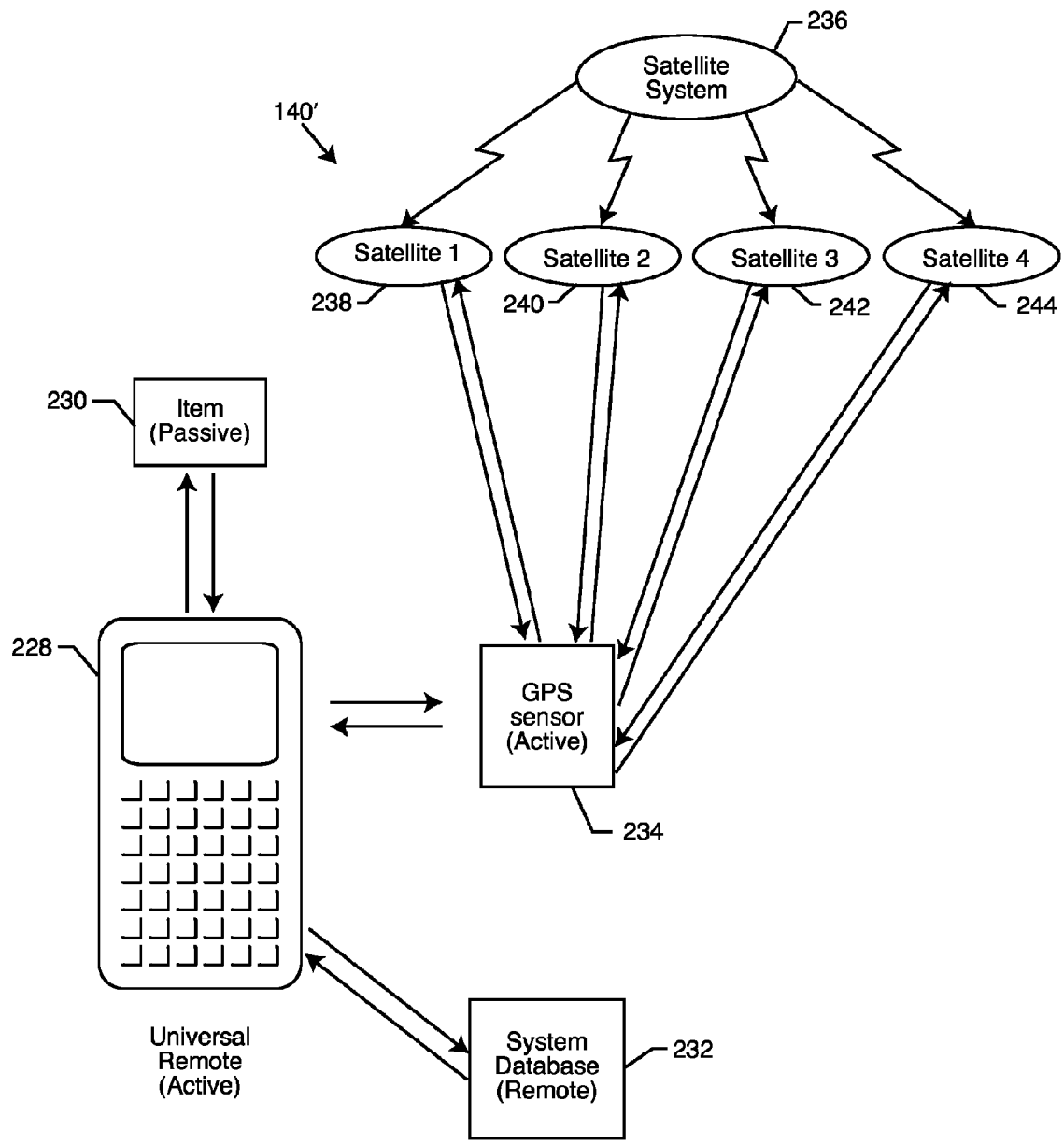
FIG. 95 is a diagram illustrating operation of the inventory control system.

FIG. 95 illustrates communication of numerous devices that operate the inventory control system 140'. The important aspect of the inventory control system 140' is the capability of identifying and locating virtually any item. In the preferred embodiment, a universal remote 228 scans a passive item 230 for storage within a database 232. The universal remote 228 preferably comprises a cell phone, but can be any device generally capable of scanning or reading information on the passive item 230. For example, the universal remote 228 may include a scanner compatible with a barcode, a reader compatible with RFID circuits, a camera for taking photographs of the passive item 230, or a receiver for receiving data through automatic or manual user entry in the event the passive item 230 is incapable of being read or scanned. The universal remote 228 may be wireless (e.g., such as the aforementioned cell phone, or a personal digital assistant (PDA), smartphone, computer, netbook, etc.) or may be a device permanently or removably affixed to a portion of a structure (e.g., a house) or in association with the storage and retrieval system described above. The universal remote 228 is capable of transmitting and/or receiving wireless signals, such as radio frequency signals and/or infrared light beams. The transmitters and receivers integrated into the universal remote 228 are preferably configured to send/receive high frequency GPS signals and low frequency RFID signals. Of course, a person of ordinary skill in the art will readily recognize that the devices of the inventory control system 140' may operate at any one of a number different wireless frequencies, including AM radio frequencies, shortwave frequencies, citizen's band (CB) frequencies, radio frequencies, television station frequencies, FM radio frequencies, and high-level television station frequencies. For instance, in the United States, a cell phone-based universal remote 228 may operate between the 824-849 MHz. If the universal remote 228 utilizes cordless telephone technology for shorter-range communication, the universal remote 228 may operate at 900 MHz. In another preferred embodiment described herein, the universal remote 228 may be capable of operating between 1227-1575 MHz for purposes of compatibility with global positioning systems (GPS). The universal remote 228 may also communicate through landlines or other wired technology, instead of wirelessly.

Preferably, the universal remote 228 is in electronic communication with the database 232. The database 232 is typically placed remote from the universal remote 228 and the passive item 230 for security purposes or as a backup system. For example, the database 232 may be placed in an attic or the basement of a house, or in a storage closet or other location that a business may designate to house electronic items such as computers. In one embodiment, the universal remote 228 is in wireless communication with the database 232 over a WiFi network, a cellular network, or a cordless phone-type wireless communication network. Importantly, the universal remote 228 and the database 232 should be in real-time bi-lateral communication (i.e. the universal remote 228 can initiate and send information to the database 232 and the database 232 can initiate and send information to the universal remote 228). Accordingly, information regarding the passive items 230 entered into the inventory control system 140' are stored both locally on the universal remote 228 and remotely in the system database 232. In one embodiment, the database 232 may comprise an off-site backup database that is primarily used to retrieve information in the event that the universal remote 228 is broken or misplaced; or a second universal remote 228 is required for use with inventory control system 140'.

The universal remote 228 also operates seamlessly with a GPS sensor 234 to locate the general location of passive items 230 located outside of, for example, the aforementioned storage and retrieval system. At the same time, the GPS sensor 234 is also in wireless communication with a satellite system 236. The preferred satellite system 236 generally comprises at least three satellites, a first satellite 238, a second satellite 240 and a third satellite 242. The satellites 238, 240, 242 operate together to locate the general location of the passive item 230 via triangulation. For example, the satellites 238, 240, 242 are able to locate the general latitude, longitude and elevation of the passive item 230. A fourth satellite 244 may supplement the first-third satellites 238, 240, 242 in the event that one loses communication, breaks or otherwise becomes non-functional or drifts out of range. In essence, the fourth satellite 244 fills in and replaces one of the non-operational satellites 238, 240, 242. The satellites 238, 240, 242 relay the latitude, longitude and elevation information to the GPS sensor 234. From there, the GPS sensor 234 actively communicates with the universal remote 228 to send location information thereto. The universal remote 228 uses the item location information and the position of the universal remote 228 relative thereto to establish an approximate distance/route so the user can find the item 230. The universal remote 228 may connect to the Internet such that the coordinates of the item 230 provided by the GPS sensor 234 integrate into an online map system (e.g. Google maps). The online map may guide the user from the user's current position to the location of the item 230. In this regard, the GPS sensor 234 helps the user locate the passive item 230 with the universal remote 228. The GPS sensor 234 communicates general location information to the universal remote 228 to identify a general area wherein the passive item 230 may be located. If there are two conflicting GPS sensors present, such as when two neighbors may use the inventory control system 140', one of the GPS sensors changes to a different frequency (i.e. a backup frequency) to ensure unique communication with the items 230 and the universal remote 228. All items 230 in a single inventory control system 140' carry the same frequency, but are individually identifiable by a unique code—the code designates the RFID number unique to the product itself. When the user enters the general location of the passive item 230, the universal remote 228 is able to actively scan for the passive item 230 via RFID or the like. This is part of the retrieval of the item in the inventory control system 140', as described in more detail below.

Figure 96:
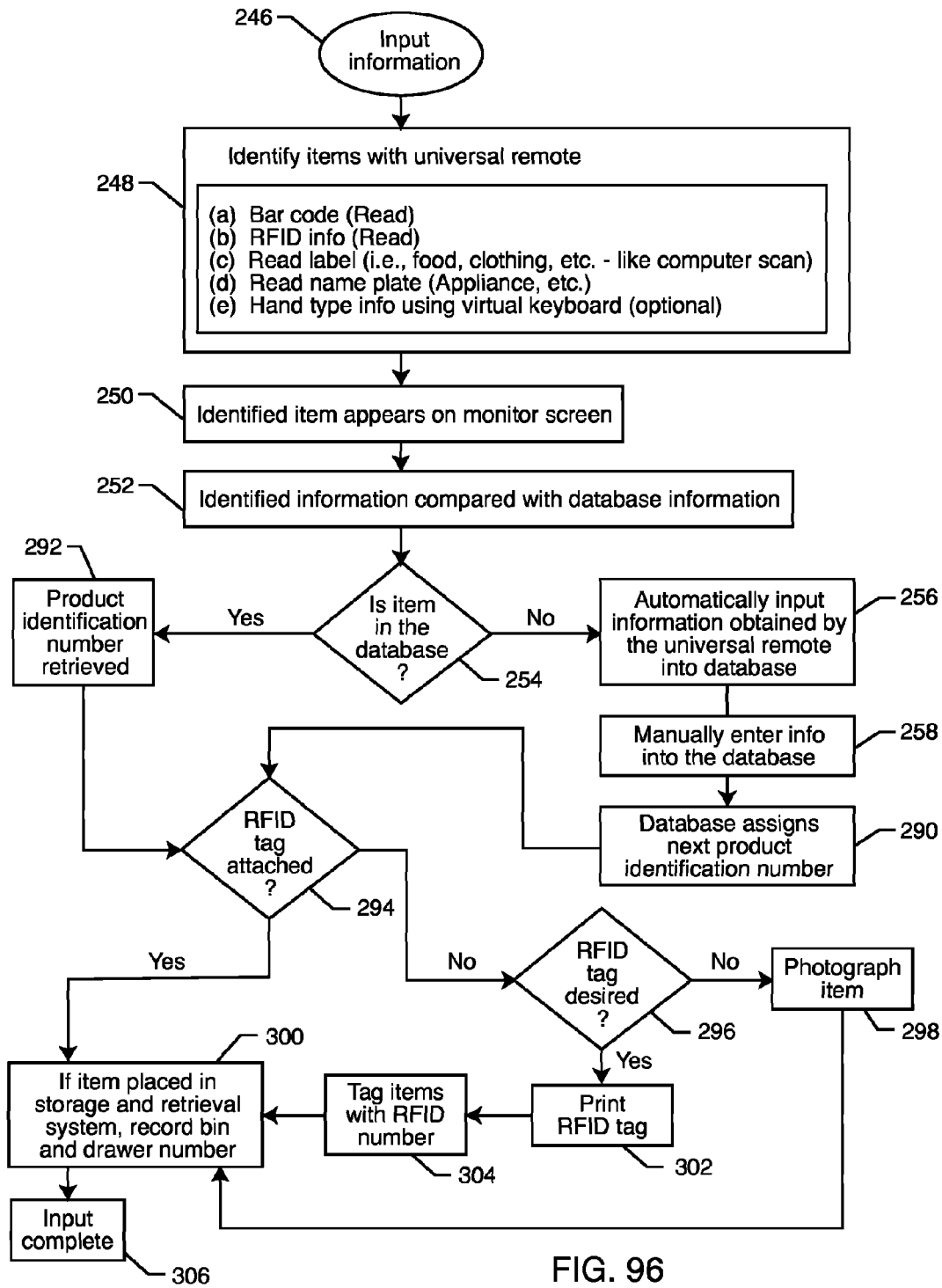
FIG. 96 is a flowchart illustrating inputting an item into the inventory control system.

Initially, the passive item 230 must be entered into the inventory control system 140', for storage such as in a memory module in the universal remote 228 and/or the system database 232. Preferably, the inventory control system 140' acquires item information through use of the universal remote 228, which is an active unit, with the item 230, which is passive. Preferably, the universal remote 228 initiates obtaining information from the passive item 230 through activation of a scanner, reader, etc. FIG. 96 is a sample flowchart for inputting information (246) into the inventory control system 140'. The first step is to identify the item with the universal remote (248). The universal remote 228 can actively read a barcode or an RFID circuit on the passive item 230 (if attached thereto). Alternatively, the universal remote 228 can read a label (i.e., food, clothing, etc.—like a computer scan), or a nameplate associated with the passive item 230 (e.g., an appliance, etc.). The user may also directly enter information into a virtual keyboard associated with the universal remote 228. For example, the keyboard may be a well-known computer keyboard, a modified keyboard attached to a wall or the keyboard may appear on a touch-sensitive LCD screen.

Once the identifying information of the item is entered into the inventory control system 140', the identified item appears on a monitor screen (250). In one embodiment, the identifying information may be displayed on the universal remote 228 itself. A person of ordinary skill in the art will readily recognize that the inventory control system 140' may convey identifying information to the user via a number of different ways, including display devices and audio devices. At this step, the user can verify that the inventory control system 140' identified the correct item. For example, the inventory control system 140' may display product identification information such as the type of product, name brand, picture, etc. If the information displayed by the inventory control system 140' is correct, the user accepts the information and the inventory control system 140' compares the item information with other product information already stored in the database (252). This process requires determining whether the item is in the database (254). In the event that the item is not in the database, the system 140' automatically inputs information obtained by the universal remote into the database (256). Information is only automatically obtainable when the passive item 230 includes a scannable barcode, a readable RFID circuit or the like. Typically, food items and other products at least include a scannable barcode. Manual input of information may be required in the event the user endeavors to store items that do not include barcodes or RFID chips, such as clothing. Preferably, at some point in the future, all products will contain a readable RFID chip that the universal remote 228 can automatically read. For example, companies such as Wal-Mart and Best Buy already require suppliers to include an RFID chip with each product.

Figure 97:
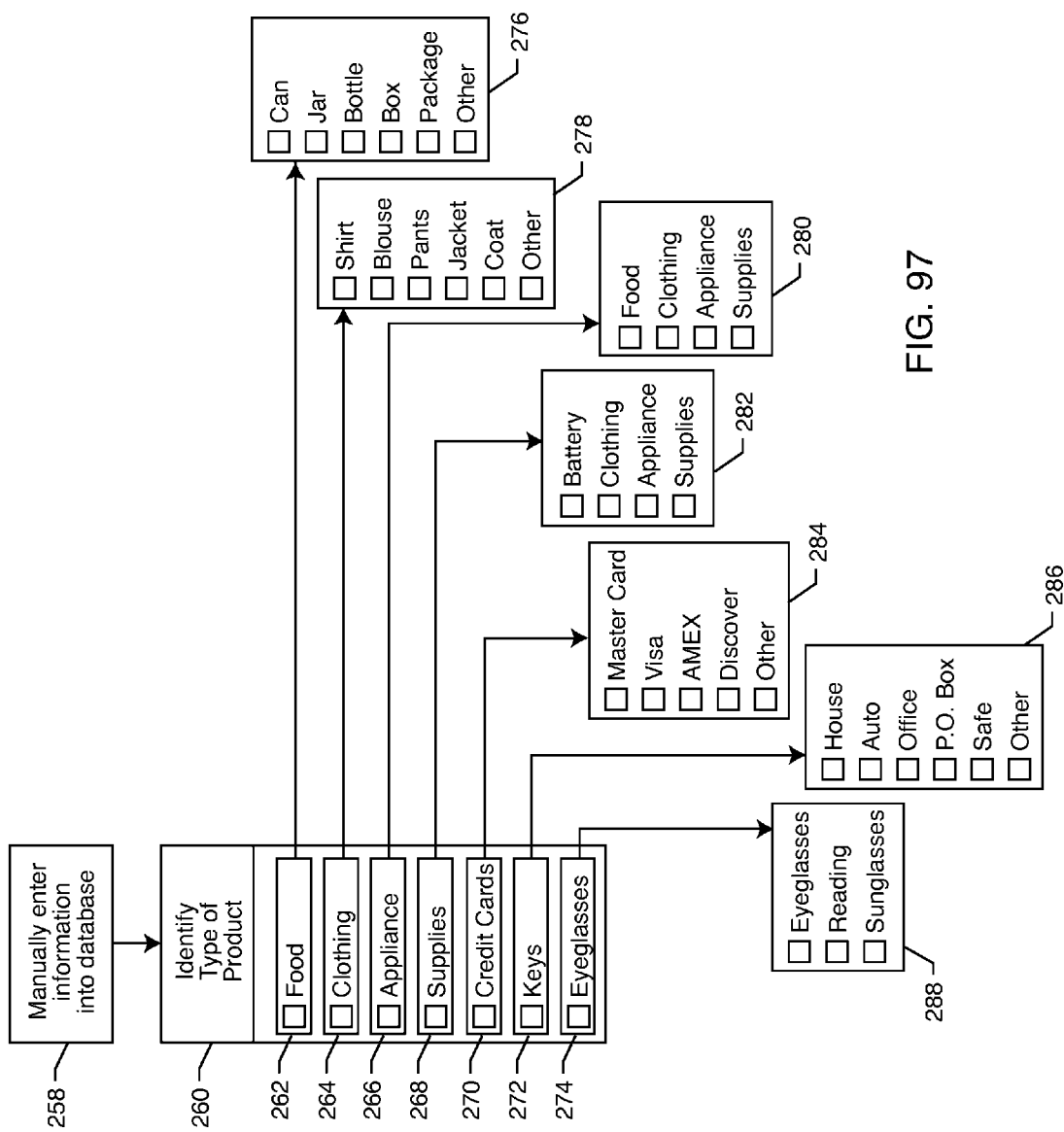
FIG. 97 is a flowchart illustrating manually entering information into the inventory control system database.

If the passive item 230 does not include any scannable or readable information, or that the information automatically obtained by the universal remote 228 is insufficient, the user has the option of manually entering information into the database (258). For instance, FIG. 97 is a flowchart illustrating the type of options that a user may select from to manually enter information into the database (258). FIG. 97 is merely a sample of the types of options that a user may have to select. A person of ordinary skill in art will readily recognize that the types and number of options will vary widely depending on the deployment of the inventory control system 140'. For example, some models of the inventory control system 140' may be limited in application to food. Accordingly, the menu system from which the user selects to manually enter goods is tailored to food items only. In general, the inventory control system 140' is applicable to virtually any environment and can record virtually any tangible item. For identification purposes, the item should be large enough to receive an RFID chip or a similar barcode. Although, the inventory control system 140' should not be limited to the size or functionality of RFID circuits or barcodes because emerging technologies may enable the identification of smaller items that are otherwise unable to currently receive identification information on items such as circuits. The universal remote 228 and the database 232 are preferably remotely updatable with new menus as new products enter the market. A software update may easily occur over the Internet, via a flash update, or a system software update. A user may also selectively customize the presentation of the various menu options described with respect to FIGS. 97 and 98, depending on the use and deployment of the inventory control system 140'.

FIG. 97 is one embodiment wherein the monitor may display a series of menus so the user can identify a type of product (260). In the exemplary embodiment shown in FIG. 97, the user is presented with the options of selecting a food item 262, a clothing item 264, an appliance item 266, a supply item 268, a credit card item 270, a key item 272 or an eyeglasses item 274. A person of ordinary skill in the art will readily recognize that the product identification step (260) may include various other types of items from which the user may select. These selectable options may include general categories, such as those items 262-274 as shown in FIG. 97, or may pertain to more specific goods depending on the application of the inventory control system 140'. For example, the embodiments described herein utilize the inventory control system 140' in a wide range of goods that may commonly be found in a home. The inventory control system 140' may be deployed in specific environments, such as a medical office, hospital, law office, manufacturing environment, grocery store, retail outlet, etc., wherein the menus may be specific to particular products specific to that particular practice. Accordingly, a person of ordinary skill in the art will readily recognize that the inventory control system 140' will have both broad use (e.g. household use) and specific deployments (e.g. industry specific needs or home specific items such as groceries).

In the embodiment shown with regard to FIG. 97, the food item 262 may include a food item submenu 276 that includes cans, jars, bottles, boxes, packages or other types of food items. The food item submenu 276 may include further submenus and/or other options for manually inputting information into the database to properly identify specific features of the food item 262 being stored within the inventory control system 140'. In terms of the storage and retrieval system, information such as height, weight, length, width, expiration date, etc. are important for food items 262 so that the storage and retrieval system can efficiently stow and retrieve the goods. The inventory control system 140' may alert the user of pending perishable goods based on quantity and expiration date. Moreover, integration of a local database into the universal remote 228, which preferably doubles as cellular telephone, enables the user to access inventory information virtually anywhere. At the grocery store, the user can immediately identify any goods stored in the inventory control system 140' so the user does not buy unneeded groceries. This concept transcends multiple practices in work or office environments. For example, in supply chain management, a purchase order can be automatically set up to purchase more of a particular part when the inventory control system 140' detects that the part is running low. Additionally, the inventory control system 140' provides the supply chain manager with an instant and real-time assessment of all the inventory within the supply chain. Accordingly, the inventory control system 140' virtually eliminates any need to individually count parts traveling through the supply chain.

With respect to the remainder of the menus and submenus in FIG. 97, the clothing item 264 may include a clothing item submenu 278 including shirts, blouses, pants, jackets, coats and/or other types of clothing storable within the inventory control system 140'. Likewise, the appliance item 266 may include an appliance item submenu 280 including options for food, appliances, supplies, etc.; the supplies item 268 may include a supplies item submenu 282 including options for batteries, clothing, appliances, supplies, etc.; the credit card item 270 may include a credit card item submenu 284 including options for Master Card, Visa, American Express, Discover Card, or other credit cards; the key item 272 may include a key item submenu 286 for house keys, car keys, office keys, P.O. box keys, safe keys, and other keys that may be used in the home or office; and the eyeglasses item 274 may include an eyeglasses submenu 288 including options for regular eyeglasses, reading glasses and sunglasses. The information manually input into the database may be presented in a number of different formats that enables a user to properly identify the item in the inventory control system 140'.

Once the information for an unknown item is entered into the database, either automatically in step (256) and/or manually in step (258), the database assigns the item a product identification number (290), as shown in FIG. 96. The product identification number is a locator number that the inventory control system 140' uses to properly identify items previously entered in steps (256) and (258). At step (290), the item is fully entered into the inventory control system 140' and is associated with a product identification number. Similarly, if the item was already in the database, the product identification number is simply retrieved from the database (292) and the quantity updated.

Then it must be determined whether the item has an RFID tag attached (294). Preferably, the RFID tags are attached by the manufacturer, and not the user, at a required, standard location. This eliminates any need to manually apply a consecutive, sequential number to each RFID tag attached to individual items. The tags may include photo identification, date made or written, expiration date, a description of the product, author, or other product or tag information. In general, the tags may include virtually any information associated with the item. Other information that can be stored on the RFID tag and/or the product includes: product name, container type (e.g. bottle, can, box, package, etc.), container size (e.g. quarts, grams, etc.), storage characteristics (optional), product height, (i.e. for maximum drawer utilization to greatly increase storage capacity), expiration date (if applicable), refrigeration requirements, product picture (e.g. of the bottle, can, labels, clothing, appliance, etc.), part or serial number (e.g. for an appliance, etc.), material (e.g. clothing, etc.), date the product was made, or date the document was written. The only foreseeable limit is the size of the memory module built into the RFID tag. Product identification information can be used in association with the inventory control system 140' to store and/or locate an item therein. Standardization in the placement and frequency of the RFID tags further enhances the compatibility of various products with the inventory control system 140'.

When an RFID tag is not attached to the item, the next step is to determine whether an RFID tag is desired (296). In some circumstances, the user may not want to attach an RFID tag to the item (such as silverware, cutlery or pots and pans). In this particular case, the user should photograph the item (298) for entry into the inventory control system 140'. The user then manually programs the inventory control system 140' to identify a particular location that the item is located. For example, a user may take a picture of a cooking pot and identify in the inventory control system 140' that the pot is located in a particular cupboard. Alternatively, if the item is placed in the storage and retrieval system, the user should record the particular bin and/or drawer number (300) where the item is stored. The user may manually enter information into the database (258) as described above. Accordingly, the user is able to subsequently find the untagged item by accessing location information stored in the inventory control system 140' quickly and easily with, e.g., the universal remote 228.

Alternatively, if an RFID tag is desired, the user must print an RFID tag (302) according to the number assigned by the database in step (290). The printed tag preferably includes an adhesive or other means for attaching the tag to the item (304). Accordingly, the user may place the item nearly anywhere so the item can later be located through use of the aforementioned universal remote 228, the GPS sensor 234, and/or the satellite system 236. In one embodiment, the tagged item may be placed in the storage and retrieval system described above. Items such as cans, bottles, boxes and jars may each be stored in a drawer in the storage and retrieval system designed for the size of each respective item. Here, it is preferred that the RFID tag be attached to the top of the can, the top of the bottle, the top of the box or the top of the jar. Alternatively, for clothing items such as shirts, pants and coats, the RFID tag may be attached to the inside top collar of a shirt, bottom of a pants leg or inside the top collar of the coat. The shirts, pants and coats may subsequently be placed in bins or on hangers within a closet. Similarly, in an office environment, the RFID tags may be attached to the side of a letter, file or document for easy reading by the universal remote 228 when organized in a Pendaflex folder hung from a frame. Such folders may also be incorporated into the storage and retrieval system described above. Additionally, other items such as watches, eyeglasses and keys (e.g., car keys and house keys) may each respectively receive an RFID tag to the underside of a watch face, bottom of the frame end, or on a key case. The watch, eyeglasses and keys may each be stored in respective drawers and bin numbers within the storage and retrieval system. Then, when the user wants to retrieve any of the above-identified items, the storage and retrieval system automatically knows which bin and drawer number to access and present to the user, so the user is not otherwise forced to search for the items. Thereafter, input is complete (306).

Figure 98:
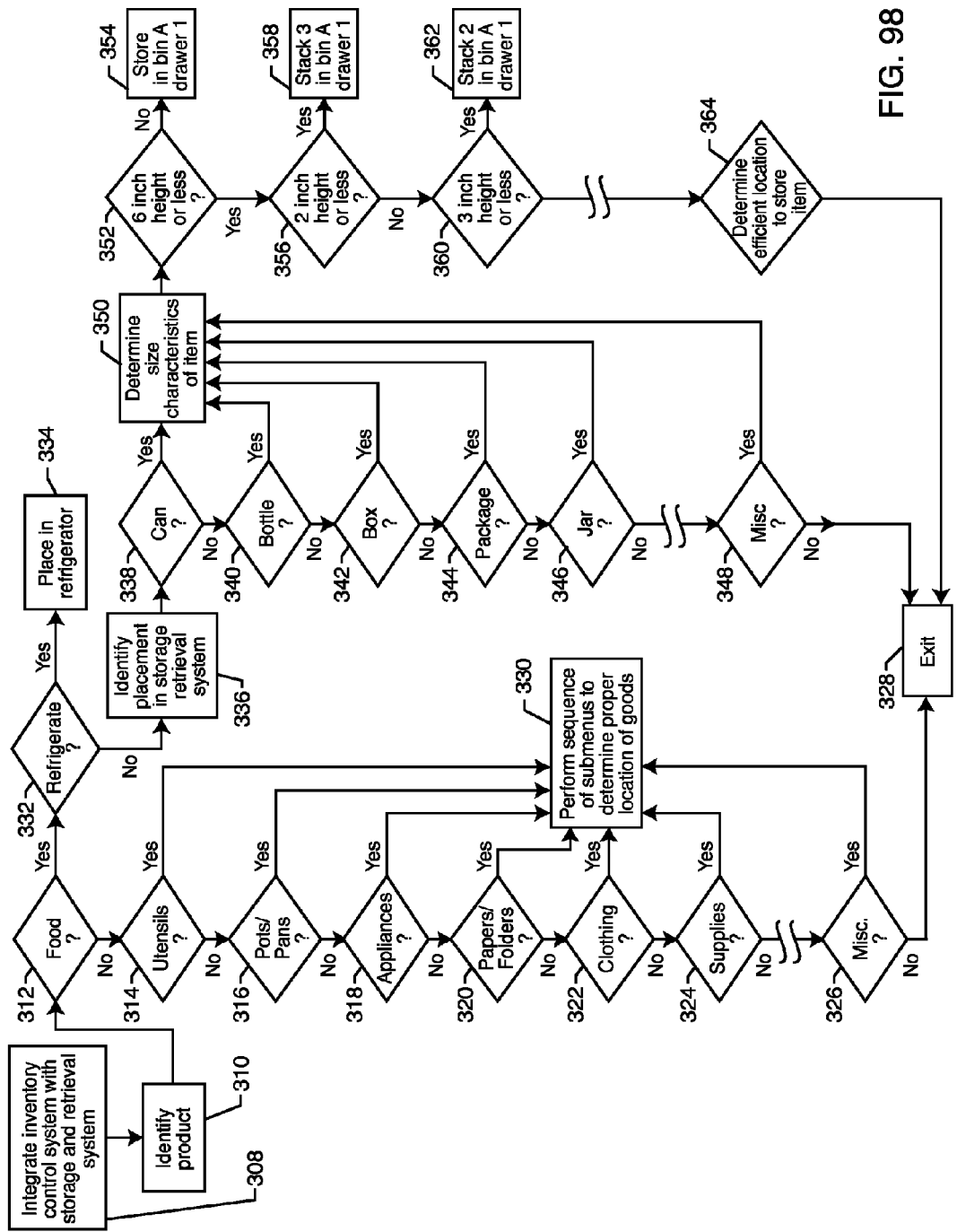
FIG. 98 is a flowchart illustrating a sample set of logic questions designed to determine the most efficient way to store an item or items in the storage and retrieval system.

FIG. 98 is a sample flowchart illustrating one set of logic instructions for integrating the inventory control system 140' with the storage and retrieval system (308). For example, the first step is to identify the product or item (310) to be stored within the storage and retrieval system. The logic diagram illustrated in FIG. 98 may be an internal logic processor that automatically steps through each of the determination steps to dictate to the user which bin and/or drawer number the item is to be placed. Alternatively, when the characteristics of the product or item to be entered into the storage and retrieval system are relatively unknown, the logic diagram of FIG. 98 may provide a way for the inventory control system 140' to acquire information about the product to efficiently ascertain the bin and/or drawer number in which the product or item is to be stored. As part of identifying the product or item (310), the inventory control system 140' may initially determine whether the item is food (312). If the item is not food, the inventory control system 140' may step through a series of different categories to determine if the product or item is utensils (314), pots/pans (316), appliances (318), papers/folders (320), clothing (322), supplies (324), or some other miscellaneous item (326) capable of being stored within the storage and retrieval system. In the event the inventory control system 140' is unable to place the item into a category, including the miscellaneous category, the item may be deemed incapable of storage within the storage and retrieval system and the system may merely exit (328). Subsequently, the system 140' notifies the user that the item cannot be stored within the storage and retrieval system. Otherwise, the inventory control system 140' performs a sequence of submenu logic steps to determine the most efficient location to place the goods in the corresponding bin and/or drawer numbers (330). Process step (330) may occur automatically, as would be the case when the product is automatically identified by the universal remote 228 by scanning the barcode or reading the RFID tag, or manually through manual input of the product characteristics by the user. Preferably, the inventory control system 140' works in conjunction with the mechanics of the storage and retrieval system described above to automatically present to the user the corresponding bin and drawer number where the item is to be efficiently stored. Considerations for storage locations may include criteria such as the size of the product packaging, the type of product (e.g. whether it needs refrigeration), the location of other similar items, frequency of accessing the item, etc. A person of ordinary skill in the art will readily recognize that virtually any type of criteria can be programmed into the logic of the computer system operating the inventory control system 140' for determining the efficient location of goods entered into the storage and retrieval system. A processor may compute storage efficiency in real-time.

The logic sequence generally described with respect to step (330) in FIG. 98 is described in more detail when it is determined that the product or item is food (312). In this scenario, after determining that the product is food (312), it must be determined whether the food needs to be refrigerated (332). In the event the food needs refrigeration, the food item is accordingly placed in a refrigerator (334). The refrigerator may either be integrated into the storage and retrieval system, as described above, or may be a separate, regular standard refrigerator. In the case that the refrigerator is part of the storage and retrieval system, the inventory control system 140' preferably determines the most efficient location within a refrigerated bin and/or drawer number for placement of the food item. Alternatively, the user may simply open the standard refrigerator (unassociated with the storage and retrieval system) for placement therein. In this embodiment, the user will later use the remote control 228 to specifically locate the positioning of the item within the standard refrigerator, as will be described in more detail below. One particular advantage of integrating the inventory control system 140' with the storage and retrieval system is that the user may ascertain the type and quantity of goods within the system in real-time. In terms of refrigeration, the user need not open the refrigerator, thereby decreasing its efficiency by exposing the internal compartments to ambient air temperatures. Rather, the user need only access a menu on the remote control 228 or other device capable of displaying the payload of contents in the refrigerator. This feature is not necessarily reliant only on the storage and retrieval system, but can also be used in conjunction with a standard refrigerator. Goods in the standard refrigerator are located (and monitored) generally through remote communication with the GPS sensor 234, as described with respect to retrieving goods below.

Alternatively, in the event that the food item does not need to be refrigerated (332), the inventory control system 140' identifies placement in another, regular compartment of the storage and retrieval system (336). For instance, the programmed logic may step through any one of a number of different determination steps to ascertain the type and size of the product to be stored in the storage and retrieval system. For instance, the inventory control system 140' may determine whether the food item is a can (338), a bottle (340), a box (342), a package (344), a jar (346), or another miscellaneous type of food item (348). In the event the inventory control system 140' is unable to ascertain the identity of the food item, the system may return a message to the user indicating as such and thereafter exit (328). This should only occur in rare circumstances, such as a new product having unusual packaging that does not permit placement in any bin and/or drawer. The determination steps (338)-(348) otherwise help the inventory control system 140' ascertain the proper location to store the food product. Preferably, food products are stored with other like food products. This increases the efficiency and organization of the storage and retrieval system. In terms of efficiency, if the food item is a can, the user may be able to stack multiple cans on top of one another depending on the size of the can, the bin and/or drawer. Alternatively, items such as bottles may not permit stacking and, therefore, require storage in different bin and/or drawer numbers. Grouping products based on dimensioning, especially the footprint of the product package, only enables the storage and retrieval system and the inventory control system 140' to store more products within a smaller space.

Accordingly, after identifying the type of food product, the inventory control system 140' determines the size characteristics of the item (350). For example, the inventory control system 140' may first determine whether the food item is six inches or less in height (352). In the event that the food item is not six inches or less in height, the inventory control system 140' presents the user with the option of storing the food item in bin A, drawer 1 (354). Alternatively, if the food item is six inches or less, the inventory control system 140' may next determine whether the food item is two inches or less in height (356). In the case that it is, the user is able to stack at least three of the food items in bin A, drawer 1 (358). If the food item is more than two inches in height, the next logic step may be to determine whether the food item is three inches or less in height (360). In the event that the food item is three inches or less in height, the user is directed to stack two of the food items in bin A, drawer 1 (362). The inventory control system 140' may take into consideration one or more other characteristics of the food item when determining the location to place the food item in the storage and retrieval system. The inventory control system 140' will also consider the type and size of the products already within the storage and retrieval system to maximize efficient placement therein. Accordingly, this logic is generally designated in step (364). Once the food item is placed in the storage and retrieval system, the inventory control system 140' exits (328). The next time the same item is scanned into the inventory control system 140', the storage and retrieval system automatically presents a preferred bin and/or drawer to the user since the product characteristics are already known. Of course, the user can override any automatic function at any time.

Figure 99:
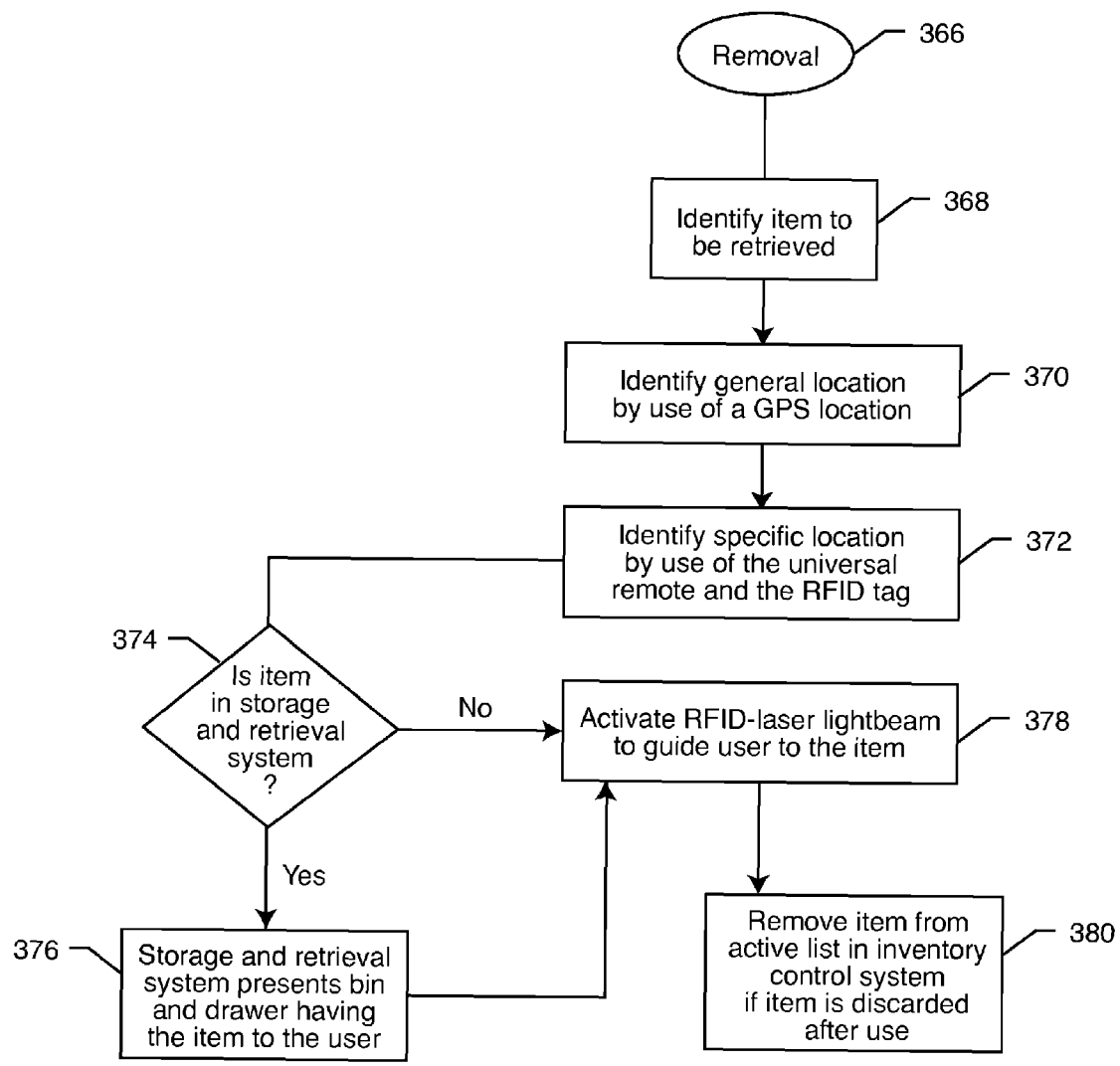
FIG. 99 is a flowchart illustrating removal of an item from the inventory control system.

Another important aspect of the inventory control system 140' is the capability to locate and retrieve items originally entered into the system. FIG. 99 is a flowchart illustrating a process of removal (366). The first step is to identify the item to be retrieved (368). Recall that the inventory control system 140' generally includes the universal remote 228. Accordingly, the user may search for an item to be retrieved by interfacing with a search program programmed into the universal remote 228. Information of items within the inventory control system 140' may be stored in a database local to the universal remote 228 or remote in the system database 232. When the information is remote, the universal remote 228 directly communicates with the database 232 in real-time. The user may search by virtually any type of product feature identified, e.g., in steps (260)-(288), (312)-(326), (338)-(348) or (352)-(360). Searches may be category-based, keyword-based, feature-based (e.g. purchase date, expiration date, etc.) or by some other menu-based logic search.

Items located outside of the storage and retrieval system may be generally located through use of the universal remote 228 and the GPS sensor 234. One of GPS sensors 234 is preferably within reading range of the item 230 at all times. For example, a user may strategically place multiple GPS sensors 234 throughout a house. Preferably, the GPS sensors 234 cover the entire premises as would a home WiFi internet signal. In a preferred embodiment, the item 230 includes a passive RFID tag that can be read by an active GPS sensor 234 capable of sending and receiving RFID signals, among others. The GPS sensor 234 may further communicate with the satellites 238-244 of the satellite system 236, as described above, to locate the general area of the item 230. For example, the GPS sensor 234 and the satellite system 236 could determine that an item is located on the second floor of a three story house. In this embodiment, the satellite system 236 uses triangulation, which includes an approximate elevation of the item, to locate the general location of the item in the house. The GPS sensor 234 can send and receive high frequency GPS signals to the satellites 238-244 and the universal remote 228. As described above, the GPS sensor 234 ascertains the general location of the item 230 through implementation of triangulation, wherein the satellites 238, 240, 242 work together to identify the latitude, longitude and elevation of the item 230. The GPS sensor 234 acquires this information from the satellite system 236 and thereafter communicates the location to the universal remote 228. The universal remote 228, through a GPS-enabled map system or through an internet connection, can display the location of the user relative to the positioning of the item 230. The user is then able to navigate with the universal remote 228 to the approximate location of the item 230 identified by the GPS sensor 234. Once in the general vicinity of the item 230, the user activates the RFID transmitter on the universal remote 228 to specifically hone in on and pinpoint the exact location of the item 230.

Accordingly, the next step is to identify the specific location of the item 230 by use of the universal remote 228 and the RFID tag (372). The universal remote 228 includes an RFID-laser light beam that directs the user to the specific location of the item 230 when in range. The user can retrieve the item by following the laser-light beam to the location of the item 230. In some cases it is necessary to determine whether the item is stored in the storage and retrieval system (374). Accordingly, when the item 230 is stored within the storage and retrieval system, the storage and retrieval system presents the bin and drawer having the desired item to the user (376). The user may then activate the RFID-laser light beam to guide the user to the item (378). The laser light beam on the universal remote 228 preferably creates a line-of-sight beam in the direction of the item 230. When in the storage and retrieval system, the laser light beam points to a specific product having the identified RFID label thereon. When not in the storage and retrieval system, the laser light beam preferably directs the user to a specific location where the item 230 is located. Here, the universal remote 228 also creates a line-of-sight to the item with the laser light beam. Of course, the item 230 must be within range of the radio frequency transmitter on the universal remote 228 for the laser light beam to direct the user to the specific location of the item 230. Hence, the importance of using the GPS sensors 234 to locate the general vicinity of the item 230.

In a preferred embodiment of the inventory control system 140', for items stored outside of the storage and retrieval system described above, it is preferred that various GPS sensors be disposed in the general vicinity of where items are to be stored. For example, a GPS sensor 234 could be located in the garage, in the basement, and/or in specific rooms such as a closet, a bedroom, a pantry, or a refrigerator. The important part is that the GPS sensor 234 be within transmittable range to identify the general location of the item at any given time. This is extremely useful and efficient for the user because the user does not spend countless hours searching for items in the wrong portion of a home, for example. Tagging items 230 with RFID tags also prevents loss of the item 230 due to misfiling or misplacement. When the item 230 is within range of either the GPS sensor 234 or the universal remote 228, the user is able to immediately locate the place of the item in real-time. For example, items placed in a standard refrigerator (e.g. not a storage and retrieval-equipped refrigeration unit), as described briefly above with respect to FIG. 98, a GPS sensor 234 attached to the refrigerator notifies the user of certain products within its vicinity (i.e. in the standard refrigerator). Accordingly, the user is capable of determining the general area that a particular product is located (i.e. the standard refrigerator). Upon opening the refrigerator, the universal remote 228 activates the RFID-laser light beam to point directly to the RFID tag specific to the product itself. The laser light beam preferably establishes line-of-sight to the item for immediate retrieval. Thereafter, the item is removed from the active list of the inventory control system if the item is discarded after use (380). Otherwise, the GPS sensors 234 continue to track the location of the item while in range.

The monitor on the universal remote 228 may also be designed to periodically show or display a list of items that need attention. For example, the universal remote 228 may display items about to expire, or items that may expire in the near future (e.g. two or three days). The inventory control system 140' may be equipped with a notification system that alerts the user of goods that may expire within a certain time period. Of course, the user is able to customize the alerts (e.g. frequency, audio, visual, etc.).

Figure 100:
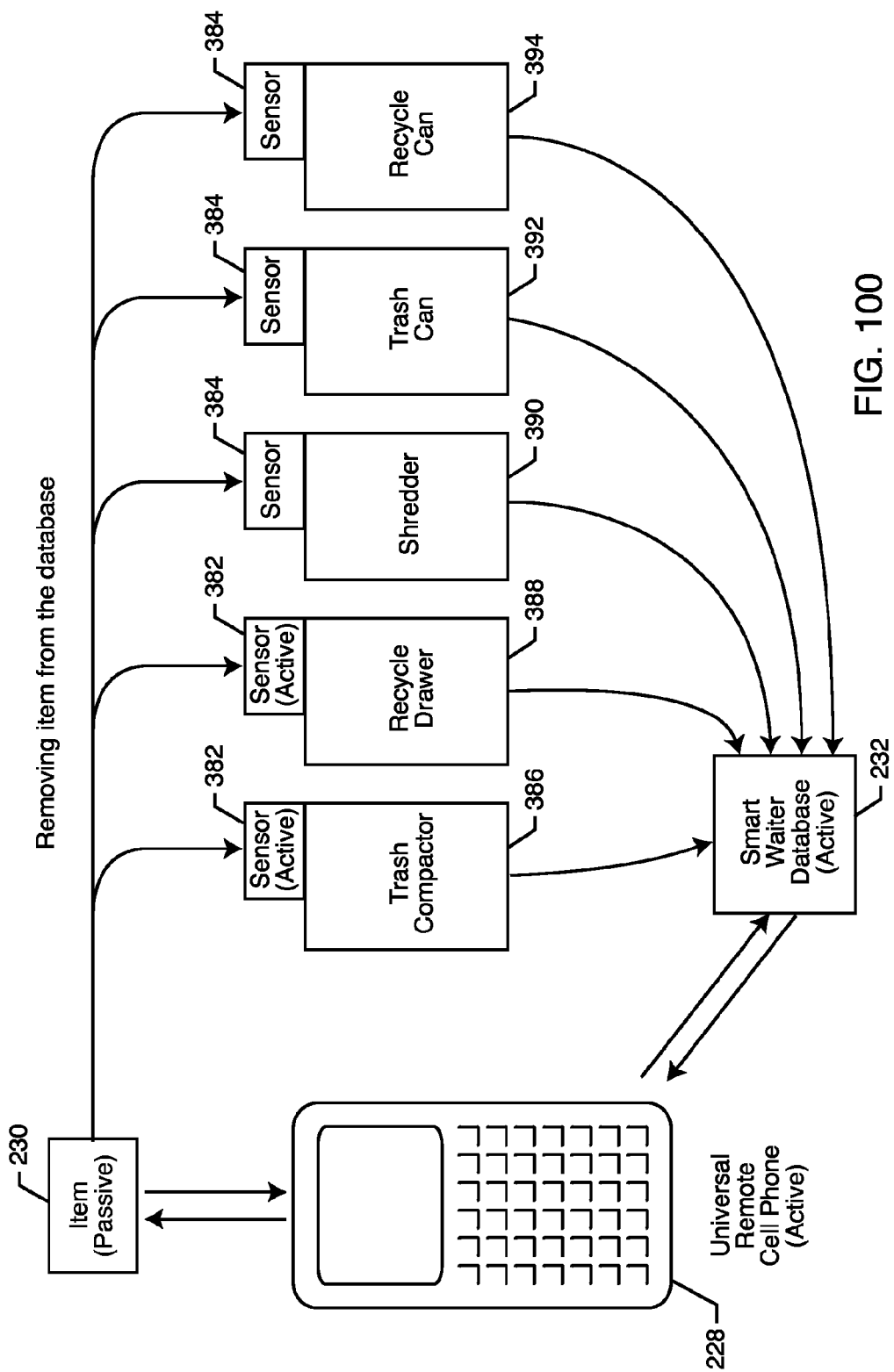
FIG. 100 is a diagram illustrating several ways of electronically documenting that an item was removed from the inventory control system.

FIG. 100 is a schematic diagram illustrating removal of the item 230 from the active list in the inventory control system 140'. As shown in FIG. 100, the system database 232 preferably remains in communication with the universal remote 228. The universal remote 228 or GPS sensor 234 may also be in communication with the item 230 (assuming either are within range). The item 230 can be removed from the active list in the inventory control system 140' via manual entry by the user in the event the item 230 no longer resides in the system 140'. This may occur, for example, when a piece of fruit (such as an apple) is eaten. More preferably, items are removed from the active list through deployment of an active sensor 382 or a powerable sensor 384. The active sensor 382 is just that, always active. Thus, when the user places the item 230 in either a trash compactor 386 or a recycle drawer 388, the active sensor 382 records placement of the item 230 therein. The active sensor 382 then immediately communicates to the system database 232 that the item 230 has been placed in a location (i.e. the trash compactor 386 or the recycle drawer 388) that effectively removes the item 230 from the inventory control system 140'. The system database 232, being in communication with the universal remote 228, immediately updates the database stored within the universal remote 228 so that the user may access the inventory in real-time. Typically, the active sensor 382 used with the trash compactor 386 is used to identify items 230 such as food and other household goods. Additionally, the active sensor 382 associated with the recycle drawer 388 may be associated with other common household goods, such as boxes, papers, cans, etc. The scope of the active sensors 382 are preferably localized and may only be activated when the item 230 passes a plane or other laser that causes the active sensor 382 to read the item 230. Moreover, the powerable sensor 384 may be mounted or used in association with a shredder 390, a trash can 392 or a recycle can 394. The powerable sensor 384 enables the user to selectively turn the sensor 384 "on" or "off", depending on the use. For instance, the sensor 384 associated with the shredder 390 is normally "off", unless the user is shredding papers (i.e. the item 230) having an RFID circuit thereon. In this case, the powerable sensor 384 becomes active when the user turns the shredder 390 to the "on" position. Accordingly, the sensor 384 identifies the item 230 before the RFID tag is destroyed by the shredder 390. The trash can 392 and the recycle can 394 include similar powerable sensors 384, but may also include the active sensor 382. Accordingly, each of the sensors 382, 384 are in communication with the system database 232 and/or the universal remote 228. The sensors 382, 384 immediately update the system database 232 and/or the universal remote 228 to show that the item 230 has been discarded. The inventory control system 140' preferably updates in real-time so the user can immediately identify the types and quantity of items in the inventory control system 140' at all times.

Thus, the item 230 is automatically removed from the active database via the active sensor 382 or the powerable sensor 384 at the place the item 230 is discarded. Alternatively, the item 230 is manually scanned or read by the universal remote 228 when thrown away elsewhere (i.e. when the active sensor 382 or the powerable sensor 384 is not present), given to charity, or sold in a flea market. The item removed from the active database may be kept inactive for product usage reports, etc., or otherwise completely removed from the database. For example, deleting an item 230 from the database could be similar to a "recycle bin" protocol of a computer.

Figure 101:
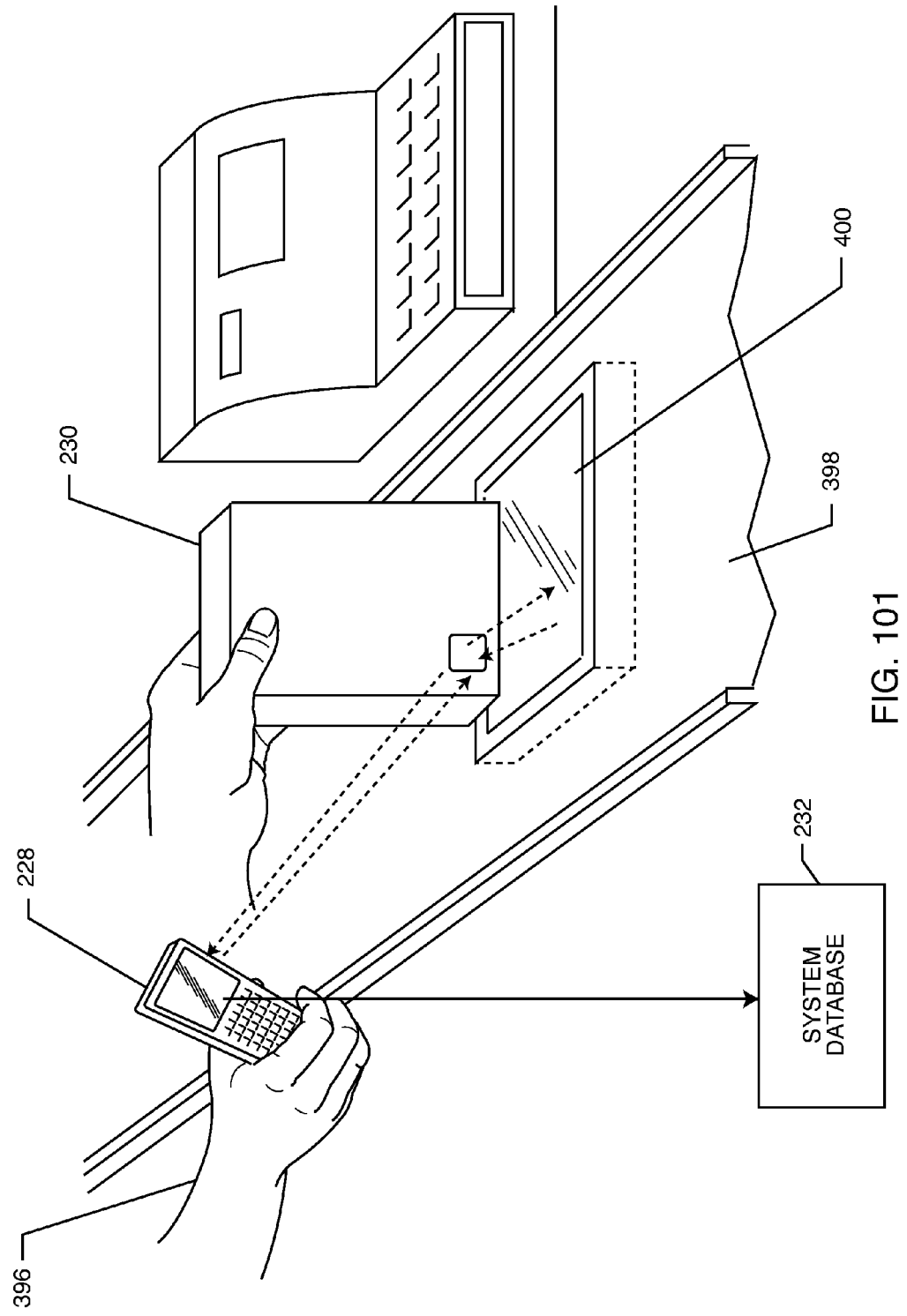
FIG. 101 is a schematic illustrating automatic entry of a purchased item into the inventory control system at the time of checkout.

In another aspect of the inventory control system 140', a user may automatically enter items into the system database 232 simultaneously while checking out at the store. FIG. 101 illustrates a user 396 scanning the item 230 at a checkout counter 398. In this embodiment, the item 230 is equipped with an RFID circuit automatically read by a scanner 400 integrated into the checkout counter 398. When the RFID tag is read at the checkout counter 398, the RFID information is automatically read by the universal remote 228 carried by the user 396. Thereafter, the universal remote 228 communicates the information associated with the item 230 to the system database 232. This particular feature of the inventory control system 140' instantly adds newly purchased products to the system database 232. Accordingly, the user 396 is not required to re-scan any of the purchased items at home. Rather, the inventory control system 140' immediately enters and begins tracking the purchased items with the universal remote 228 and any one of a plurality of the GPS sensors 234. As described in more detail below, features of the universal remote 228, the GPS sensors 234 and the system database 232 ensure that the user 396 does not haphazardly lose or misplace the purchased items, especially after leaving the store. Input of the item 230 into the inventory control system 140' at the time of purchase automatically immediately identifies the location of the item 230 such that the user 396 may retrieve the item 230 at any given time in the future.

Figure 102:
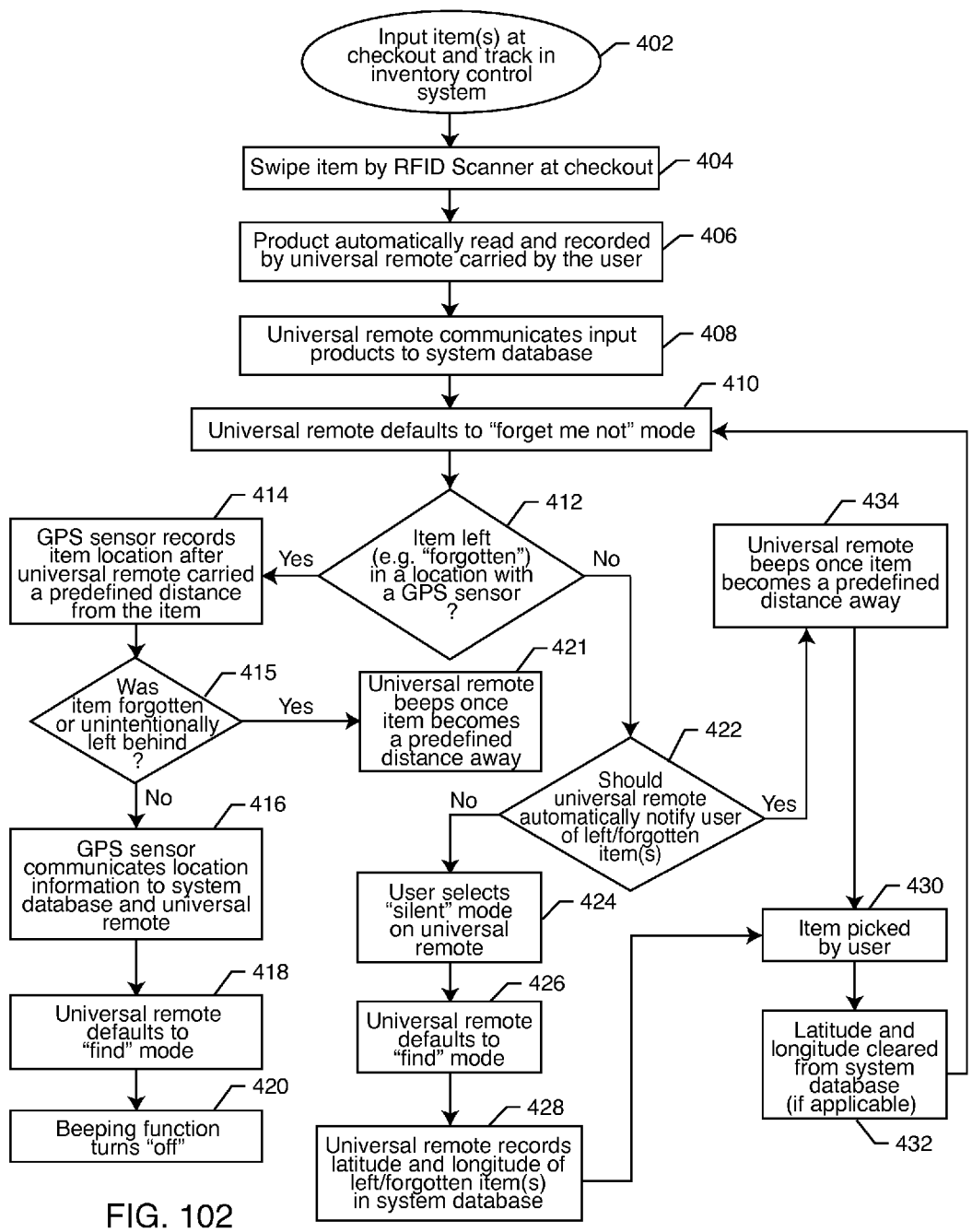
FIG. 102 is a flowchart illustrating inputting an item into the inventory control system at checkout and thereafter tracking the item.

FIG. 102 is a flowchart illustrating a sample process of inputting items into the inventory control system 140' at checkout and therefore tracking the item within the inventory control system (402). Initially, as generally described with respect to FIG. 101, the user 396 first swipes the item by an RFID scanner 400 at checkout (404). The universal remote 228 carried by the user 396 acknowledges the purchase of the item 230 at the time of scanning (406). The universal remote 228 stores item information in a local database and may simultaneously communicate that information to a remote database (408), such as the system database 232. At this stage, the universal remote 228 defaults to a "forget me not" mode (410). In this setting, the universal remote 228 maintains communication with the purchased items 230. While the items 230 are within radio contact with the universal remote 228, nothing happens. This feature is to ensure that the user 396 does not accidentally leave or forget a particular product at the checkout counter 398.

While the embodiment described with respect to FIG. 102 pertains to purchasing goods at a retail outlet, the "forget me not" feature is applicable in a number of different settings. For example, the user may set the universal remote 228 to the "forget me not" mode when in a restaurant or bar. All items within range of the radio frequency transmitter in the universal remote 228 are immediately identified and thereafter tracked. As long as the items carried by the user remain within the radio frequency range of the universal remote 228, nothing happens. Items such as credit cards or keys (and possibly cash in the future) are constantly monitored by the universal remote 228. This prevents the user from leaving, for example, a facility without items that were initially within the radio frequency range of the universal remote 228. This might be applicable in a bar setting wherein a user may give a bartender a credit card to start a tab. At the end of the evening, in the event the user walks out of the bar without the credit card, the universal remote 228 immediately notifies the user once the credit card loses radio frequency communication with the universal remote 228—i.e. the credit card falls outside of some predefined monitoring distance. In this regard, the user may immediately identify the missing item by viewing information provided by the universal remote 228. In this embodiment, the universal remote 228 may display a picture or other information regarding the missing item. In the above example, the user immediately knows to go back to the bartender to retrieve the credit card. This particular feature of the inventory control system 140' is applicable to virtually any type of product carrying RFID identification. The universal remote 228 may monitor items such as clothing, purses, computers, wallets, billfolds, glasses, etc.

The user may also customize the "forget me not" mode, such as which items are monitored and the maximum distance between the universal remote 228 and the item before the universal remote 228 activates a notification warning to the user. In this embodiment, the user may initially activate the "forget me not" mode on the universal remote 228 at a location such as a restaurant. The universal remote 228 may provide the user with a list of items currently being monitored in the "forget me not" mode. In this list, the user may have the option to deselect monitoring of a particular item or items. This might be useful, for example, if the user decides to throw away a particular item (in which case the item is removed from the inventory control system 140' altogether, as described above), or in the event that the user decides to allow the item to leave the predefined monitoring range (e.g., to allow another person to borrow a piece of clothing, such as a coat). In this scenario, the user does not want the universal remote 228 activating at the end of the night when the borrowed garment is taken beyond the monitoring range of the universal remote 228. Of course, the user may customize the distance the item may be taken before the universal remote 228 activates some visual or audio alarm.

Items purchased at checkout or otherwise desired to be monitored via the "forget me not" mode has several additional features in view of use with the storage and retrieval system and GPS sensors 234. As shown in FIG. 102, the universal remote 228 initially defaults to the "forget me not" mode (410). This is generally true whether the items were purchased or otherwise monitored at a different location. When an item leaves the monitoring range of the RFID transmitter/receiver of the universal remote 228, it must be determined whether the item was left (e.g. "forgotten") in a location with a GPS sensor 234 in range (412). If the item is left within the range of a GPS sensor 234, the GPS sensor 234 records the item location after the universal remote is carried a predefined distance from the item (414). It is then determined whether the item was "forgotten" or unintentionally left behind (415). If the item was not forgotten or was intentionally left behind, the GPS sensor 234 immediately communicates location information to the system database 232 and the universal remote (416), and then having received this information, the universal remote 228 defaults to the "find" mode (418). Accordingly, the notification function (e.g. beeping, vibrating, flashing, etc.) of the universal remote 228 turns "off" (420). Steps (414)-(420) are designed to permit the user to leave an item outside of the RFID transmission range of the universal remote 228 without the universal remote 228 beeping or otherwise notifying the user that the item was left behind. Alternatively, if the items were "forgotten" or unintentionally left behind, the universal remote beeps once the item becomes a predefined distance away (421). These features are particularly ideal after the user 396 purchases goods at a retail outlet and then places those goods within the user's home, e.g., for storage and retrieval at a later date. The user is not required to enter any information or change any settings. Rather, the user simply walks away and the GPS sensors 234 immediately identify the location of the item 230. This prevents the item from being lost in the event the user accidently forgets an item at a location outside of the GPS sensor 234 range, such as at the grocery store, since the GPS sensor 234 immediately communicates location information to the system database 232 and the universal remote 228 in step (416). The user can still immediately identify the general location of the item even though the universal remote 228 is no longer in RFID transmission range. In this aspect of the inventory control system 140', there is no danger that the item will be lost or otherwise misplaced.

Alternatively, when it is determined in step (412) that a GPS sensor 234 is not located within the area that the item is left, it must first be determined whether the universal remote 228 should automatically notify the user that the item was left and/or forgotten (422). In some situations, the user may endeavor to place an item at a location outside of the RFID transmission range of the universal remote 228; and in a location outside of the transmission range of any GPS sensor 234. In this scenario, the user may select a "silent" mode on the universal remote (424). The universal remote 228 then defaults to "find" mode (426). In this mode, when the universal remote 228 leaves the RFID transmission range of the item, the universal remote records the latitude and longitude of the item in the system database (428). The universal remote 228 has an active GPS sensor circuit therein (not shown). The universal remote 228 will be able to later locate the item via a universal remote navigation map after recording the latitude and longitude of the item placed outside the range of the GPS sensors 234. This means the stationary GPS sensors 234 on the refrigerator, house, closet, or storage and retrieval system are not needed. The roving GPS sensor circuit on the universal remote 228 is a suitable replacement. This feature ensures that the location of the item is not later forgotten. The user can access the longitude and latitude information from the system database 232 to later retrieve the item 230 from the location identified by the universal remote 228. Accordingly, the user may later go back and pick up the item (430). Once the item is picked up, the latitude and longitude information previously stored in the system database 232 is cleared (432).

Alternatively, the universal remote 228 notifies the user (e.g. by beeping, vibrating or flashing) once the item becomes a predefined distance away from the user (434) if the item is forgotten in step (422). The latitude and longitude information is typically not recorded in this scenario because the user goes back and picks up the forgotten items (430). Accordingly, it may not be necessary to clear the latitude and longitude information in step (432) before the universal remote 228 defaults back to the "forget me not" mode. Regardless of whether the item was purposely left behind or "forgotten", once the item is back within range of the universal remote 228, the universal remote 228 defaults back to the "forget me not" mode (410).

The inventory control system 140' ensures that any item can be located and retrieved by (a) simply walking to the item and retrieving it (e.g., a house, office, refrigerator, walk-in closet, etc.); or (b) having the item brought to the user at the access location of the storage and retrieval system described above. The key is that the inventory control system 140' has location information of any particular good purchased or otherwise entered into the system 140' at any given time.

Another feature of the inventory control system 140' is the security of the information stored within the universal remote 228 and the system database 232. Security may be necessary in the event that someone steals the universal remote 228 or someone attempts to access the database 232 to retrieve inventory information therein. The inventory control system 140' can be secured with, e.g., a (a) password; (b) thumbprint; or (c) retinal scan. In the first embodiment, the user may need to enter a password into the universal remote 228 to access the inventory information therein. Alternatively, the universal remote 228 may include a thumbprint reader, whereby the information in the inventory control system 140' may only be accessed by the user that initially sets up the system 140'. Alternatively, and most preferably, the universal remote 228 may include a retinal scanner that takes a photograph of the user's eye during the initial setup. Accordingly, the universal remote 228 is only responsive to that individual after a subsequent retinal scan confirms that the user operating the universal remote 228 is the actual user that set up the inventory control system 140'. Alternatively, multiple persons may be granted access to use the universal remote 228 in the event that multiple passwords, thumbprints or retinal scans are entered into the system 140'. This feature is particularly useful when the inventory control system 140' is used by several people in a family (e.g. husband, wife, kids, etc.). That way, all individuals associated with the inventory control system 140' can store and retrieve items at will, in accordance with the embodiments described above.

Although several embodiments have been described in detail for purposes of illustration, various modifications may be made to each without departing from the scope and spirit of the invention. Accordingly, the invention is not to be limited, except as by the appended claims.

What is claimed is:

1. An inventory control system, comprising:
    a portable controller for receiving information relating to an item to be tracked by an inventory control system;
    a database in communication with the portable controller for storing the information;
    a readable tag having a unique identification code affixed to the item;
    a sensor for monitoring a global location of the tag after the item is entered into the inventory control system; and
    a tag reader associated with the portable controller to pinpoint a specific location of the item in an area generally identified by the sensor.

2. The inventory control system of claim 1, wherein the portable controller includes indicia for directionally pinpointing the location of the readable tag.

3. The inventory control system of claim 1, wherein the sensor comprises a GPS sensor.

4. The inventory control system of claim 1, wherein the sensor includes a transmitter and a receiver in wireless communication with the portable controller.

5. The inventory control system of claim 1, wherein the portable controller comprises a cell phone, a personal digital assistant, a smartphone, or a scanner.

6. The inventory control system of claim 5, wherein the scanner comprises a barcode scanner or an RFID scanner.

7. The inventory control system of claim 2, wherein the portable controller includes a pointer for directionally pinpointing the location of the readable tag.

8. The inventory control system of claim 7, wherein the pointer comprises a laser-light beam, an arrow displayed on an LCD screen of the controller, or an infrared light beam.

9. The inventory control system of claim 3, wherein the GPS sensor wirelessly communicates with a satellite system to identify the location of the readable tag via triangulation.

10. The inventory control system of claim 9, wherein the GPS sensor operates at multiple frequencies distinguishable over one another.

11. The inventory control system of claim 10, wherein the GPS sensor automatically switches to a new frequency when a conflicting frequency is detected.

12. The inventory control system of any of claims 1-6, including a discard sensor for automatically communicating to the database that the item was removed from the inventory control system.

13. The inventory control system of claim 1, wherein the portable controller is responsive to voice commands.

14. The inventory control system of claim 1, including a printer for imparting information to the readable tag.

15. The inventory control system of any of claims 1-6, wherein the database comprises a local database in the portable controller.

16. The inventory control system of claim 15, including a backup database in remote communication with the portable controller.

17. The inventory control system of claim 1 or 6, wherein the readable tag comprises an RFID chip and/or a barcode.

18. The inventory control system of claim 1, including an alarm for conveying an audio or visual notification.

19. The inventory control system of claim 1 or 5, wherein the portable controller includes a touch-sensitive LCD screen.

* * * * *